May 6, 1958
D. T. McRUER ET AL
2,833,496
FLIGHT CONTROL SYSTEM
Filed Dec. 13, 1954
14 Sheets-Sheet 9
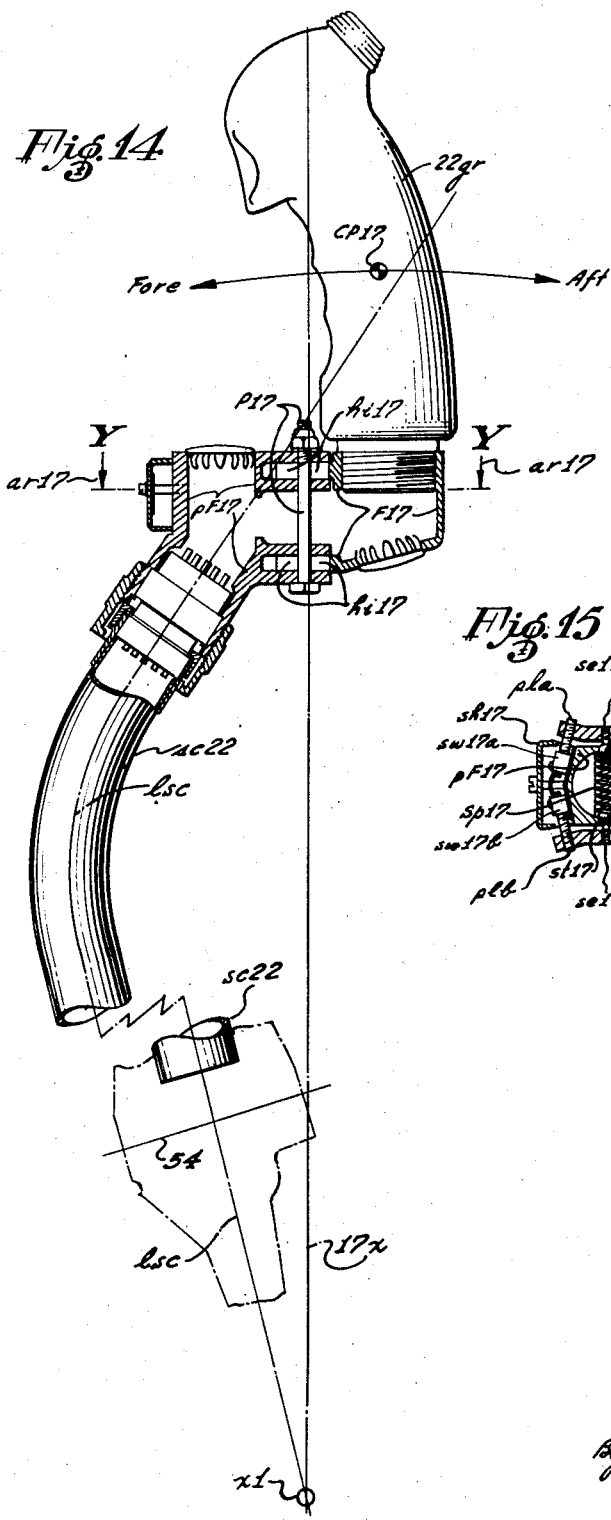
INVENTORS:
Duane T. McRuer
Richard J. Kulda
Alvin R. Vogel
By Herbert E. Metcalf
Their Patent Attorney

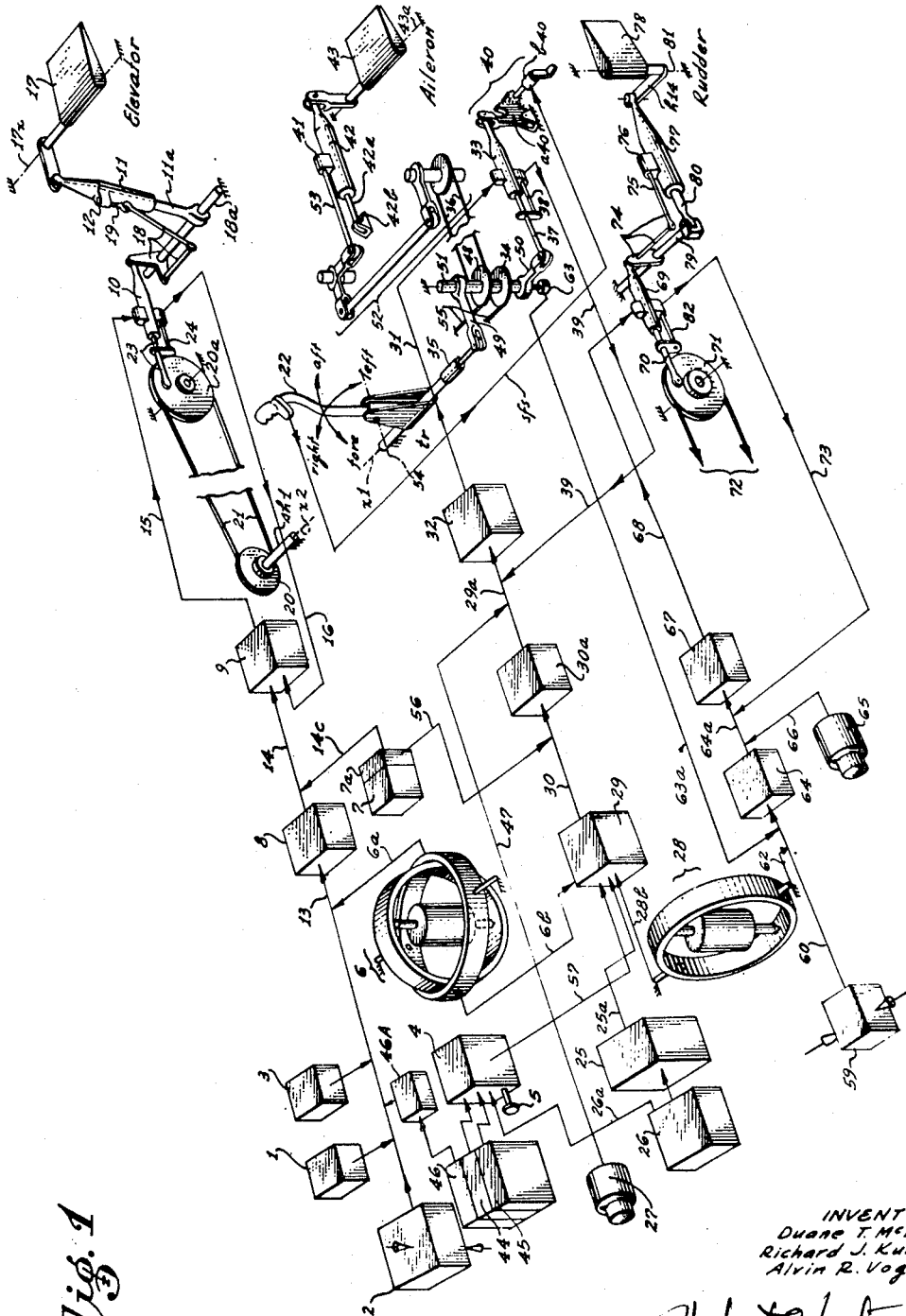

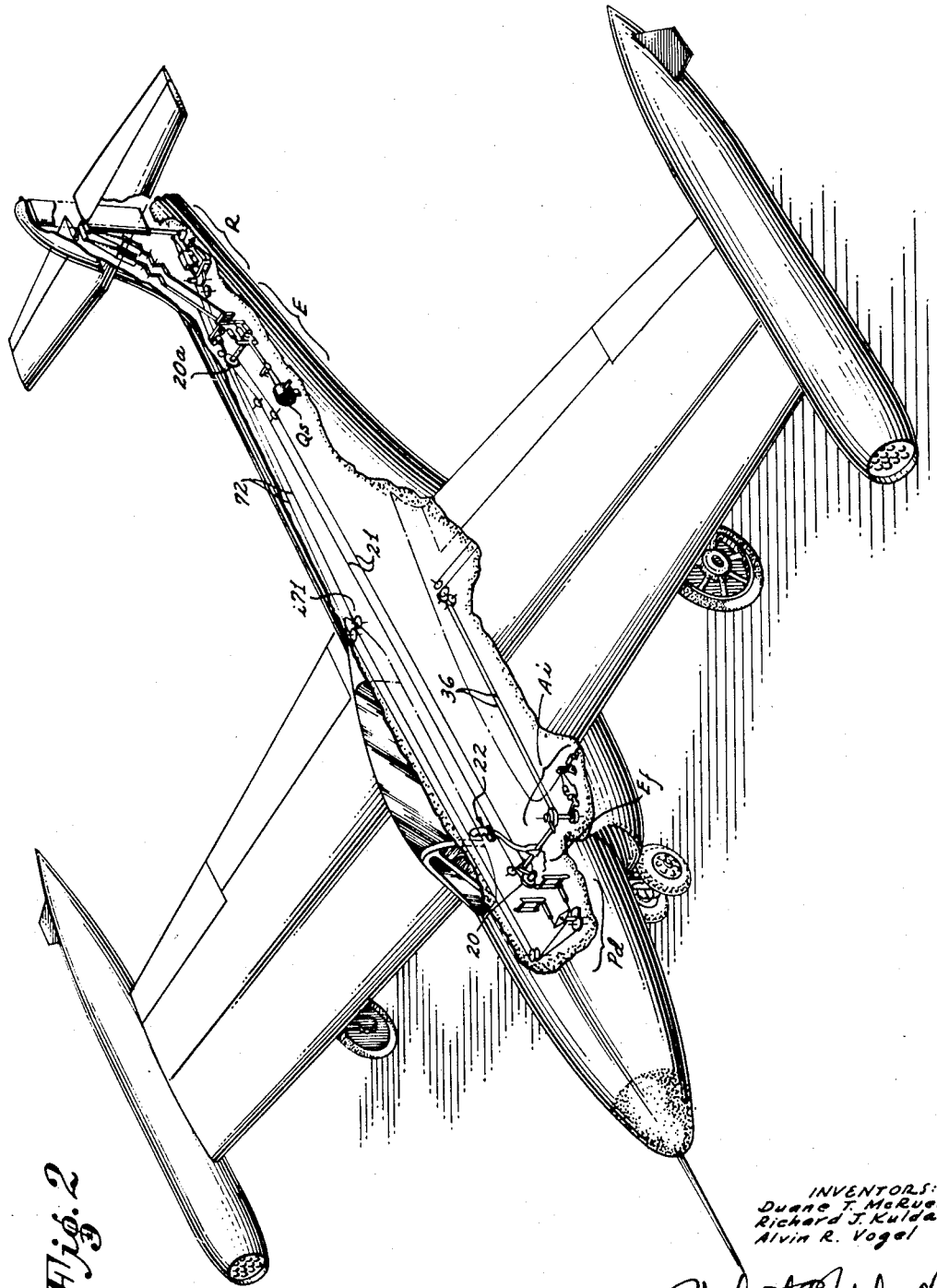

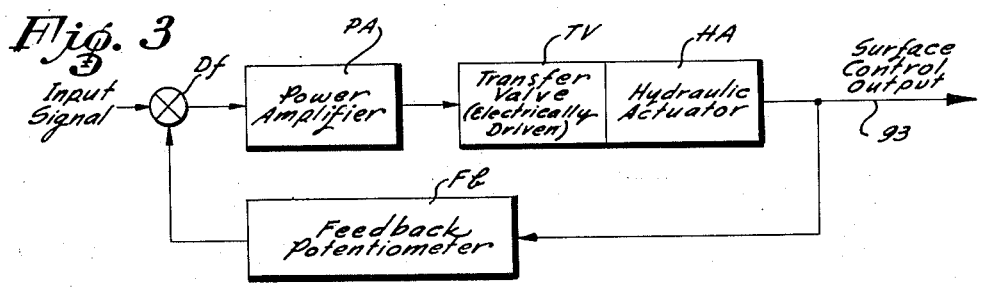
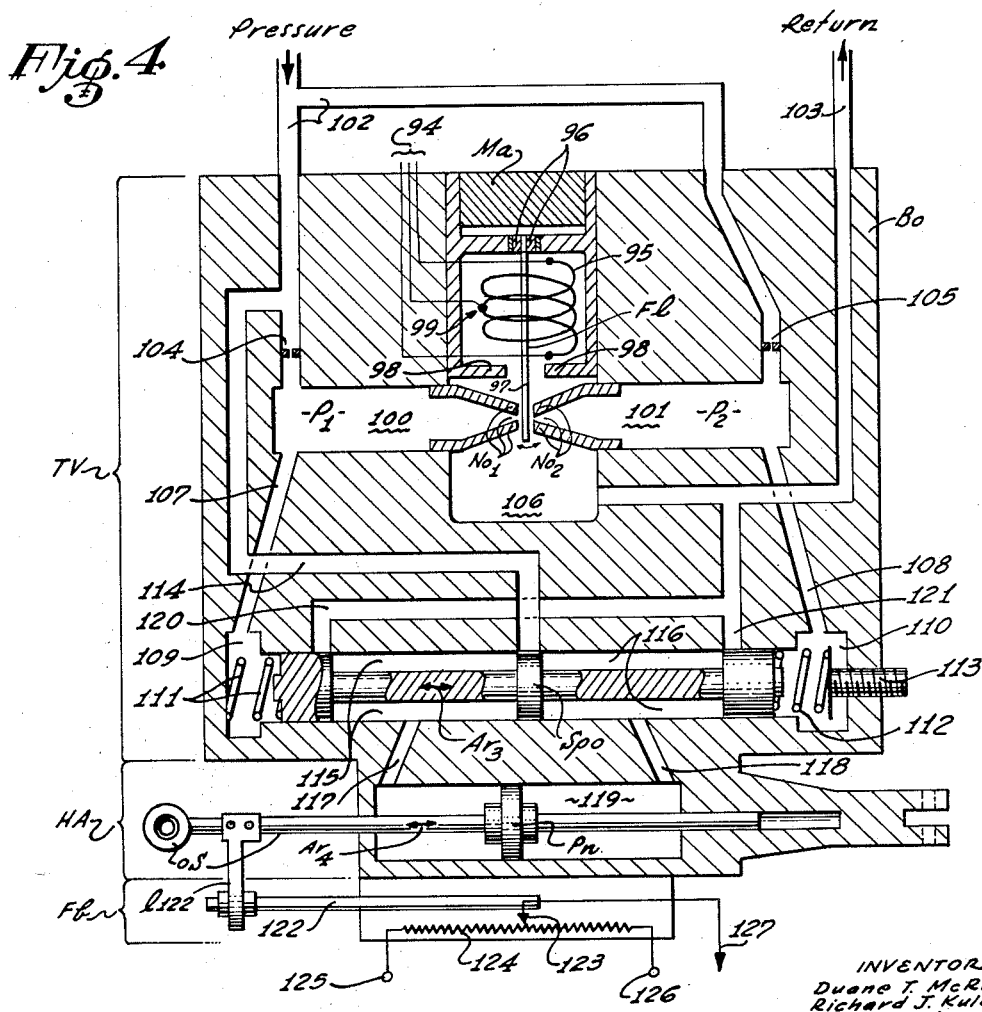

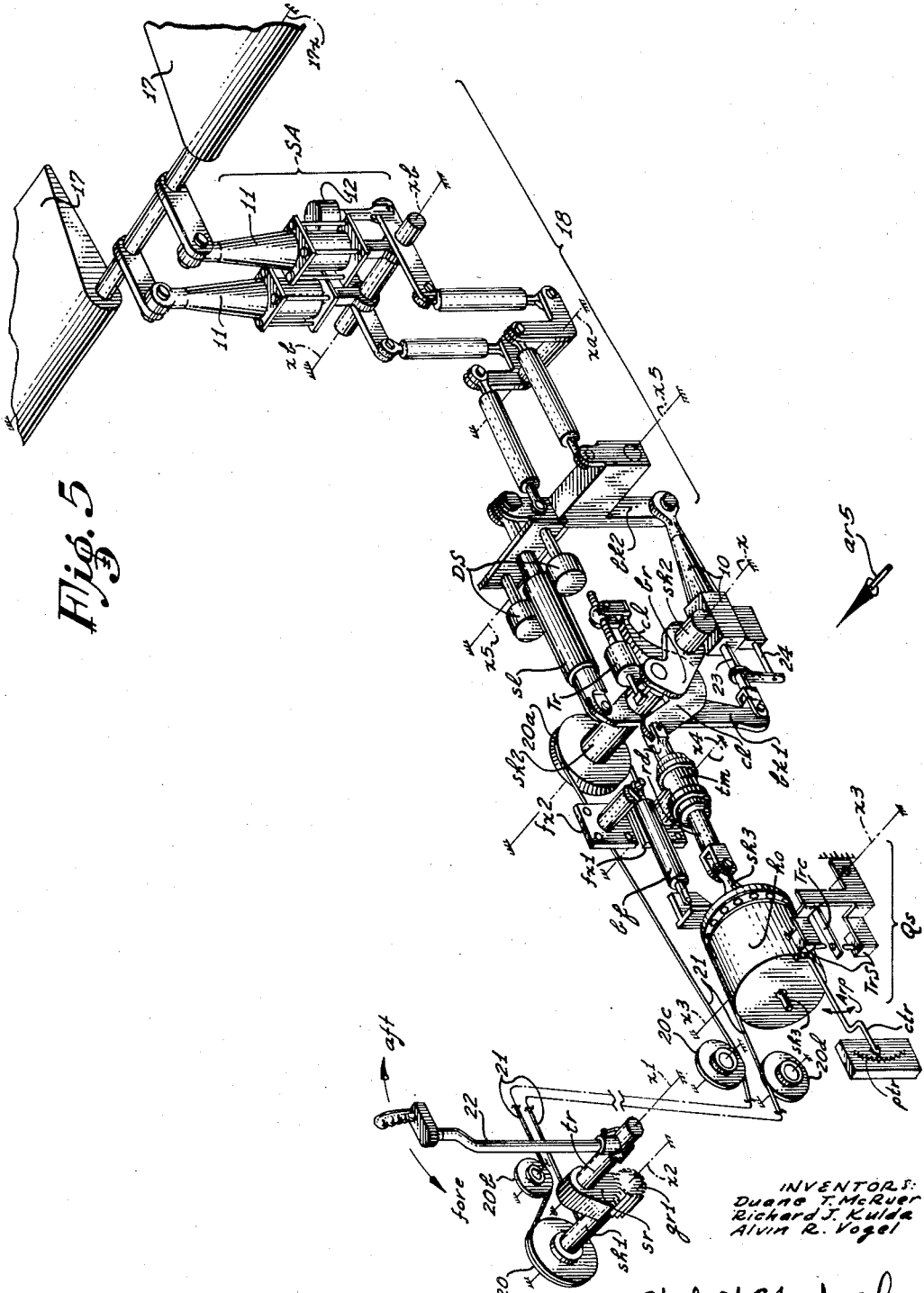

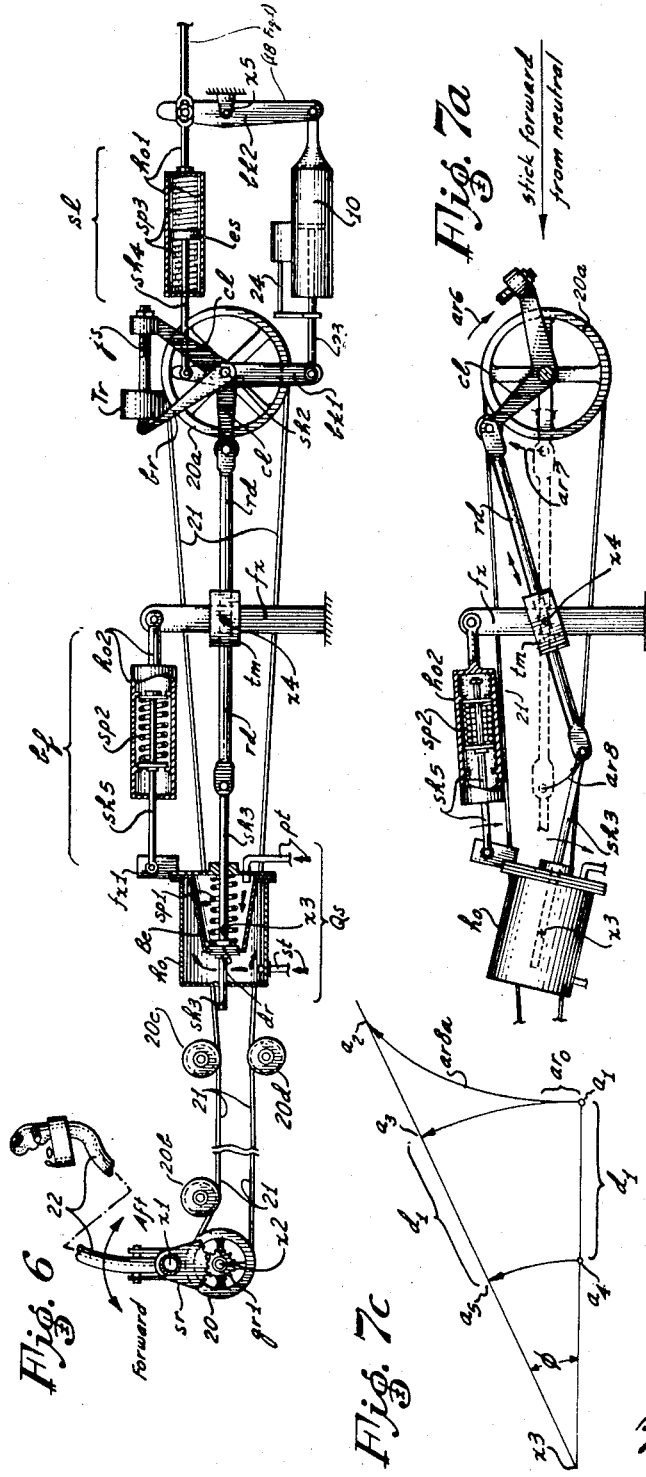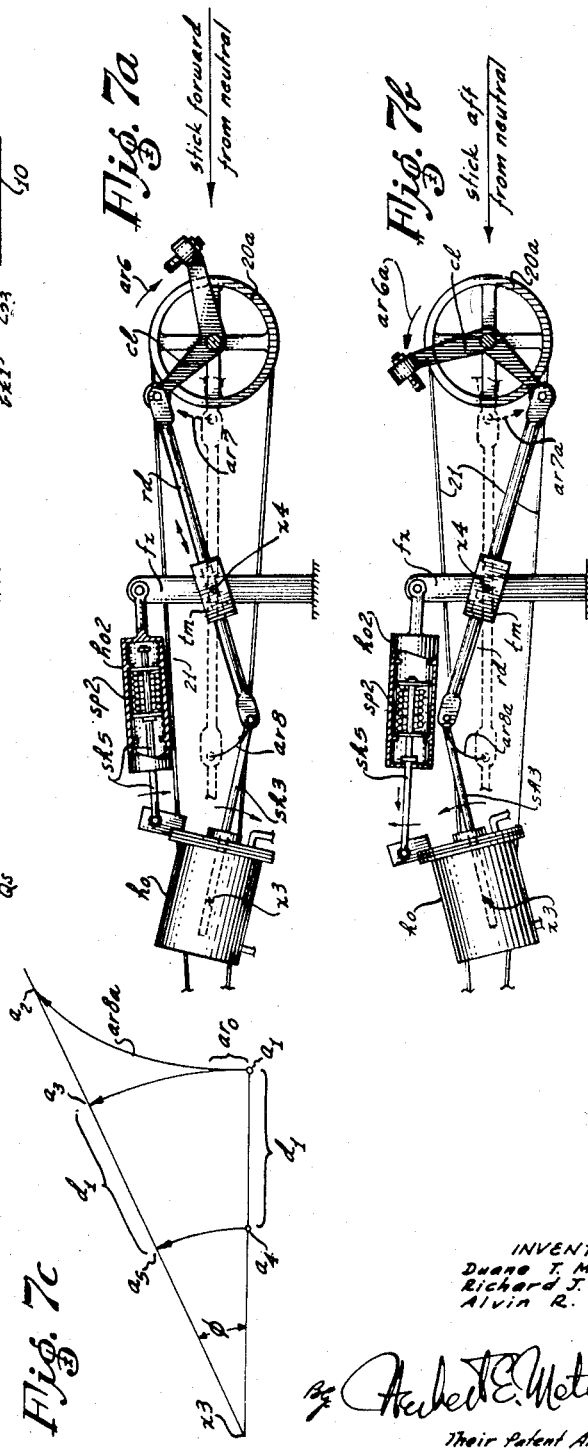

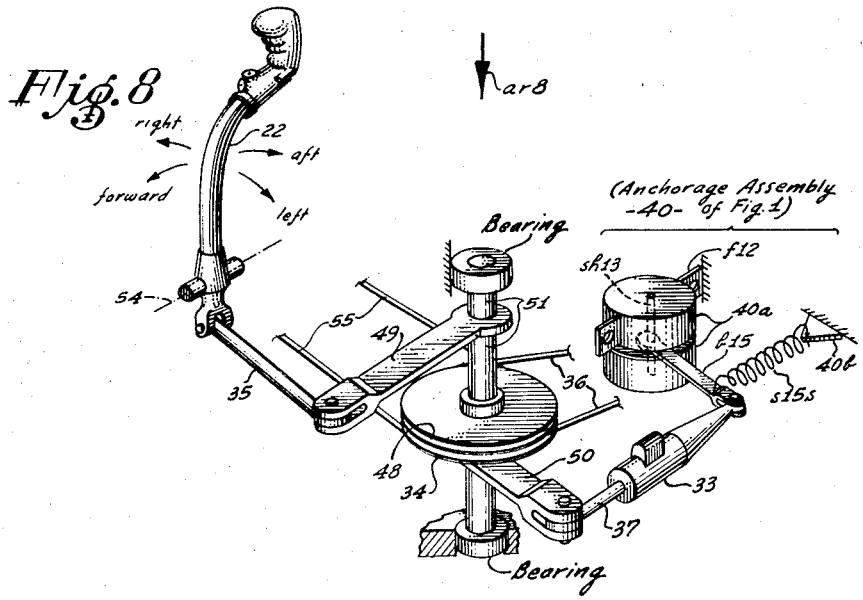
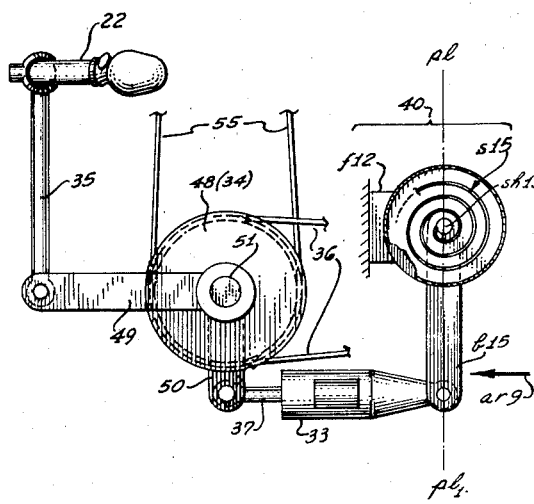
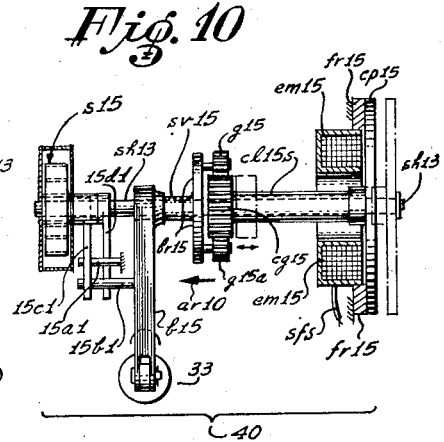

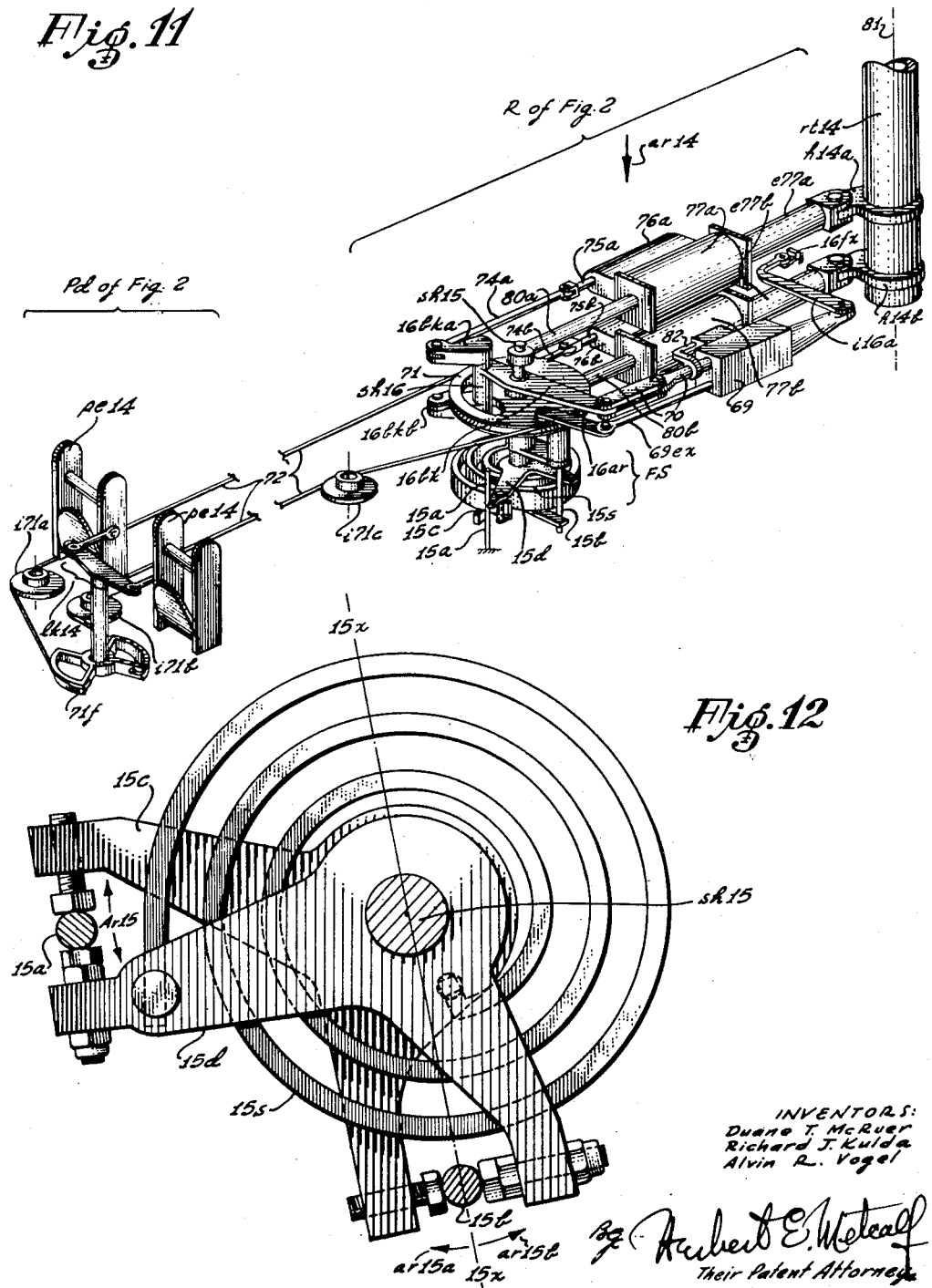

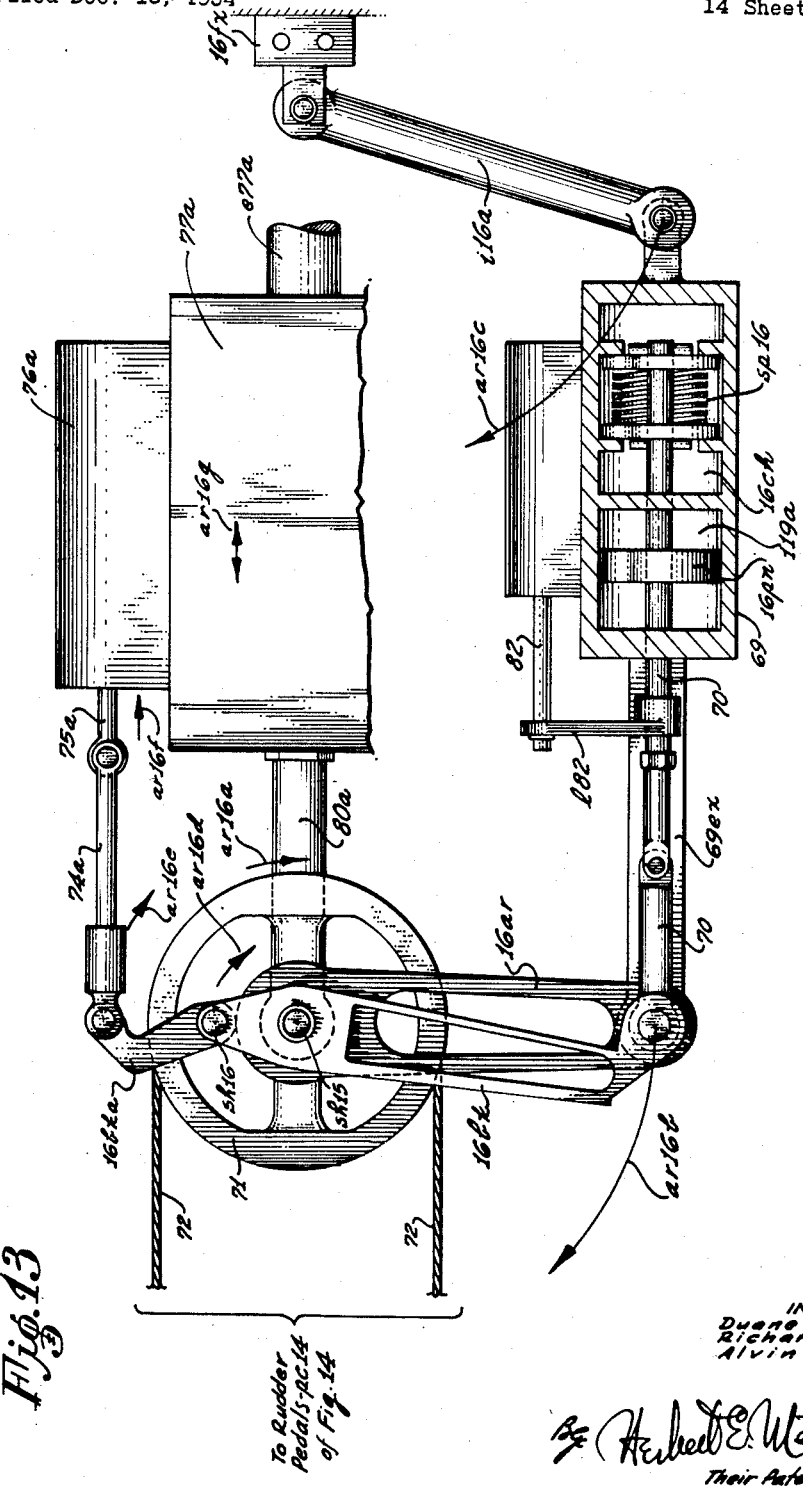

United States Patent Office 2,833,496
Patented May 6, 1958

2,833,496
FLIGHT CONTROL SYSTEM

Duane T. McRuer, Los Angeles, Richard J. Kulda, Redondo Beach, and Alvin R. Vogel, Los Angeles, Calif., assignors to Northrop Aircraft, Inc., Hawthorne, Calif., a corporation of California Application December 13, 1954, Serial No. 474,888

12 Claims. (Cl. 244—77)

The present invention is generally related to systems of automatic and manual aircraft flight control and, more particularly, to a flight control system especially designed for jet-propelled combat aircraft in which the manual and automatic modes of control for all axes are integrated into a single composite system in order to increase the tactical effectiveness of this type of craft.

The primary purpose of a fighter type aircraft is to serve as a tactically effective weapon, and it is therefore the fundamental aim of every component part of such a weapon to enhance this principal purpose. Modern demands in combat craft maneuverability under conditions of flight which encompass greatly extended speed and altitude limits, have had a marked effect not only on airframe design but also on all system configurations involving the control of such craft. Design and mechanization of flight control systems have proceeded not merely on the basis of the performance of individual units but also on the basis of the effect of their behavior on adjacent elements and on the overall system. The well founded concept that a flight controller must be tailored to a particular aircraft has been extended to a careful planning of manual system configurations which must be compatible with automatic flight controllers selected for one and the same type of aircraft. A system design procedure which aims to satisfy all of these requirements, by necessity, involves close examination not only of the statics but also of the dynamics of "conventional" control systems, and implies that the airframe and even the pilot be included as "dynamic blocks" in the overall dynamic system.

In due recognition of these modern requisites, the flight control system which forms the subject matter of the present invention has been evolved with the paramount and ultimate objective to improve the tactical effectiveness of jet-propelled combat craft of the all weather type currently produced by the assignee under the general designation of F89. This increase in tactical effectiveness is the result of a novel type of unification achieved through the integrated design of all control installations, through proper component packaging and elimination of unnecessary duplication. The significance of this unification and integration lies in the unique features embodied therein which constitute an important forward step in the state of the art of overall airframe controller design, manifested by the improved system performance, by the increased system simplification and by the saving achieved in both weight and overall power consumption.

In subordination to the above stated pre-eminent objective, the present flight control system offers many features of improvement whose overall purpose may be collectively expressed in the form of the following outstanding objectives, namely:

(a) to automatically improve the inherent stability characteristics of the class of aircraft herein considered;

(b) to provide automatic means of performing flight control functions wherever human control is inadequate, such as during approach and fire control tracking;

(c) to provide automatic relief flight control so that the pilot's attention may be diverted to functions other than flight control;

(d) to provide a method of fully powered control which yields a uniform ratio between control stick deflections, stick force (=artificial "force feel" at the control stick), and aircraft response irrespective of the flight condition.

Referring to the objective cited under (a), above, the improvements in stability characteristics have been attained through so-called inboard augmentation. Inboard augmentation as used herein is defined as the art of minimizing aircraft displacement and acceleration along any axis of the craft at such times as the latter is subject to full automatic controls which act to hold displacements and accelerations in any axis to a minimum while the craft is under completely automatic control and which improve the flying qualities and tactical effectiveness of the craft while under manual control.

The phenomena of instability which are known to exist for the type of craft under consideration and the methods of automatic stabilization successfully employed in the present flight control system can be briefly stated as follows:

*Lateral stability axis (rudder control.)*—In the lateral stability axis of the airplane, a rolling-yawing-sideslipping oscillation about the flight path, known as Dutch roll, may be created when the airplane is disturbed in roll or heading. This oscillation may be sensed by the pilot, or may be observed on the bank and turn indicator. An experienced pilot can, with some concentration, use these indications to determine the manner in which the rudder must be deflected to oppose this oscillation.

The rudder axis control of the present flight control system automatically opposes the Dutch roll oscillation by deflecting the rudder in accordance with the signals from a sensing element which is basically identical in function to the ball of the bank indicator but whose sensitivity of response is far superior to that of the latter. Since the equivalent of ball deflection is used to control the rudder, the problem of coordinating a turn is also eliminated, and the airplane is essentially two-control. (Reference is here made to assignee's copending patent application Serial No. 342,256 of Thomas A. Feeney et al. entitled, "Sideslip Stability Augmenter," dated March 13, 1953, in which the preferred method of lateral stability augmentation advocated for use in the present flight control system is described in greater detail. Lateral stability augmentation as used herein is defined as the art of minimizing aircraft displacement and acceleration along the "Y" axis of the craft at such times as the latter is subject to full lateral automatic control.)

*Longitudinal stability axis (elevator control.)*—In the longitudinal stability axis, there are two separate vertical oscillations about the flight path which may exist when the airplane is disturbed in pitch due to gusts or due to elevator deflections. One of these oscillations (the phugoid) is of very low frequency and requires an appreciable period of time to decay to a negligible value. An experienced pilot will, in the absence of external visual references, use his airspeed indications in determining the elevator motion needed to oppose this deviation from the desired flight path. In a similar manner, but automatically, the elevator axis of control in the present flight control system opposes this oscillation by deflecting the elevator in accordance with the signals from an airspeed sensing element.

The second of the above mentioned oscillations in pitch is known as the Short Period and is of relatively high frequency and short duration. This oscillation is characterized by large changes in the pitch response of the airplane to elevator deflections as the airplane changes altitude and airspeed. Because of these variations, the pilot has some difficulty in rapidly establishing desired changes in pitch or climb angle at the different flight conditions. These undesirable variations are reduced to negligible values in the present flight control system by controlling the elevator with signals from a sensing element which indirectly measures the changes in angle of attack accompanying the Short Period oscillation. (The methods of longitudinal stability augmentation herein advocated are described in greater detail in assignee's copending patent application Serial No. 371,758 of McRuer et al. entitled, "Longitudinal Stability Augmenter," dated August 3, 1953.)

*Roll and heading stabilization (aileron control).*—Roll stabilization is achieved through conventional control signals from a vertical gyro (roll reference) and from a roll rate gyro (for damping). Heading stabilization is achieved through a "tie-in" with a directional compass system. The methods of stabilization here used take advantage of certain stabilizing effects achieved in the rudder axis system, chief factor being the elimination of sideslip through the automatic rudder control system which has greatly simplified the synthesis of the aileron stabilization system. Stated in plain terms, this means that the automatic aileron axis stabilization system is predicated upon the satisfactory functioning of the sideslip stability augmenter in the rudder axis control system. The advantages of simplification gained by this dependence of one control system upon another can be classified as a typical example of system integration. While it is true that the automatic aileron control system relies upon the automatic rudder control system, this form of dependence does not constitute a limitation of the effectiveness or usefulness of the aileron control system as a whole, since in the case of failure of the sidelip stability augmenter, manual aileron control as well as manual rudder control are at all times instantly available to provide the necessary emergency control.

The successful integration of the above outlined methods of stabilization in the rudder, elevator and aileron channels into a composite streamlined dynamic system is, in part, based upon the following combination of outstanding mechanization features:

(1) A series servo installation in the elevator control system providing automatic longitudinal stability augmentation throughout flight while simultaneously permitting manual or automatic navigation control, a single servo controlling the functions of a stability augmenter as well as of a conventional autopilot;

(2) The series servo under (1), above, favoring the "packaging" of an improved "artificial feel" producer in the longitudinal control system in combination with a trim actuator with variable speed trimming as a function of displacement error from neutral, and further combined with a standby link which also serves as a gear backlash eliminator;

(3) Locating the combined mechanization features of (1) and (2), above, to the rear of the craft in proximity of the surface actuating system and thereby making possible a single cable installation which eliminates an entire elevator cable run of earlier forms of installation;

(4) A parallel servo installation in the aileron control system permitting the direct use of the conventional control stick for aileron command "signals" during autopilot control, thereby eliminating the conventional autopilot cockpit controller;

(5) A series servo installation in the rudder control system providing automatic lateral stability augmentation throughout flight and permitting simultaneous manual rudder control, a single servo controlling the functions of stability augmentation, of a conventional autopilot as well as of a trim actuator;

(6) Locating the mechanization features of (5), above, as well as the rudder "force feel" mechanism to the rear of the aircraft in proximity of the surface actuating system, thereby making possible a single cable installation which eliminates an entire rudder cable run of earlier forms of installation.

(7) Hydraulically powered linear servo actuators in all three axes, precisely controlled by electrical transfer valves, operating on the principle of position error, not force error, and containing only one moving part. Weight of each servo: approximately four pounds.

NOTE.—The design of satisfactory "artificial feel" producers for the class of high speed fighter type aircraft herein discussed has played a significant role in the successful development of the present flight control system. This applies particularly to the longitudinal "force feel" system wherein improvements of the "stick force" characteristics for the critical speed ranges above Mach number .78 as well as for landing speeds have been highly desirable in order to enhance the longitudinal handling characteristics of this type of craft. The present specification, however, will be limited to the showing of a prototype force feel system as well as of a preferred form of mechanization thereof in each control channel. In a similar manner, the description of the electro-hydraulic servo actuators used in the present system will be limited to a more detailed analysis of a prototype servo actuator of this class and to the presentation of preferred methods of installation thereof in each control channel whereas such modifications as a variable authority servo in the elevator control channel which ties in with further refinements in the elevator control subsystem will be likewise omitted from the present specification.

The above cited objectives and mechanization features constitute in part a continuing development of primary flight control systems, i. e., of component block of the overall system, whose design has thus far been established along more or less conventional lines with standard provisions for adaptation to various types of aircraft. Conventional installation practices for incorporation of autopilot servos, for instance, consisted in providing an extra cable groove in a convenient quadrant of a particular subcontrol system in order to allow that system to be driven in its entirety in a "parallel" fashion. "Series" installations which permit both, the pilot and the servos, to operate simultaneously, have not been a part of the concept of either the primary systems referred to above, or of the servo to be installed therewith. Thus, the possibility of providing such desirable modern products of automatic servo control as stability augmentation, decreased control sensitivity, "tuck under" correction, and improved force feel and handling characteristics, all of which are based on the "series" installation system, has been precluded in these conventional designs since the present day conventional servos cannot be adapted to handle "series" installations even if the primary control system were so arranged. In the case of the present flight control system, both the "series" and "parallel" servo installations are specifically designed to accomplish their function for a particular directional axis. In addition, these servos function equally well with either type of installation. "Truckunder" as used throughout this application refers to aircraft stability and control denoting the tendency of an aircraft's nose to drop as the speed of the aircraft increases without accompanying forward movement of the control column. This characteristic normally occurs as the aircraft passes through the transonic flight region.

The above referred to continuing development of established primary flight control systems in the present flight control system applies also to navigation devices and fire control system components as well as to other equipment components destined to facilitate maneuverability of the aircraft during approach and tracking phases thereof.

Most of these devices and systems have thus far been designed on the more or less conventional premise of their contemplated general applicability to various existing systems for manual or automatic control of a general class of aircraft. The novelty of aspects in the present flight control system development comprises in this case the integration of these established primary control systems into an overall system in such a fashion that their individual functions may be utilized and amplified at will either under a manual or under an automatic mode of control of the overall system. For example, navigational equipment known commercially as the (Sperry) A2–Zero Reader has been selected for integration into the present overall flight control system so as to enhance the former's operational capacity within a highly automatized navigation and approach system. The selector switch of the conventional zero reader has been converted into a system selector switch which permits switching operations that establish various "patterns" of flight control under a manual or automatic control-mode of the overall system.

The adaptation of a fire control system for use in conjunction with the present flight control system is another example of this type of system integration.

The wide range of functional features of the present flight control system as presented above in terms of some of its outstanding objectives, can be summarized in the following brief description of the general operation of the system:

The present system is so mechanized that throughout every phase of flight, including cruising, attack, approach, and landing procedures under automatic modes of control, the pilot is always free to manipulate his controls without having to be concerned about manually switching the system from manual to automatic control or vice-versa, the automatic control portion being provided by an aggregate of system components superior in scope to that of a conventional autopilot and obviating the use of the latter. Automatic control functions in this composite system are performed at all times about all axes and are solely interrupted in the aileron channel whenever the pilot actuates the control stick laterally in order to deflect the ailerons, the automatic aileron control mode being re-established upon lateral release of the control stick. Return to automatic operation after release of the control stick is performed in a smooth manner, i. e., without producing any violent airframe reactions. Automatic stability augmentation results in limited rudder and elevator control surface deflections which are not reflected into the pilot's controls. Manual rudder and elevator control preserves its authority over automatic control at all times, but is limited to within dynamically safe deflection ranges and rates by an effective force feel system plus added safety devices. The extent of automatic aileron control surface deflection, in turn, is not limited in this composite system, thus permitting full utilization of automatic aileron control functions in fire control-, approach- and landing-procedures for roll and directional stabilization in conjunction with the lateral and longitudinal stability augmentation features cited above, the manual mode of aileron control being, however, instantly re-established whenever the pilot actuates the control stick laterally.

Further objects, advantages and details of operation of the preferred embodiment of this invention will be more fully understood as the description proceeds, reference now being made to the accompanying drawings, in which:

Figure 1 shows a preferred layout of the present flight control system in a simplified signal flow diagram in which the sensing elements of the stability augmenter installations as well as most of the various navigational control units are represented in block form in the left portion of the diagram, the right portion thereof illustrating essential mechanization features that have been adopted for integration of manual and automatic modes of control surface actuation.

Figure 2 is a schematic of an F89 type fighter plane equipped with the flight control system installations of Figure 1, showing the simplified layout of cable connections used in the present system.

Figure 3 is a block diagram of the hydraulic servo actuator loop inserted in each of the three control surface power actuator channels of Figure 1.

Figure 4 is a detailed schematic sectional view of the prototype servo actuator unit used in the present flight control system, showing layout of electrically driven hydraulic valve, output shaft and feedback potentiometer.

Figure 5 represents in a perspective schematic a more detailed view of the integrated overall elevator control linkage of the present system in one preferred form of execution. (This is essentially an enlarged replica of linkage portion E of Figure 2.)

Figure 6 is a partially sectional schematic profile view of the forward portion of the linkage system of Figure 5 as seen in the direction of arrow $ar5$ of Figure 5, details being simplified in order to clearly illustrate basic operational features.

Figures 7a and 7b show operational phases of the linkage system of Figure 6.

Figure 7c is a geometric sketch explaining details of the operational displacement of component parts of the linkage of Figure 6.

Figure 8 is a schematic perspective view of a preferred form of the forward portion of the overall aileron control linkage used in the present flight control system. (This is essentially an enlarged replica of linkage portion $Ai$ of Figure 2.)

Figure 9 is a plan view of the schematic of Figure 8 as seen in the direction of arrow $ar8$ of Figure 8 comprising a preferred form of anchorage assembly.

Figure 10 represents a detailed, partly sectional schematic profile view of the preferred anchorage assembly of Figure 9 as viewed in the direction of arrow $ar9$ of Figure 9.

Figure 11 shows a preferred execution of the overall rudder control linkage of the present flight control system in a simplified schematic perspective view. (This is essentially an enlarged replica of the linkage portion R of Figure 2.)

Figure 12 shows details of the force spring assembly FS of Figure 11 on an enlarged scale. (This is a schematic plan view of the assembly FS as seen from the top of Figure 11 in a direction downwards along the axis of shaft $sh15$, quadrant 71 and associated linkages having been omitted from the drawing.)

Figure 13 is an enlarged partly sectional plan view of essential components of the overall linkage system of Figure 11 as seen in the direction of arrow $ar14$ of Figure 11.

Figure 14 is a simplified schematic lateral sectional view of control stick 22 of Figure 1 taken in a vertical plane oriented parallel to the longitudinal axis of the aircraft in which the control stick is mounted. (Lower portion of control stick column broken away in order to show preferred form of handgrip base on enlarged scale.)

Figure 15 presents a sectional view of the preferred form of stick force switch assembly, taken in the direction of arrows $ar17$ against the plane Y—Y of Figure 14.

Figure 16:
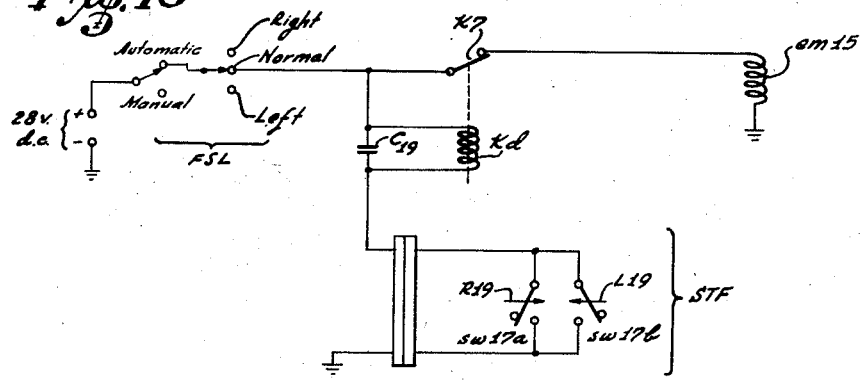

Figure 16 shows a simplified wiring diagram of the stick force switch of Figure 15 illustrating a preferred form of circuit connections to pertinent system control elements.

Figure 17:
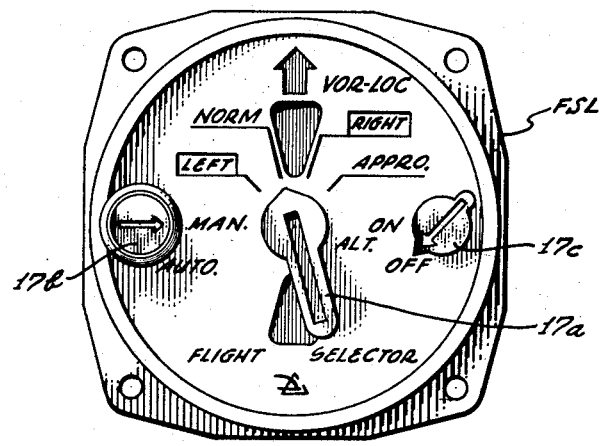

Figure 17 represents a sketch of the front panel of the flight selector switch used in the present system.

Figure 18:
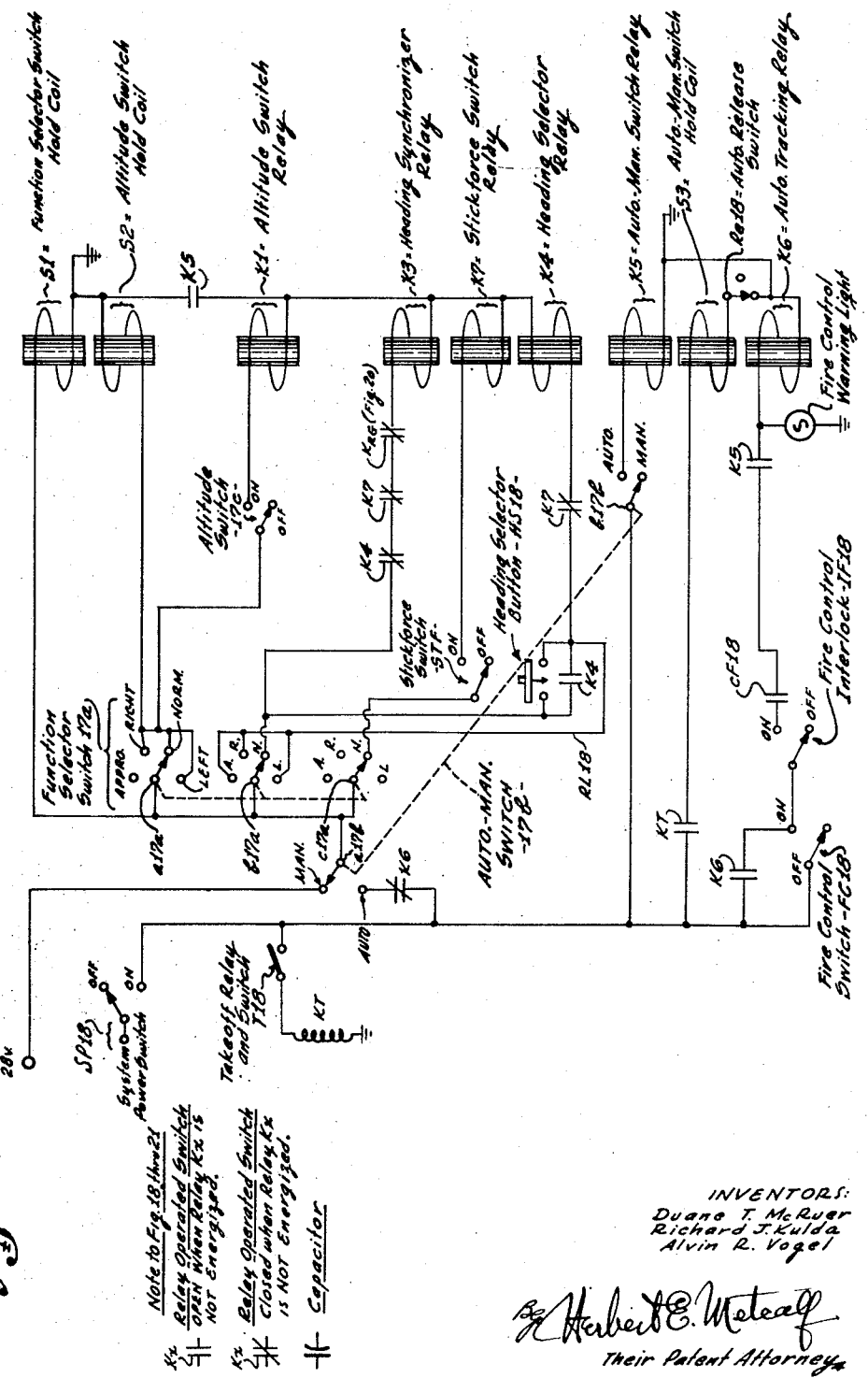

Figure 18 is a simplified wiring diagram illustrating the preferred switching- and relay-circuitry associated with the flight selector switch of Figure 17.

Figure 19:
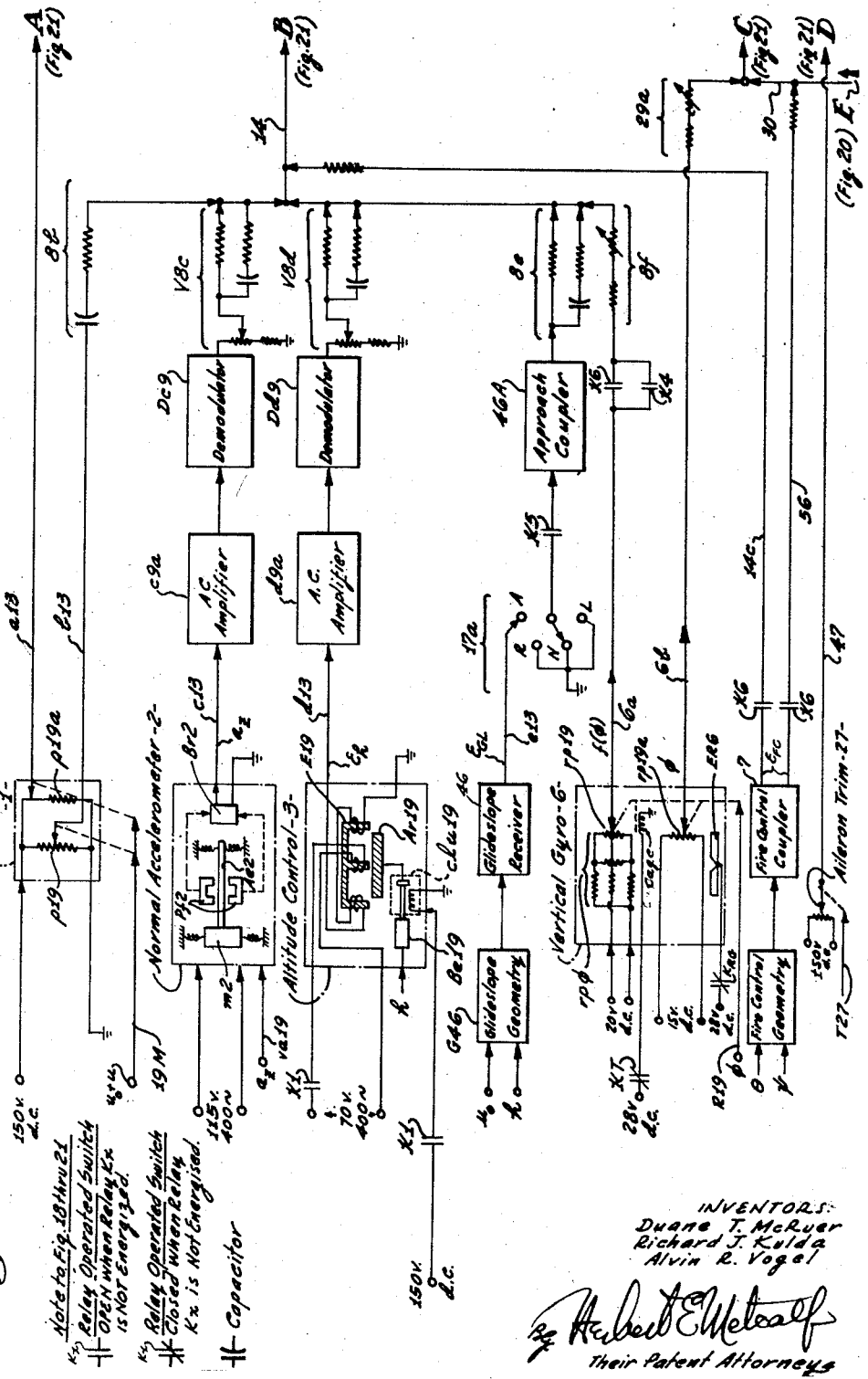
Figure 20:
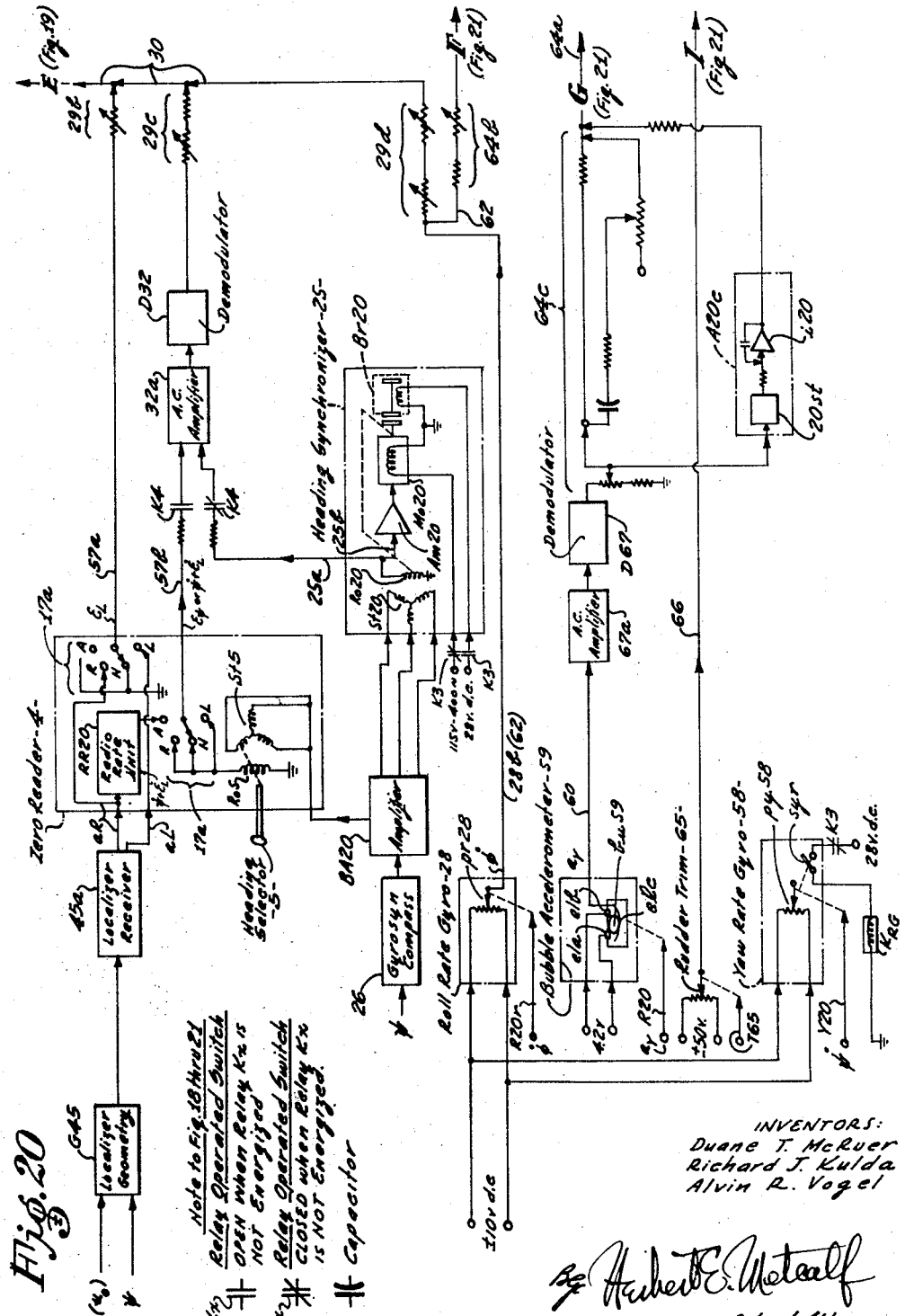
Figure 21:
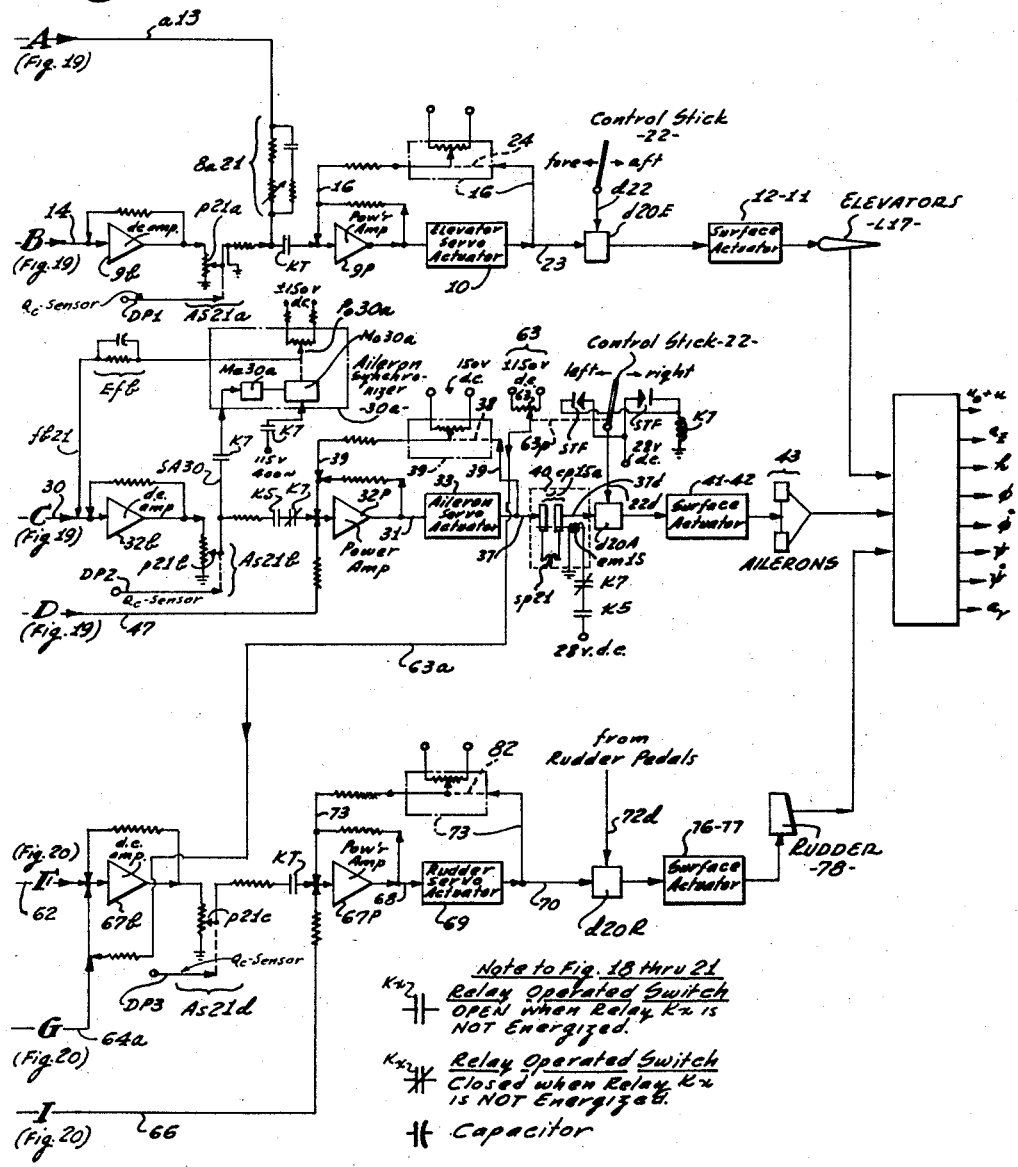

Figures 19, 20, and 21 represent the simplified overall circuitry of the present flight control system, broken up into three convenient sections which, together with Figure 18, illustrate a preferred form of overall organization of system controls.

Referring first to Figure 1, this simplified signal flow diagram is representative of an integrated flight control system which comprises the essential features of the present invention in a preferred form of execution. The drawing is so arranged as to picturize in a more or less symbolic manner:

(a) the distribution of all the essentially automatic airborne signal or error sensing devices of this integrated system (see left portion of the diagram) in their relation to the three principal airframe surface control channels of a hypothetical aircraft whose airframe proper has been omitted from the drawing, the feedlines in each control channel converging on a hydraulically operated servo actuator; and (b) the method of "tie-in" of the individual hydraulic servo actuators into the manual control system in each of the three principal surface control channels (see right portion of drawing).

For a general factual description of Figure 1, the system here presented is suitably divided into the subsystem of elevator control, the subsystem of aileron control, and the subsystem of rudder control. (It is evident that functionally or aerodynamically, these systems cannot be truly separated in this fashion.) In each of these subsystems, component elements are provided whose functions are to automatically derive suitable signals which identify a given relationship of the craft's behavior in flight to that of the craft in stable or equilibrium flight. Expressed more specifically, these elements essentially serve to deliver error signals.

(a) whenever the craft departs unilaterally from an established pattern of stabilized flight, in which case the error signal is instrumental in automatically returning the craft to that pattern of flight and in holding it thereto;

(b) whenever a previously established pattern of flight has been changed intentionally during that flight so that the error signal now becomes instrumental in steering the craft into a new pattern of flight and in stabilizing it thereto; or (c) whenever the craft tends to oscillate in some characteristic manner about a stable flight path while the airframe surface controls are normally in neutral. In the case of these periodic flight path deviations, the error signals identify specific conditions of inherent dynamic instability of the airframe and become instrumental in damping out these undesirable oscillations, thereby acting to improve the stability chracteristics of the craft.

Other essential component elements in each of these subsystems serve to function as so-called "equalizers." An "equalizer" can here be defined as an auxiliary system element whose inclusion in a control system provides suitable "external" means of modifying the performance of "internal" system elements for the purpose of achieving satisfactory overall system performance. A rate network inserted in an error signal channel can be classified as such an equalizer.

Electronic and mechanical instrumentation means represent further essential component elements in each of these subsystems. These elements include amplifiers and other electronic devices which transform the beforementioned error signals into control voltages of suitable shape, phase and power to actuate control mechanisms whose ultimate objective is to deflect the airframe control surfaces in the desired manner. These latter mechanisms (hydraulic servo actuators, power cylinder actuators, etc.), as well as the methods and means of "tie-in" of manual deflection controls (series and parallel connections) and numerous other control elements constitute an additional group of essential mechanization means.

Referring first briefly to the subsystem of elevator control shown in the top portion of the diagram of Figure 1, the signal detecting means allocated to this control channel are divided into sensors pertaining to the particular system of longitudinal stability augmentation herein employed, and sensors pertaining to the various systems or modes of automatic navigational control. Mach sensor 1 and normal accelerometer 2 form part of a longitudinal stability augmenting system which has been described in the introductory text and whose analysis and synthesis is outlined in greater detail in the previously cited reference (assignee's patent application Serial No. 371,758). Zero reader 4 (see introductory text to this specification) is here collectively represented as a single sensing device which, under a specific mode of navigation control (i. e., under control from glidepath receiver 46 which is connected into the system by a special selector switch to be referred to further below), delivers error signals into the elevator control channel (via an approach coupler 46A) whenever the path actually followed by the craft digresses from the prescribed glidepath during landing procedures. (The actual modes of operation of zero reader 4 will not be described in detail, but interconnections thereof with other component units under various control patterns of the present system will be shown in somewhat greater detail with reference to Figures 20 and 21.) Altitude sensor 3 serves as an altitude reference which may be switched into the system at the discretion of the pilot. (See Figure 17.) The error signal from this unit is proportional to the amount of deviation in the craft's altitude from the reference altitude which prevailed at the moment of switching unit 3 into the system. A pitch signal from vertical gyro 6 serves here merely to counteract certain undesirable signals from normal accelerometer 2 (see Figure 19).

The signal components in channel 13 from the above cited sensors or "pick-offs" undergo various processes of equalization (shown in somewhat greater detail in Figure 19). In the present drawing, box 8 collectively represents these equalization processes, the equalized composite signal in channel 14 undergoing successive stages of amplification, culminated by power amplifier 9 which delivers a control signal of adequate power via path 15 to hydraulic servo actuator 10. The various amplifying circuits are of advanced design but will not be further discussed herein.

Pitch signals from fire control coupler 7 (via separate equalizer 7a) provide necessary elevator correction signals during target tracking procedures for which unit 7 must, however, be separately switched into the system circuitry. (See Figure 18. Further description of unit 7 is omitted from the present specification.)

Servo actuator 10 consists essentially of a hydraulic valve (contained in the body of actuator 10 but not shown in the present figure; see more detailed description of prototype hydraulic servo actuator given the reference to Figure 4) whose positional variations are directly controlled by an electrical input signal from channel 15, and of output shaft 23 driven by this valve in exact proportion to these electrical signals. Output shaft 23 is displaced relative to the body of part 10 whenever signals are received from channel 15 but may, for the present, be considered held in a fixed position so that body 10, instead, changes its position relative to shaft 23. Body 10 is connected through linkage 18 (the latter here symbolically represented as being pivoted about a fixed shaft 18a) to control rod 19 and valve 12 which, in turn, serves to drive power shaft 11a of hydraulic power cylinder 11, the latter units providing in a well known manner the necessary torque power for deflecting elevator control surface 17 in accordance with the control signals received. (The method of control surface deflection about fixed axis 17x, provisions for mechanical follow-up, and other well known features in the art are based on essentially identical principles in all three control surface actuating systems shown in the present drawing. See related remarks with reference to the rudder control subsystem described further below.) A potentiometer arm 24 attached to output shaft 23 of servo actuator 10 serves to displace a potentiometer tap (not shown) in accordance with the displacements of shaft 23, thereby providing the required electrical follow-up signal of the servo system which is fed back to power amplifier 9 via channel 16. (See Figures 3 and 4. The prototype hydraulic servo actuator shown in Figure 4 is applicable to the elevator-, aileron-, and rudder-control channels of the present system. As stated in the introduction to this specification, the presentation of the subject matter has been simplified by omitting certain modifications in the elevator servo actuator which are recommended in order to further improve performance of the systems.)

Control stick 22 (see aileron control subsystem in midportion of Figure 1), forward quadrant 20 (inclusive of parts between stick 22 and quadrant 20 which are partly broken away or omitted from the drawing; see Figure 5), cables 21 and quadrant 20a constitute the "forward" portions of the so-called "series" linkage employed in the elevator control subsystem, servo actuator 10 here being inserted in series between these forward portions and the "aft" portions of the overall linkage system constituted by linkage 18 and the control surface power actuating system. Further details regarding this series linkage system will be given with reference to Figures 5 and 6. In the present drawing, output shaft 23 of servo actuator 10 can be visualized as being anchored against quadrant 20a, the latter being "backed up" by the torque resistance of a force spring (not shown) which tends to hold the quadrant in a fixed rotary position. Manual actuation of control stick 22 overpowers the torque resistance of this spring and displaces shaft 23 and actuator 10 as a rigid unit as if the latter constituted a single series "connecting rod" or link in the manual elevator control linkage. (See later remarks referring to the analogous series linkage system in the rudder control subsystem.) Simultaneous automatic control (i. e., automatic control superposed on manual control) under any of the navigation control modes referred to above results from the varying effective length of this "connecting rod" (through motion of output shaft 23 relative to actuator housing 10) which acts to add to, or subtract from, the amount of elevator deflection issuing from manual elevator deflection alone, since the "back-up" torque of the above-cited force spring presents at all times a greater load to servo actuator 10 than the load consisting of linkage 18, valve control rod 19 and valve 12, an additive or subtractive translational motion being thus superposed onto actuator housing 10. This "algebraically added" automatic elevator motion is restricted to well-defined limits. As a further result of the "back-up" action of the force spring, any added or subtracted elevator motion in response to automatic signals fed into actuator 10 is not reflected into the pilot's controls (as a fore or aft motion of stick 22).

Referring now to the subsystem of aileron control shown in Figure 1 beneath the elevator control subsystem just described, it will be recognized that the error signal sensing elements employed in this control channel are solely concerned with the various modes of automatic navigational control already mentioned with reference to the elevator control subsystem. No aileron axis stability augmentation system equivalent to the system associated with longitudinal axis control is used, and as a consequence, preference has been given to a so-called "parallel" linkage system for aileron control which has favored a novel form of integration of manual and automatic control modes while permitting full utilization of the available automatic navigation control signals.

The individual signal detecting elements or sensors which contribute in establishing the various automatic flight control modes in the aileron control subsystem are the J-2-Compass system 26, the roll rate gyro 28, the vertical gyro 6, the omnirange receiver 44, and the localizer receiver 45. The distribution of signals from these units is controlled by a flight selector switch (not shown in the present drawing; see Figure 17). The desired navigation mode is selected by the proper setting of this switch, whereupon the pertinent signal detecting elements deliver error signals (if present) into the assigned channel(s) while the remaining sensors stay disconnected therefrom.

Roll signals from fire control coupler 7 are delivered into the aileron channel via line 56 under a switching control (not shown) which is independent from the above cited selector switch. (See switches in Figure 18.) An electric aileron trim signal from potentiometer knob 27 may further be provided via channel 47 whenever needed.

The functions of equalizer 29 and power amplifier 32 are analogous to those mentioned in connection with the corresponding units 8 and 9 in the elevator channel, boxes 29 and 32 here likewise representing "lumped" units. (Boxes 25 and 30a represent a heading synchronizer and an aileron synchronizer, respectively, whose functions will be explained further below.) The above mentioned analogy applies also to the basic structure and functions of hydraulic aileron servo actuator 33 to which the power signal from unit 32 is delivered via line 31. (See prototype hydraulic actuator illustrated in Figure 4.) However, the method of linking this servo actuator with the manual aileron control system differs from the previously described linkage system employed for elevator control. It is a "parallel" linkage inasmuch as any motion of output shaft 37 of actuator 33 is reflected into control stick 22 as well as into aileron control surface(s) 43 (viz., any motion of shaft 37 results in a lateral displacement of stick 22 as indicated by the direction of arrows "left" and "right" in the drawing, while at the same time producing an "up" or "down" deflection of the left aileron 43 shown in the drawing, and a "down" or "up" deflection, respectively, of the right aileron which has been omitted from the drawing). These simultaneous or "parallel" automatic deflections of control stick and ailerons are due to the fixed anchorage provided for the housing of actuator 33 during any of the automatic control modes of the system, as well as due to the form of linkage established between output shaft 37 and control stick 22 on one hand, and between output shaft 37 and aileron(s) 43 on the other.

Under automatic system control, an anchorage release mechanism which preferably comprises a coupling in the form of a clutch (the release mechanism here being symbolically represented by parts 40) remains sensitized, causing the coupling (not shown) to provide an inflexible support for the housing of servo actuator 33. (One preferred form of actual execution of this mechanism 40 will be described in greater detail with reference to Figures 8, 9, and 10). Displacement of output shaft 37, under these conditions, results in a torque applied to shaft 51 via bracket 50, the latter forming a connecting link between these two shafts that is firmly attached to shaft 51. Since bracket 49, which links shaft 51 with push rod 35 and stick 22, is also fixed to shaft 51, the torque on the latter shaft can be seen to be converted into a pushing or pulling lever force that acts on the lower end of stick 22 in a lateral direction, thereby rotating stick 22 about a longitudinally oriented pivotal axis 54. Pulleys 34 and 48 are likewise firmly attached to torque shaft 51. Pulley 48 is here shown to be linked to the left aileron 43 via a cable-and-push-rod system collectively represented by parts designated with numerals 36 and 52, via valve control rod 53, valve 41 and power cylinder housing 42, power shaft 42a here being shown supported against fixed structure 42b. Functions of these latter parts (53, 41, 42, 42a, 42b) are analogous to those of parts 19, 12, 11, 11a, and 18a, respectively, of the elevator control system previously described, the pivotal axis for aileron rotations being represented by line 43a. (The actual aileron operating mechanism differs in detail from that sketched in the present figure).

Pulley 34 is similarly linked to the right aileron (not shown) by parts omitted from the present drawing which correspond to parts 52, 53, 41, 42, 42a, 42b of the left aileron linkage system. Broken-off cables 55 suggest portions of the right aileron cable-and-push-rod system which is "rigged" to produce a sense of aileron deflection opposite to that of aileron 43.

The magnitude of automatic aileron deflections in response to the various control signals fed to actuator 33 (i. e., the magnitude of displacement of shaft 37 relative to actuator housing 33) is not subjected to limitations (in contrast to automatic elevator control and, as will be shown, also in contrast to automatic rudder control) so that the full amount of permissible aileron deflections can be utilized in any one of the available modes of automatic control.

Under manual aileron control, viz., under lateral actuation of control stick 22 (see below), the above cited clutch coupling of anchorage mechanism 40 becomes desensitized, whereby the rigid support for the housing of actuator 33 is released and replaced by a spring support (spring not shown, but pertaining to mechanism 40; see Figure 10). At the same time, shaft 37 of actuator 33 is returned to its null or trim position. These actions (executed through the aid of relays not shown) effectively convert the aileron servo actuator (i. e., housing 33 and output shaft 37) into a passive resilient retaining link of unit length which is added to the overall linkage essentially made up of parts 22, 54, 35, 49, 51, 50 and anchorage mechanism 40, the spring support of the latter mechanism providing the necessary resilience which permits stick 22 to be laterally displaced by manual means and, at the same time, furnishing the pilot with a lateral "force feel" or deflection load at the control stick that is proportional to stick deflection from neutral. It is clearly seen that such manual stick deflections also lead to aileron deflections, while the "parallel" linkage member made up of actuator 33 and shaft 37 merely follows through a translational motion, differences in the overall spacing between part 50 and the anchorage point of the retaining spring being taken up by the resilience of this spring. Clutch disengagement results from action of a force switch built into the top portion of stick 22 (not shown in the present drawing) which is turned "on" whenever a minimum lateral pressure of one pound is exerted upon the stick grip. This switch and the relay actions associated therewith will more fully be described with reference to Figures 15 and 18. The spring support for actuator 33 (= force spring for manual control) will be shown in its preferred form of actual execution as part of the anchorage mechanism 40 represented in Figures 9 and 10. In conjunction with the above cited Figures (15, 18, 9, 10), several additional features relating to the role of the aileron servo actuator, of the stick force switch, the anchorage retaining spring and of boxes 25 (heading synchronizer) and 30a (aileron synchronizer) during manual and automatic control will be duly explained. Release of control stick 22 (deenergizing of the above cited force switch) normally returns the aileron control system to the mode of automatic control to which the beforementioned selector switch happens to be set. This transfer from manual to automatic control or, vice versa, the transfer from automatic to manual control, is seen not to require any "conscious" switching action on the part of the pilot and will not produce any noticeable reaction on the airframe, barring extreme conditions of maneuver. In order to sustain the manual control mode during phases of flight which call for rapid changes in aileron deflections, re-engagement of the clutch in anchorage mechanism 40 is delayed by a timing relay (not shown) so that the pilot may change from a left control stick deflection to a right control stick deflection and vice versa—which in both cases involves a temporary release of lateral pressure during changeover and consequent opening of the force switch—without intermittent return of the system to the automatic control mode in force. This time relay is shown in the wiring diagram of Figure 16. (For additional features of transfer from automatic to manual control, and vice versa, see text accompanying Figures 18–21).

An illustrative example of the integration of manual and automatic control modes in the aileron control subsystem can now be given. Let it be assumed that the hypothetical craft of Figure 1 is cruising along a chosen course and that the beforementioned flight selector switch has been turned to a position which establishes the necessary control signal flow for automatically maintaining this mode of flight. (Switches 17b and 17a of Figure 17 in their respective positions "auto" and "normal." For the present illustrative example, no further description of this flight selector switch will be required, nor is it deemed necessary to account for a number of relays omitted from Figure 1 which are associated with the operation of this switch and whose functions will be later briefly explained with reference to Figure 18.) Under this assumed mode of flight, the clutch in anchorage mechanism 40 of Figure 1 holds aileron servo actuator (housing) 33 in a fixed position relative to the craft's structure so that displacements of shaft 37 in response to control signals from channel 31 result in corresponding corrective aileron deflections. No control signals will, however, be present in channel 31 as long as the craft maintains its level flight along the established course (except for a constant trim signal from part 27, if aileron trim has been applied). A rate signal from roll rate gyro 28 and a roll error signal from vertical gyro 6 will develop if the craft is laterally disturbed from level flight. Any departure from the correct heading will generate a heading error signal which will originate either in heading synchronizer 25 or in zero reader 4, depending on which of the two available automatic heading control modes the pilot has previously selected when he decided upon his present course. (Heading control through the heading selector knob 5 of zero reader 4 has been retained in the present system for reasons of convenience. This facility represents a duplication of control not essential to the satisfactory operation of the system under discussion since the same facility is here available through direct control stick operation as will be seen presently.) Assume that the craft originally has been heading east and that the pilot has turned the craft manually to its present northerly heading. In doing so, i. e., when actuating stick 22 for a manual left turn, the pilot not only had "unconsciously" cut off the automatic mode of aileron control (in the manner already briefly described above), but he had also affected the mode of operation of heading synchronizer 25 inasmuch as the latter, through the instrumentality of the beforementioned stick force switch, had been "commanded" to "track" the compass heading signal from unit 26 as the turn proceeded, while previously, i. e., under automatic cruising control, this same unit 25 had acted to measure the difference between its own "fixed" or "locked" heading and that of the compass unit 26. As a consequence, when the pilot had released stick 22 upon completion of the desired heading change, heading synchronizer 25 meanwhile had tracked the compass heading from unit 26 to its present northerly heading. Release of stick 22 has returned the present system to its previously selected automatic mode of control. This automatic and "unconscious" switch-over to automatic flight control has involved not only the previously explained return to fixed anchorage for aileron servo unit 33 but also an operational changeover for heading synchronizer 25 to its automatic control mode in which the newly acquired northerly heading is held in a fixed position as a new reference. Thus, if henceforth the craft deviates from its new heading, the compass heading signal from unit 26 also deviates from the heading of unit 25, giving origin to a heading error signal in channel 25a—30—31 that acts upon servo shaft 37 to introduce a corrective aileron deflection.

As an alternative mode of control, the pilot might have chosen to utilize the facilities of zero reader 4 (i. e., heading selector knob 5) in order to turn the craft from its previous easterly heading to the present northerly heading. To this end, he would have been required to push a heading selector button (not shown in Figure 1 but identified under number HS18 in Figure 18) which thereupon would have acted to eliminate the error signal from heading synchronizer 25 that normally would have issued under the established automatic cruising mode of the system. Prior to pushing the heading selector button, he would have set heading selector knob 5 of zero reader 4 to the selected northerly heading, thereby introducing an error signal against the prevailing easterly compass heading of unit 26 (which is fed to unit 4 by way of line 26a; see Figure 20). This error signal thus would have replaced the signal from heading synchronizer 25 in channel 25a by a "lumped" heading error signal in channel 57 which would have acted to turn the craft until the signal had been reduced to zero, viz., until the craft had reached its northerly heading. Thereafter, any deviation from the new course would have registered as a new difference between the compass heading of unit 26 and the heading set into knob 5 whereupon a corresponding corrective heading error signal in channel 57 would again have appeared.

If the pilot selects to "take over" in the middle of such a turn to change back to, say, a more easterly heading, he may actuate stick 22 at any time, thereby introducing (after a delay) the manual mode of control previously outlined, which acts also to eliminate the heading error signal in channel 57 in case the facility of knob 5 has previously been utilized, besides returning heading synchronizer 25 to its normal control function. This manual mode of aileron control may be considered a transitory interruption of the automatic aileron control mode, established by the setting of the beforementioned selector switch of Figure 18.

Box 30a represents an aileron synchronizer which acts on the roll signal from vertical gyro 6 in much the same manner in which heading synchronizer 25 acts on the heading signal from the (Sperry–J–2) gyrosyn compass system 26. In other words: when the present flight control system is under a cruising mode of control (i. e., when the beforementioned selector switch of Figure 17 is set to positions "auto" and "normal"), the aileron synchronizer remains "locked" to the roll angle which prevailed at the time of switchover of the system to the cruising mode of control. Since the roll angle is normally zero when the craft is set to cruising, this zero roll angle henceforth serves as a reference, and any deviation from zero roll angle therefore results in a roll correction signal to the ailerons which acts to deflect the ailerons in a sense so as to return the craft to the laterally level reference attitude. When the control stick is laterally actuated, the same previously cited stick force switch which now causes heading synchronizer 25 to track the heading signal from unit 26, causes also aileron synchronizer 30a to track the roll signal from unit 6 and the roll rate signal from unit 28. The purpose of inserting this aileron synchronizer into the signal channel of the aileron control sub-system is two-fold. In the first place, unit 30a is a necessary adjunct to the stick force switch. If, for instance, the pilot executes a protracted manual aileron turn at a more or less constant roll angle and constant yaw rate, a banked flight condition may arise in which the control stick is "unwittingly" returned to neutral and the lateral pressure against the stick grip released. In order to prevent, at such instances, an undesired resumption of the automatic cruising mode of control of the craft, a switch is provided in yaw rate gyro 58 (the latter shown only in Figure 20; see switch $syr$) which closes when a yaw rate of $\geq .4 \pm .15$ degrees/second is reached and which thereby acts to block the effect of the opening of the stick force switch on heading synchronizer 25. As a consequence, the heading synchronizer continues to track as long as the indicated yaw rate prevails. Aileron synchronizer 30a, however, is allowed to "lock" due to the opening of the stick force switch. Since this locking takes place at the prevailing bank angle, the system henceforth acts to maintain this bank angle as long as the stick force switch remains open, thereby executing automatically what the pilot had in mind to do during any such periods in which he happens to hold the control stick inadvertently in a neutral position. The aileron synchronizer, in conjunction with the yaw rate switch, thus provides automatically banked attitudes as an additional convenience besides preventing unwanted effects of the stick force switch. Any closing of the yaw rate switch in response to non-piloted commands (such as yaw rate due to gusts) has no effect on the system as long as the stick force switch is open. (For further details regarding also the orientation of associated relays, etc., consult Figures 18–21.)

The illustrative examples of integration of automatic and manual modes of control in the aileron channel subsystem which have been submitted in the preceding paragraphs, apply specifically to the cruising mode of control of the present flight control system. In any other automatic control mode to which the beforementioned selector switch may be set, such as approach on the localizer beam, glide path descent or omnirange control, as well as under the separately controlled coupling to the fire control system represented by unit 7 in Figure 1, integration of automatic and manual control modes is carried out in essentially the same manner.

Proceeding now to a general description of the subsystem of rudder control shown in the lower portion of Figure 1, the signal detecting means apportioned to this control channel can be identified as pertaining solely to the system of lateral stability augmentation which has been selected for integration into the overall flight control system under discussion. The rudder control system, thus, is shown to be essentially independent in its operation from signal sources associated with any of the navigation control means previously outlined in connection with the elevator and aileron control channels. There is, however, a marked dependence, aerodynamically speaking, from certain controlling elements in the aileron system, just as there exists also, in the reverse sense, a dependence of certain aileron control functions on the proper execution of certain rudder control functions. These relationships have been thoroughly analyzed in the design of the present flight control system but will not here be further discussed.

The stability augmentation principles utilized in the rudder control channel of the present flight control system are essentially those propounded in assignee's previously cited patent application Serial No. 342,256 in which the function of such signal detecting means as lateral accelerometer 59 and aileron (stick position) potentiometer 63 shown in Figure 1 are explained in greater detail. For the present outline of the operating principles involving the rudder control subsystem of Figure 1, it suffices to point out that the control signals from the above cited accelerometer 59 and aileron potentiometer 63 which appear in channels 60 and 63a, respectively, as well as the signals emanating from roll rate gyro 28 into channel 62, undergo modifications in equalizer 64 in a similar manner as those outlined with reference to the analogous units 8 and 29 in the elevator and aileron control channels, respectively. An electrical rudder trim signal from a potentiometer 65 is here added via channel 66 to the equalized control signal in channel 64a. (A preferred version of rudder trim is the automatic trim control shown in Figure 20 which will be briefly explained with reference to this latter figure.) Box 67 represents a power amplifier whose output signal in channel 68 operates rudder servo actuator 69 in a manner analogous to the previously cited control of servo actuators 10 and 33 in the elevator and aileron channels, respectively. The method of "tie-in" into the manual rudder control system constitutes a series linkage system similar to that of the elevator control channel. Output shaft 70 of actuator 69 may here again be visualized as being anchored against a quadrant 71, the latter being "backed up" by the resisting torque of a force spring (not shown) which tends to hold the quadrant in a fixed rotary position when shaft 70 moves relative to actuator (housing) 69. Since the load acting against actuator 69 through the linkage system 74 (the latter being attached to actuator housing 69 and pivoted about a shaft 79 which is fixed to the craft's structure, the load consisting principally of that of valve 76 actuated via input shaft or valve control rod 75 which is driven via linkage 74) is at all times smaller than the force spring load acting against shaft 70, the housing of actuator 69 will be displaced relative to the "anchored" servo shaft 70 in proportion to the sense and magnitude of the control signal from channel 68 whenever such a signal acts to excite the electro-hydraulic valve contained in servo actuator housing 69 (see Figure 4). Thus, for any automatic rudder control action, housing 69 is displaced from the effectively fixed support of shaft 70 as if the actuator housing constituted the output shaft. Valve control rod 75, in consequence, will be likewise displaced in proportion to the control signal from channel 68. This results in a known manner in a proportional displacement of output shaft 80 of power cylinder 77 relative to the housing of the latter (actuating valve 76 and power cylinder 77 being contained in one single housing). However, since shaft 80, as shown, is firmly anchored against fixed shaft 79, housing 77 will be displaced in lieu of shaft 80 and will therefore act to rotate rudder 78 about axis 81 in proportion to the prevailing control signal. This arrangement provides also for the necessary mechanical follow-up action inasmuch as valve control rod 75 is returned to neutral as soon as rudder 78 has reached the deflection angle corresponding to the control signal. The electrical equivalent of this mechanical follow-up linkage is established at servo actuator 69 through potentiometer arm 82 which moves with output shaft 70 relative to actuator housing 69, thereby displacing a potentiometer contact (not shown), in proportion to the error signal from channel 68. This, in turn, generates a follow-up signal in channel 73, the latter being in a known manner phased in opposition to the control signal from channel 64a and attaining a magnitude representative of the deflection angle of rudder 78 from neutral. Hence, if through the aerodynamic effects of this rudder deflection, the control signal in channel 64a is caused to disappear, the follow-up signal from channel 73 will solely remain to excite power amplifier 67, and due to its opposite phasing, will cause rudder 78 to return to neutral.

Cables 72 and pulley 71 constitute the "forward" portions of the "series" rudder linkage system, cables 72 connecting to the pilot's rudder pedals which have been omitted from the present drawing.

The beforementioned force spring torque which tends to hold pulley 71 in a fixed rotary position is overpowered by the torque applied onto this same pulley 71 via cables 72 through actuation of the rudder pedals. From the viewpoint of "manual" rudder operation, rudder servo actuator 69 inclusive of output shaft 70 represents merely a connecting link mounted in series with the manual rudder control system. Whenever the rudder pedals are actuated, this series link is translationally displaced as a single rigid unit. (The position of shaft 70 relative to actuator housing 69 remains unaffected by this manual operation since the piston, shown in Figure 13 as part 16pn in cylinder 119a, which forms an integral portion of shaft 70, is firmly held in its position relative to the housing by virtue of the hydraulic pressure in cylinder 119a, this cylinder in turn forming an integral part of housing 69.) If the automatic rudder control system is simultaneously operative, the effective length of this series "connecting rod" changes correspondingly (through displacements of shaft 70 relative to actuator housing 69), an additive or substractive translation thus being superposed onto the translatory motion of this link which is caused by manual operation alone. The same superposition occurs consequently also at rudder 78, automatic deflection angles being algebraically added to the manually imposed rudder deflection angles. The magnitude of automatic rudder deflection, however, is restricted to well defined limits (as, for instance, through limiting of the power signal in channel 68). As a further result of the anchorage offered by the restraining torque of the precited force spring which acts on the shaft of pulley 71, none of these added automatic rudder deflections are reflected into the pilot's rudder pedals. The actual preferred form of mechanization of the rudder control channel of the present flight control system is described in connection with Figure 11.

With the preceding account of the rudder control subsystem, the general qualitative description of the representative flight control system of Figure 1 has been completed. In turning now to a closer examination of significant components of the present system, only those features of the overall system structures will be singled out which represent a marked departure from more or less conventional forms of execution and which therefore contribute in some measure to the various aspects of novelty of the present invention. In matters concerning artificial stability (known also as "inboard stabilization" or "stability augmentation") attention is again directed to assignee's beforementioned patent applications Serial No. 342,256 and Serial No. 371,758 in which all salient features of the representative stability augmentation systems (i. e. of the methods of lateral and longitudinal stability augmentation, respectively, which have been utilized in the present flight control system) are duly described. These single-axis augmentation systems have been combined with the aileron axis stabilization modes of the present flight control system so as to form a compatible and effective overall system which markedly improves the stability characteristics of the aircraft about its three principal axes. While they constitute novel combinations within the flight control system under discussion, details thereof will not further be described.

A more detailed investigation of significant system components can be simplified by first singling out those component units which can be found in all three surface control channels and whose basic physical characteristics are essentially identical in each channel (such as the amplifier sections and servo actuators collectively designated in Figure 1 with numerals 9, 32, 67, and 10, 33, 69, respectively). The discussion of a given prototype component, as for instance that of a prototype servo actuator, is conveniently made applicable to the corresponding basic unit in each control channel, the individual detailed methods of linkage adopted in each channel being left for later discussions.

The singling out of "prototype" or "packaged" system components serves also to emphasize a salient feature of the present flight control system concept which has already been stated in the introduction to this specification and which encompasses a design philosophy aimed at building "flexible" component blocks which are basically streamlined to modern aspects and demands in the art and, as such, can be readily adapted to tomorrow's changes in the configurations of overall control systems without requiring any major re-design. (Of these "packaged" system components, only a prototype servo actuator unit will be shown in greater detail. All "packaged" amplifier units of the present systems—which comprise interesting detail features of unification and simplification—are omitted from the present specification. See circuitry shown in Figures 11-14 of assignee's previously cited patent application Serial No. 371,758 which in its essence is also applicable to corresponding amplifier units of the present system.)

Referring now generally to a prototype servo actuator which is representative of any one of the units 10, 33, and 69 of Figure 1, it is well known that, because of the non-linear loads into which these actuating elements must operate, the latter are usually designed as positional servomechanisms (i. e., the electrical command appearing in the input channel of a unit is compared with an electrical voltage proportional to the output position of the servo, and the difference, or error, is used to actuate the servo; proper design of the servo makes it unaffected by variations in load, and the output position is proportional to input voltage). As a departure from conventional systems of automatic controller operation in aircraft (for example one in which a hydraulic valve, such as unit 12 in Figure 1, actuates a piston in a power cylinder controlled from a quadrant driven via a cable system that is linked to the output shaft of a servo motor and connected in series, or in parallel, with a manually operated cable system and in which angular rotation of the servo motor shaft is a function of the deflection signal from the sensor, an improved automatic actuator system has been developed for the present flight control system whose general layout has already been discussed with reference to Figure 1. In a preferred form of execution, this improved system of automatic control surface actuation makes use of a hydraulically powered linear servo which is precisely controlled by an electrical transfer valve that operates on the principle of position error and contains only one moving part. The simplified block diagram of Figure 3 shows how the essential components of this hydraulic actuator servo system, i. e., power amplifier PA, transfer valve TV, hydraulic actuator HA, and feedback potentiometer Fb, are combined in a closed loop system, whose output 93 serves to drive the hydraulic valve which controls the surface actuating power cylinder (such as parts 12 and 11, respectively, of Figure 1, in which case part PA of the present Figure 3 would be equivalent to part 9 of Figure 1, and parts TV, HA of Figure 3 would be representative of portions of part 10 inclusive of shaft 23 of Figure 1). The use of a hydraulic servo actuator (i. e., of a transfer valve which is electrically driven by the amplified control signals from a sensor and which, in turn, drives an output shaft that actuates the power cylinder-valve just referred to) does not entail installation of additional piping since the hydraulic power provided for the surface control system is always adjacent to the ideal location for this servo actuator. Furthermore, the hydraulic power requirements of the transfer valve are insignificant compared with the demands of the primary control cylinders so that no increase in pump size is necessary. Since the electrical power required to drive the transfer valve is very small (.1 watt maximum), only a low capacity amplifier is needed for the system.

An electrically driven transfer valve which operates satisfactorily to drive actuator HA of the system presently to be discussed and outlined in Figure 4 is known as a "Model V" transfer valve built by the Moog Valve Company, East Aurora, New York. This valve is a further development of a direct current nozzle drive transfer valve developed at Cornell Aeronautical Laboratory, Inc. Figure 4 shows a simplified schematic sectional view of such a system. In this drawing, this so-called "Moog" valve is shown to form the principal component portion TV of the entire unit previously referred to under the collective title of "servo actuator" (such as part 10, 33, or 69 of Figure 1) and represented in Figure 4 by the bracketed portions TV, HA and Fb which also correspond to the three separate blocks TV, HA and Fb illustrated in Figure 3. In the following description, the essentials of operation of this servo unit are briefly outlined.

The electrical signal from power amplifier PA of Figure 3 enters the unit of Figure 4 at 94 as a D. C. signal and is conducted into a coil 95 wound around flapper F1, the latter being mounted as a cantilever beam (anchored and insulated at 96) whose free end 97 is centered between pole shoes 98 of permanent magnet Ma and extends into the spacing between nozzles $No_1$ and $No_2$. (Center tap 99 of coil 95 is used for push-pull connections.) The de-stabilizing force which acts on the flapper due to the presence of the permanent magnetic field across pole shoes 98 is mechanically counterbalanced by an equal opposing force secured from the flapper's own spring rate which holds the flapper in its neutral position as long as the exciting coil 95 is inoperative. When flapper F1 is in a neutral position, pressure $P_1$ in chamber 100 and pressure $P_2$ in chamber 101 are equal and, in this particular valve, amount approximately to one-fourth of the hydraulic system pressure in supply line 102 (due to the chosen spacing between flapper F1 and nozzles $No_1$, $No_2$ and due to the setting of restrictors 104 and 105). The entire pressure drop from $P_1$ and $P_2$ to the return pressure in chamber 106 (the latter being vented to the return line 103) occurs at the annular surfaces between the ends of nozzles $No_1$ and $No_2$, respectively, and flapper F1. Ducts 107 and 108 (shaded area Bo surrounding all ducts being representative of body of valve) connect pressure chambers 100 and 101 with the respective chambers 109 and 110 at each end of valve spool Spo, the latter being held in neutral (as shown in the drawing) by centering springs 111 and 112. (113=centering adjustment screw.) Thus, pressures $P_1$ and $P_2$ prevail in chambers 109 and 110 and remain equal as long as flapper F1 remains in neutral. When valve spool Spo is displaced towards either side of neutral (arrows $Ar_3$) due to unequal pressures in chambers 109 and 110, full supply pressure from 102 is allowed to enter via duct 114 into chamber 115 or 116 and to pass through duct 117 or 118 into cylinder 119. Piston Pn in cylinder 119 drives actuator (output) shaft oS (see, for example, analogous part bearing numeral 23 in Figure 1) in one or the other direction (see arrows $Ar_4$) depending on whether the supply pressure from 114 is allowed to enter through duct 117 or duct 118 into the respective cylinder portion 119 located on either side of piston Pn. Correspondingly, duct 117 or duct 118 will serve as a return line from the cylinder portion which happens to be under compression, return passage to the sump line 103 being provided via chamber 115 and return duct 120, or via chamber 116 and return duct 121, respectively. The pressure differentials in chambers 100 and 101, and with them the displacements of actuator shaft oS from neutral, are designed to be proportional to the displacements of flapper F1 from its neutral position between nozzles $No_1$ and $No_2$. In turn, the sense and magnitude of flapper displacements from neutral is made to correspond to the sense and magnitude of control signal flow in coil 95. Consequently, the motion of output shaft oS becomes a linear function of the signal input at 94. (Pressure increase in one of the chambers 100 or 101 due to flapper attraction towards its nozzle, and the simultaneous pressure decrease in the other chamber due to deflection of the flapper from its nozzle, do not follow equal slopes. The pressure differential, nevertheless, varies linearly within the rated range of flapper deflection from neutral.) Potentiometer arm 122 moves with actuator shaft oS and therefore displaces contact 123 from its central or neutral point on resistor 124 (leads 125 and 126 being connected across an appropriate D. C. voltage source) in exact proportion to the displacement of output shaft oS. The voltages in line 127 derived from tap 123 serve as feedback voltages which return the "follow-up" signal to the input of power amplifier PA of Figure 3. (Line 127 is equivalent to line 16, 39 or 73 of Figure 1.) In the absence of hydraulic pressure, shaft oS is held in neutral by a centering spring not shown in Figure 4. (See part sp16 in Figure 13.)

Since the hydraulic servo of Figure 4 is designed to operate from a direct current source, the power amplifier preceding the Moog valve must be of the direct current (D. C.) type. The control signals which feed into this amplifier may be either alternating current (A. C.) signals or D. C. signals, depending upon what types of sensors are being used. If a conventional D. C. amplifier were used, any of the A. C. sensor signals would have to be demodulated before being fed to the amplifier. Since conventional D. C. amplifiers suffer commonly from drift, and for other reasons, a special A. C.—D. C. type amplifier has been developed for the present system. (Operation of this D. C. amplifier is described in the previously cited patent application Serial No. 371,758.) However, in cases where equalization must be applied to some of the A. C. carrier control signals (as for example in the case of the accelerometer signals in the present longitudinal stability augmentation, or in the altitude control system; see overall circuitry shown in Figure 19) it is preferable to demodulate the A. C. carrier voltage to an equivalent D. C. signal.

Turning now to a more detailed description of mechanization features of the present flight control system which are generally related to the problems of linkage between automatic and manual control elements and which, in a more specific sense, concern the objective of combining these control elements in a manner so as to create a single, integrated control system—i. e., a system which offers a maximum measure of automatism in its operation but preserves the authority of manual control over automatic control in the elevator- and rudder-control channels whenever the need for such manual control arises, and which "reverts" to manual control in the aileron control channel whenever lateral pressure is exerted upon the stick, the pilot not being required to consciously switch from one mode of control to the other—it is expedient to refer again to the diagram of Figure 1 in relation to which the principles of system integration and unification incorporated in the present system have already been outlined in general terms. It can now be more clearly recognized in this drawing that the amplifier signal channels and servo actuators which are associated with the stability augmenting systems do not constitute system components exclusively reserved for the functions of providing stability augmentation. It is true that the rudder control subsystem represents essentially a pure stability augmentation system and that the functions of some of the prominent components of this system are shared only by a system of trim control which has been integrated with the sideslip stability augmentation system. In the elevator control subsystem, however, the signal amplifier channel and servo actuator of the longitudinal stability augmenting system serve also to accommodate sensor signals from navigational control units such as the altitude control unit, zero reader, etc., portions of which are normally associated with a conventional autopilot. At the other hand, the aileron control subsystem which does not contain stability augmentation means in the true sense, nevertheless comprises amplifying elements and an electro-hydraulic servo actuator practically identical with the corresponding components used in the longitudinal and lateral stability augmentation systems of the elevator and rudder control channels, respectively. This applicability of component portions to a variety of tasks in different control channels demonstrates the advantages offered by the design philosophy endorsed in the present flight control system, namely that of building flexibility into all "packaged" component assemblies.

The extent to which the process of unification and integration has been carried out in the present system and the amount of interdependence between individual mechanization features can be still more fully appreciated after examination of further details of this system which have reference to (a) preferred means and methods of mechanical linkage in the surface control channels;

(b) preferred forms of artificial "force feel" producing mechanisms in these channels; and (c) a preferred system of centralization of essentially automatic switching (relay) control, based on the use of a simple system selector switch.

The object of centralized control cited under (c), above, is to satisfy specific requirements for various modes of automatic and manual navigation control in a safe manner which assures smooth overall system operation and which requires only a minimum amount of attention on the part of the pilot.

The mechanization features cited under (a) and (b), above, will first be analyzed with reference to Figures 2, 5–13. Details of the switching (relay) system cited under (c), above, will thereafter be described with reference to Figures 17–21. These latter figures and the accompanying text will clearly show the dependence of the various phases of overall system operation on the setting of the beforementioned system selector switch of Figure 17.

A preferred form of mechanization of the stick force switch which has been repeatedly referred to in the preceding pages, is shown in the schematic drawings of Figures 14 and 15 and will be described below in the last paragraphs listed under the general heading "Aileron Control Mechanization."

*Elevator control mechanization*

Figure 5 shows schematically a more detailed view of the integrated overall linkage of the elevator control subsystem in a preferred form of execution. (Relative dimensions of component parts are not drawn to scale.) This drawing is essentially an enlargement of the bracketed portion E of the elevator cable and surface control system shown in Figure 2, the cable run 21 between forward quadrant 20 and aft quadrant 20a having been partly omitted from the present figure, and the forward controls (comprising the bracketed cockpit assembly E*f* of Figure 2) having been displaced from their proper position of alignment with the remaining portion of the drawing for the sake of providing space for a sufficiently enlarged presentation of the entire assembly in a single drawing. Figure 2 chiefly serves the purpose of identifying the approximate relative locations of the elevator, rudder and aileron control mechanisms of the present system within the frame of the aircraft and also to demonstrate the advantage of considerable simplification gained by the replacement of the formerly employed dual cable systems in the elevator and rudder channels with a novel type of single cable systems (see text below).

As has been pointed out before, this elevator mechanization system integrates the functions of longitudinal stability augmentation, the "normal" functions of a conventional autopilot and those of a trim and artificial feel system and combines all associated automatic actuation in a single servo. This servo actuator (which bears numeral 10 in Figure 5 as in Figure 1) is installed in series with the manual system so as to transmit fast-response motions to the control surface without disturbing the control stick. Because of its triple role, the servo is active (energized) throughout the flight regime.

Control stick 22 (Figure 5) is used to operate a single closed cable system 21 which interconnects two quadrants 20 and 20a (pulleys 20b, 20c and 20d serving to properly guide cable 21). Forward quadrant 20 is driven through a "gear box" to increase cable travel and reduce effects of cable stretch. (In the present simplified drawing, the "gear box" is represented by a sector *sr*, attached to torque rod *tr*, and by a gear *grl* carried by shaft *shl* of quadrant 20 which rotates about axis $x2$, torque rod *tr* being rotated about axis $x1$ through fore and aft motions of control stick 22, and the ratio of angular rotation between shafts *tr* and *shl* which results from the meshing of parts *sr* and *grl* being designed to amount to approximately 1:4.) Backlash in the "gear box" is eliminated by internal spring preloading (not shown). Aft cable quadrant 20a is linked to the longitudinal force feel producer (to be described presently) through quadrant shaft *sh2*, through which this aft quadrant also drives the entire remaining linkage of the surface actuator mechanism including servo actuator 10, dual pushrod system 18, the dual hydraulic surface actuator system SA with valve(s) 12 and power cylinders 11, as well as elevators 17. (Compare parts shown in Figure 1 with parts bearing same numerals in the present figure. The linkage system following actuator 10 will not be further described. The three torque axes $x5$, $xa$ and $xb$ of Figure 5 are collectively represented in Figure 1 by the axis of shaft $18a$.)

The present flight control system provides three independent means of controlling the elevator surfaces. They are:

(a) pilot manual inputs controlling the surface actuators through the cable system;

(b) pilot trim inputs electrically controlling the surface actuators through a trim motor (see description below); and (c) automatic sensor signals (normal accelerometer, Machmeter, altimeter, etc.) controlling the surface actuators through servo actuator 10.

This triple independent means of surface actuation control has obviated the need for duplication in any one means of control. As a result, a single rather than a dual cable system is employed. This single cable system requires only a minimum number of intermediate pulleys with low cable wrap angles so that the low value of total friction makes increased rigging load tolerable. This, in turn, eliminates the need for cable tension regulators and slack compensators, thus greatly simplifying the cable system. Both the elevator and rudder cables (the rudder control system being similarly reduced to a single cable system, as described further below) utilize common pulley brackets wherever possible.

The loads transmitted through the cable system are largely those produced by the longitudinal force feel system. The ensuing brief description of this feel system and of the elevator trim system, integrated therewith, is facilitated by the simplified, partly sectional sketches of Figures 6, 7a, 7b which show the essential components of this system as viewed in the general direction of arrow $ar5$ in Figure 5 in a projection against a vertical plane passing longitudinally through the mechanism of Figure 5, all parts in these sketches bearing the same numerals as the corresponding parts in Figure 5.

The basic functions and details of mechanical construction of component parts of this force feel and trim actuator system are essentially those described in detail in the assignee's patent application Serial No. 141,175 of A. R. Vogel entitled, "Aircraft Control Element Force Producer," filed January 30, 1950, now U. S. Patent No. 2,639,875. This system is also outlined and illustrated in the previously cited reference Serial No. 371,758 in order to show its applicability in conjunction with the longitudinal stability augmentation system described in the latter reference.

In the form of its application to the present elevator control mechanism, this force feel and trim actuator system shows certain features of improvement over its prototype of application Serial No. 141,175 and now U. S. Patent No. 2,639,875, which will be better understood after a brief discussion of the main principles of operation of this system.

The "feel" mechanism comprises a packaged assembly $Qs$ consisting of an airtight housing $ho$ (tiltable about axis $x3$) which contains a pressure differential pneumatic bellows with diaphragm $Be$ (Figure 6), combined with a coil spring $sp1$, this assembly being linked to shaft $sh2$ of aft cable quadrant $20a$ via shaft $sh3$, rod $rd$ and control lever $cl$ whose function will be described presently. Integral with this assembly is an electric trim actuator (see motor $Tr$ and parts linked therewith) which regulates the geometry of the linkage such as to reduce to zero any force reflected from the force feel mechanism into the control stick when the latter is (within limits) displaced in either direction from an originally established neutral position. The following more detailed description which will help to clarify these points, takes first exclusive reference to Figure 6 in which are also included a spring mechanism $bf$ providing the "back up" platform for the "series" installation of servo actuator 10 already discussed with reference to Figure 1, as well as a standby link $sl$ for fail-safe manual operation in case of servo actuator failure.

Control stick 22 is so mounted as to rest in a neutral fore-aft position when rod or slider bar $rd$, which links control lever $cl$ with shaft $sh3$ of the force bellows assembly $Qs$, is in a dead-center position. (Rod $rd$ is slidably supported in trunnion mount $tm$ which, in turn, can be rotated about axis $x4$ within supporting fixture $fx$.) Arm $br$ (forming part of the trim actuator assembly) is firmly held on shaft or torque tube $sh2$ of aft quadrant $20a$, while control lever $cl$ (which also forms part of the trim actuator assembly) is free to rotate upon this same shaft $sh2$ but is held in a normally fixed position relative to arm $br$ and therefore also relative to shaft $sh2$ by jack screw $js$ which engages the free end of lever $cl$ and is driven (i. e., rotated) by a trim motor $Tr$, the latter being anchored against arm $br$. Rotation of jack screw $js$ thus acts to increase or decrease the distance between the free ends of arm $br$ and lever $cl$. With motor $Tr$ inoperative, the entire trim actuator assembly acts as a rigid single-unit connecting link between shaft $sh2$ and rod $rd$ so that upon shifting stick 22 from its neutral position in either direction, control lever $cl$ pulls rod $rd$ from its dead-center position. (See solid arrows $ar6$ and $ar6a$ in Figures 7a and 7b, respectively, which indicate sense of rotation of aft quadrant $20a$ for forward and aft displacement, respectively, of control stick 22 from its neutral position, the dotted arrows $ar7$ and $ar7a$ showing the respective directions of pull of lever $cl$ on rod $rd$ away from dead center.) Force spring $sp1$ is mounted around shaft $sh3$ in the "Q" bellows housing $ho$ (the latter rotatable about axis $x3$; see further details below) in a manner so that it places a given "neutral" load on shaft $sh3$ when rod $rd$ is in the dead-center position, this load tending to pull shaft $sh3$ and rod $rd$ in a forward direction (to the left in the present drawing). The spring load increases (due to spring compression) whenever control lever $cl$ pulls rod $rd$ in either direction from its dead-center position, this load increase being proportional to the amount of control stick (elevator) displacement from neutral, and the sense of deflection of rod $rd$ from dead center depending on the sense of control stick deflections. In addition, the load on shaft $sh3$ is also made proportional to the differential pressure within housing $ho$, the latter pressure being determined by the prevailing airspeed and altitude. A Pitot pressure line $pt$ is ducted into the chamber formed inside the diaphragm $Be$ by the diaphragm proper and by the aft (right) wall of housing $ho$, whereas the static pressure line $st$ connects into the chamber between the outer surface of the diaphragm $Be$ and the walls of airtight housing $ho$ as sketched in a schematic manner.

At zero airspeed, when the pressures in both chambers inside housing $ho$ are equal, diaphragm $Be$ is "floating" in an outstretched position supported by spring $sp1$ as shown in the drawing. (At the right side in this sketch, the diaphragm is held onto housing $ho$; at the left, it is held between a disk and ring $dr$ which, in turn, are firmly held onto shaft $sh3$.) At low airspeeds, including landing speeds, the diaphragm still remains spring-supported, and the load on shaft $sh3$ is therefore chiefly provided by spring $sp1$. At increasing airspeeds, the ram air from pressure line $pt$ stretches diaphragm $Be$ beyond the "neutral" length of the free floating spring $sp1$ so that the load on shaft $sh3$ henceforth is provided entirely by ram air, this load tending to pull shaft $sh3$ in the same direction as the spring load at low airspeeds. Due to the presence of static pressure in the left-hand chamber of housing *ho*, which operates against the ram air pressure, the airspeed load here referred to represents actually a differential pressure dependent on both, airspeed and altitude.

As demonstrated in the sketches of Figures 7a and 7b, displacement of control stick 22 from neutral acts to pull shaft *sh3* outward from force bellows housing *ho*. (See arrows *ar*8 and *ar*8a, respectively, and text below.) Since this pull is exerted against the ram air pressure and simultaneously tends to compress spring *sp1*, it is seen that a feel force is reflected into control stick 22 which not only increases with the amount of elevator deflection and makes itself felt at all times, but to which is also added a load that increases with airspeed. (An additional load which provides the important "back up" force for series servo actuator 10 is introduced by the spring mechanism *bf*, to be discussed further below.) A further contribution to the feel force at control stick 22 consists of an incremental value of stick force per "g" (i. e., per unit of gravity acceleration) provided by the rate-of-change-of-normal-acceleration-feedback-signal of the longitudinal stability augmenter. (This force feel increment results from the fact that the pilot, upon commanding a particular value of normal acceleration by deflecting the stick while the stability augmenting system is operative, must move the stick through a greater angle than if the stability augmenting system were not in operation. This item is discussed in the previously cited reference, Serial No. 371,758.)

The force on control stick 22 which results from the action of the force feel mechanism just described can within prescribed limits be reduced to zero, i. e., a trim position with a "stick-in-neutral" feel away from the normal neutral stick position can be established through the instrumentality of motor *Tr* (i. e., through actuation of a trim switch on stick 22, not shown in Figures 5 and 6, which controls motor *Tr*). In the example of an "up" trim, for instance, an "aft" pull on stick 22 through a given amount results in a corresponding rotation of the trim actuator assembly as a single unit (i. e., including control level *cl*) in a manner so as to exert a pull on rod *rd* and shaft *sh3* away from housing *ho*. (See Figure 7b; shaft quadrant 20a rotating counter-clockwise; rod *rd* sliding to the right in trunnion mount *tm* and simultaneously rotating clockwise about axis *x4*, thereby causing housing *ho* to rotate counter-clockwise about axis *x3*, while pulling shaft *sh3* outward from housing *ho*. Rotation angles are exaggerated in the drawings.) The counteracting forces of the bellows assembly, described above as loads on shaft *sh3* which tend to pull the latter into housing *ho*, therefore apply a given opposing (forward) force on stick 22. Since this opposing force effectively disappears near and at the dead-center position of the stick, the pilot is provided with the beforementioned distinct "stick-in-neutral" feel in this position. This same "stick-in-neutral" feel can be shifted to an off-neutral position like the one of the present example in which a small opposing force is normally felt, by actuating motor *Tr* in the sense of "uptrim" whereby the distance between the free ends of levers *br* and *cl* is increased; control lever *cl* is therefore rotated against shaft *sh2* in a sense opposite that introduced by the above cited "aft" pull of control stick 22, thus acting to return rod *rd* towards its dead-center position without affecting the deflected position of arm *br* and control stick 22, and thereby transferring the neutral feel to this deflected position. (In the case of "downtrim," the distance between levers *br* and *cl* is decreased.) Overtrim (i. e., driving of rod *rd* beyond its dead-center position) as well as trim in the wrong direction are prevented by the trim safety switches *TrS* shown in Figure 5. (Consult the earlier cited reference, Serial No. 141,175 and now U. S. Patent No. 2,639,875, for details of operation of these switches.) The rate of trim is made proportional to the trim error through use of an "out-of-trim" displacement potentiometer *ptr* (Figure 5) which controls the power delivered to motor *Tr*, the amount of deviation of potentiometer contact *ctr* (=power pick-off for motor *Tr*) from its neutral point at the center of the potentiometer being determined by the amount of rotation of housing *ho* (about axis *x3*) away from its neutral or dead-center position. The trim rate is also governed by the magnitude of bellows pressure. This variation of trim motor speed as a function of trim error and airload satisfies the requirement of a slow trimming rate at high Mach numbers and of a relatively fast rate during take-off, approach and landing. (See remarks in the introduction to this specification, referring to a further perfected artificial force feel system applicable to the "basic" system herein described.)

It is another prime function of the present "force feel" mechanism to provide the backup force for the "series" installation of servo-actuator 10 previously discussed with reference to Figure 1. This function is performed by the spring mechanism *bf* which is designed to produce a preload force greater than the total operating forces of the complete aft portion of the control system including friction). The total motion of output shaft 23 of series servo 10 is thereby directed toward control of the surface actuators. The following description illustrates the functions of this backup force mechanism in somewhat greater detail and also covers standby link *sl*.

It is seen in Figure 6 that output shaft 23 of servo actuator 10 is linked to one free end of bellcrank *bk1* whereas the servo actuator housing is linked to one end of bellcrank *bk2*, the latter forming part of the linkage 18 previously shown in Figure 1. Bellcrank *bk1* is firmly held onto torque tube *sh2* (shaft of aft quadrant 20a), the other free end of this bellcrank being linked to shaft *sh4* of standby link *sl*, whose housing *ho1* in turn is shown to be attached to the other end of bellcrank *bk2* which is rotatable about axis *x5*. Shaft *sh5* of the backup spring mechanism *bf* is rotatably linked to a fixture *fx1* which is attached to force bellows housing *ho* as shown. Housing *ho2* of mechanism *bf* is rotatably secured to the aircraft structure, here drawn as a single fixture *fx* which also supports trunnion mount *tm*.

Coil spring *sp2* inside housing *ho2* is mounted about shaft *sh5* in a manner such as to place a definite bi-directional resistive force against displacements of this shaft from "neutral," i. e., when rod *rd* rests in its dead-center position, this spring *sp2* is confined within the space shown in the drawing under a measured compression-preload which constitutes the above referred-to backup force at the zero or neutral position of control stick 22. It can be appreciated that the presence of this backup force mechanism does not call for any significant increase in the leverage force to be applied on stick 22 in order to displace the stick from neutral. A fore or aft motion of the stick acts to compress spring *sp2* in a similar manner as it acts to compress spring *sp1* of the force bellows assembly, except that the "backup force" of the latter spring is practically zero at and near the neutral stick position whereas that of spring *sp2* is of a definite magnitude in this same neutral position. A brief examination of the sketch of Figure 7c will show that for any small displacement of stick 22 (or of bellcrank *bk1*) from neutral, the resistive forces of spring *sp1* will remain near zero and that, therefore, the feel forces developed by this latter spring are inadequate to act also as backup forces for servo actuator 10 at and near the neutral stick position where the presence of the backup force is an essential requisite for the proper functioning of the longitudinal stability augmentation system. If *x3* in the sketch of Figure 7c represents the axis of rotation of force bellows housing *ho* and distance $d_1$ between points $a_4$ and $a_1$ is assumed to represent the length of shaft *sh3* protruding from housing *ho* when rod *rd* is in its dead-center position, and if it is further assumed that curve $a_1$—$a_2$ represents arrow area of Figure 7b, it can be seen that after completion of the rotary pulling motion of rod rd, i. e., at the end of arrow cr3a, this motion will have acted to rotate housing ho through angle $\phi$ and, at the same time, will have pulled shaft sh3 away from housing through a distance represented by line $a_3$—$a_2$, arc $a_1$—$a_3$ representing the trace which the free end of shaft sh3 would have described if rod rd had remained disconnected from shaft sh3 and if housing ho had been rotated through the same angle $\phi$ with shaft sh3 remaining in its undisturbed dead-center position relative to housing ho. The initial portion of the trace of arc $a_1$—$a_3$ away from point $a_1$ practically coincides with the initial portion of arrow ar3a (see distance $ar_0$), which serves to indicate that the displacement of shaft sh3 and the resulting force feel which both accrue from a small deviation of the control stick from neutral, remains very small within these limits. With increasing stick deflection from neutral, the resistance of spring sp1 increases considerably and is of a greater magnitude than that of spring sp2. The additive effect of the backup force mechanism bf and the feel force mechanism Qs, consequently, establishes a force feel gradient in which the characteristics of neutral force feel and of proportional force-feel-increase with increasing stick deflection remain unimpaired.

As above stated, the neutral preload force of spring sp2 is made greater than the total operating load of the control mechanism linked to the "aft" portion of servo actuator 10. Consequently, with the control stick remaining in a neutral position, the resistive torque acting on bellcrank bk1 at its junction with the output shaft 23 of servo actuator 10 must be greater than the torque load acting on bellcrank bk2 at its junction with the housing of servo actuator 10. (This torque load or operating load of the "aft" control system includes friction loads and during operation of servo actuator 10 also the additional load of standby link sl. See text below.) Therefore, if during automatic operation of the elevator control system, shaft 23 is displaced in either direction relative to the housing of servo actuator 10 and if thereby the overall lengths of the extendible link, constituted by the housing and output shaft of the servo, is forcibly increased or decreased, the bellcrank which offers the lesser resistive torque will yield to the counteracting leverage forces produced by the servo. Since shaft 23 is held "stationary" by the unyielding pivotal support of bellcrank bk1, the housing of the servo will be displaced relative to the pivoted shaft which results in a corresponding rotation of bellcrank bk2 about axis x5. During any displacement of control stick 22 from neutral which results in a rotation of bellcrank bk1 about the axis of torque rod sh2, the same condition prevails since the resistive torque or backup force acting against output shaft 23 is now obviously even greater than the "neutral" backup force. Hence, with control stick 22 displaced from neutral and with servo actuator 10 operative simultaneously, bellcrank bk2 will be rotated through an angle which now represents the algebraic sum of rotary motion resulting from rotation of bellcrank bk1 (=translatory motion of the entire servo actuator as a rigid connecting link) as well as from displacement of shaft 23 relative to the servo housing. The latter combined rotation of bellcrank bk2 thus occurs whenever manual and automatic elevator control are applied simultaneously.

From this description of the functions of backup force mechanism bf it can also be deducted that any rotary motion of bellcrank bk2 resulting solely from rotation of bellcrank bk1 equals the motion of the latter and therefore causes a translatory motion of standby link sl equal to and in the opposite direction of the motion of the servo actuator link 10—23. Thus, during manual operation of the system, the "aft" load of the control mechanism remains unaffected by the presence of standby link. During automatic operation, either with or without simultaneous manual operation, the standby link offers a certain amount of additional load to the total "aft" operating load (due to spring compression) which is calculated into the preload of backup force mechanism bf. As shown in the drawing, standby link sl is installed in parallel with the servo actuator and preferably consists of a double acting spring preloaded "bungee" with a "neutral" length corresponding to the null position of the servo. The term "bungee" as used herein with reference to an aircraft structure refers to any auxiliary control or device designed to assist the pilot of the aircraft and to limit the action or overmovement of a control or moving part of the aircraft. In the drawing, part sl is schematically represented by an assembly consisting of shaft sh4, housing ho1 and spring sp3, the latter consisting of two portions, one portion inserted around shaft sh4 between the piston-shaped end section es of this shaft and the forward wall of housing ho1, and the other portion inserted between part es and the "aft" wall of housing ho1. When standby link sl is in a neutral position (=null position of servo 10), no compression load is placed on either spring portion. It is seen that in the event of power failure or of damage to servo 10, the standby link acts to hold the inoperative servo link at its neutral length and that manual control can continue unimpaired, the spring-preload force of the standby link being of a magnitude capable of transmitting pilot effort to operate the surface actuators. (See reference to switches DS of Figure 5 in text below.)

The standby link further serves to remove all backlash from the rod ends of the servo and thus to insure a tight loop response (see also end of next paragraph).

Returning to the schematic of the entire elevator control mechanism submitted in Figure 5, examination of all parts shown in this figure to the left of the dual push rod system designated with numeral 18 shows that the preceding description of the schematic of Figure 6 essentially also applies to the mechanism illustrated in this left hand portion of Figure 5, except that in this latter figure, additional parts are seen to be attached to the assembly Qs and to the assembly sl which have been omitted from Figure 6 for the sake of simplification. The rate of trim-potentiometer assembly (parts ptr and ctr) as well as the safety switch assembly TrS, both associated with the bellows assembly Qs, have already been briefly described. (The parts here referred to symbolize operational features and do not necessarily represent actual physical structures. Potentiometer arm ctr is fixed to part ho and tilts in either direction of arrow Arp when housing ho is tilted one way or the other. Safety switches TrS are held fixed to structure, whereas contact blade Trc tilts with housing ho, making contact either with the upper or with the lower switch if the angle of tilt of ho exceeds a given limit in either direction of tilt, thereby acting to stop trim motor Tr.) Parts DS associated with the standby link sl represent a recommended form of switching assembly adapted to measure the amount and sense of deviation of servo actuator 10 from its neutral position and to control trim motor Tr in accordance with these measurements. One of the functions of this switching assembly is to neutralize undesirable elevator trim which may result from a malfunction of servo actuator 10 in which servo shaft 23 may remain jammed in an off-neutral position. By commanding trim motor Tr to introduce an equal and opposite amount of trim, the respective switch DS acts to eliminate this effect of malfunction. (Details of this switching assembly are not shown, and the respective parts in the drawing merely serve to indicate the presence of this switching device.)

*Aileron control mechanization*

Turning now to the mechanization features of the present flight control system which are concerned with the linking together of manual and automatic control modes in the aileron control subsystem, it is seen that some of the salient features of the preferred method of linkage illustrated in the schematic drawings of Figures 8, 9, and 10 have already been described with reference to the composite drawing of Figure 1. Figure 8 is essentially an enlarged replica of the bracketed portion $Ai$ of the aileron cable and surface control system depicted in the overall diagram of Figure 2. (Only portion 36 of the left aileron cable run shown in this latter figure.) All component parts of Figure 8 have already been shown in the right central portion of Figure 1 (see parts bearing same numerals), except that parts $40a$, $b15$, $sl15s$ and $40b$ of Figure 8 illustrate more nearly the actual structures and functions of individual linkage members which in Figure 1 are symbolically represented by the components of the bracketed anchorage assembly 40. It is the main purpose of Figure 8 to convey a clearer conception of the mechanization features of this anchorage assembly 40 and to facilitate visualization of the detail drawings of Figures 9 and 10 which portray portions of this anchorage assembly in their actual preferred form of execution, Figure 9 representing a view of the drawing of Figure 8 as seen in the general direction of arrow $ar8$ of Figure 8, and Figure 10 showing details of a portion of Figure 9 as viewed in the direction of arrow $ar9$ of Figure 9 against a plane $pl-pl_1$ which is normal to the plane of the drawing of Figure 9. In Figure 1, it can be visualized that the gear of part $b40$ of anchorage assembly 40 which engages the gear of part $a40$ serves to hold part $a40$ in a fixed or stationary position provided part $b40$ is in turn held in a fixed rotary position. When the latter occurs, aileron servo actuator 33 remains attached to an inflexible support. As previously explained, this condition of fixed support prevails if no lateral pressure is exerted on control stick 22 (i. e., under automatic system control). Any such lateral pressure acts to release the hold on part $b40$ (via an electrical signal over line $sfs$ of Figure 1; see also Figure 21) and to transfer the anchorage of part $a40$ (and of actuator 33) to a spring. This is more clearly shown in Figure 8, wherein part $40a$ represents a clutch which, if engaged, acts to hold lever $b15$ in a fixed rotary position relative to shaft $sh13$. (The inner, not visible end of lever $b15$ rides on shaft $sh13$ whereas the outer end of lever $b15$ is linked to actuator 33.) Under any automatic aileron control mode, this clutch remains engaged. Upon lateral actuation of stick 22, i. e. under manual aileron control, the clutch disengages and releases lever $b15$, thus permitting rotation of the latter about shaft $sh13$. The necessary torque for such rotary displacement is supplied during manual aileron operation through lateral displacement of stick 22 from neutral which acts to apply a leverage force onto the free end of lever arm $b15$ as can be clearly seen in Figure 8. (Brackets 49 and 50 are fixed to shaft 51 as stated with reference to Figure 1; shaft 51 is rotatable in bearings held in the aircraft's fixtures, as shown in Figure 8.) However, this torque from the control stick is opposed by a counter torque from force spring $s15s$, the latter shown in the present drawing as a helical spring attached between fixture $40b$ and the free end of lever $b15$. In actuality, this force spring is shaped in the form of a flat spiral spring and is mounted around axis $sh13$ as will be presently shown with reference to Figures 9 and 10. The spring resistance increases with the amount of lateral stick displacement from neutral and registers as a load at the stick grip, thus providing the pilot with the necessary force "feel." How this force feel is made to increase bi-directionally with increasing lateral stick deflections in either direction from the laterally neutral stick position, and how the sensation of "stick in neutral" is conveyed to the pilot, can be readily shown with the help of detail drawings 9, 10, and 12, the latter drawing illustrating a preferred form of assembly composed of a bi-directional force spring and two leverage arms or brackets. This assembly is actually used in the rudder control subsystem but is very similar to the force spring assembly of the aileron control system. The basic structural features of this spring assembly are described in detail with reference to Figures 3 and 4 of assignee's application Serial No. 127,062 of Feeney et al., filed November 14, 1949 and issued as U. S. Patent No. 2,665,084 on January 5, 1954, entitled "Flap Actuator and Control System." For a brief explanation of the adaptation of this spring assembly to the present control system and of the modes of anchorage provided for servo actuator 33, it is convenient first to turn to Figure 10, in which part $b15$ is equivalent to the lever arm $b15$ of Figure 8 whose lower end is seen in Figure 10 to be likewise attached to the housing of servo actuator 33, and whose upper end is shown to be riding on shaft $sh13$ (this latter shaft being supported in the aircraft structure not shown in this drawing but symbolically represented in Figures 8 and 9 by fixture $f12$). In the assembly of Figure 10, whose component structures here serve to illustrate operating principles rather than to emphasize any preference for the particular structural details shown, lever $b15$ is seen to carry at its upper end a sleeve $sv15$, which extends into bracket or disk $br15$, to which gears $g15$ and $g15a$ are firmly attached (i. e., neither the gears nor their supporting pins are rotatable against part $br15$). This lever assembly forms a single unit rotatable about shaft $sh13$. The remainder of the right hand portion of Figure 10 shows a sleeve $cl15s$ riding on the same extended shaft $sh13$, the left end of this sleeve carrying central gear $cg15$ and the right end carrying circular clutch plate $cp15$, both these latter parts forming an integral unit with sleeve $cl15s$. An electromagnet or solenoid $em15$, when energized via line $sfs$, attracts clutch disk $cp15$ firmly against brake facing or friction ring $fr15$. (Parts $em15$ and $fr15$ fixed to structure.) In this condition of clutch energization which is drawn in solid lines in the present sketch, gear $cg15$ is seen to engage gears $g15$ and $g15a$, and friction at the clutch plate prevents rotation of sleeve $cl15s$ and of gear $cg15$ which in turn acts to hold lever $b15$ effectively in a fixed rotary position (=inflexible support for servo actuator 33). The torque resistance at the junction of parts $b15$ and 33 offered by this clutch arrangement is adjusted so that it can be overpowered in case of emergency. Upon de-energization of solenoid $em15$, a clutch release spring (not shown in Figure 10) which "bucks" the solenoid attraction, acts to clear clutch plate $cp15$ from brake facing $fr15$, thereby permitting free rotation of central gear $cg15$ and, in turn, free rotary displacement of lever $b15$. As suggested by the dashdot outline of sleeve assembly $cl15s$, the clutch release spring acts to cause sufficient lateral sleeve displacement so as to completely clear central gear $cg15$ from the peripheral gears $g15$ and $g15a$.

Lever $b15$ of Figure 10 can be seen to further carry a pin $15b1$ interposed between links $15c1$ and $15d1$ of the force spring assembly shown schematically to the left of lever $b15$. The flat spiral spring previously referred to (used in lieu of spring $s15s$ of Figure 8) and shown in Figures 9 and 10 as part $s15$, is in actuality placed between links $15c1$ and $15d1$ of Figure 10 (not to the left thereof as sketched in Figure 10 for convenience of presentation), the functions of these links and of pins $15a1$ and $15b1$ being more readily understood after a brief consultation of Figure 12. In this latter drawing, which shows the force spring assembly FS of Figure 11 in greater detail (referred to further below), flat spiral spring $15s$ can be seen to be mounted between brackets or links $15c$ and $15d$, the outer end of the spiral spring being held onto top link $15d$ and the inner end being held onto bottom link $15c$. Pin $15a$ is fixed to the aircraft structure whereas pin $15b$ is attached to quadrant 71 of Figure 11. For the present purpose, the arms of links $15c$ and $15d$ which are shown directed towards the left in Figure 12 can be disregarded (except the spring attachment to link $15d$), and fixed pin $15a$ can be visualized as being interposed between the other link arms which are directed to the bottom of the drawing (i. e., as being centered on axis $15x$ and in contact with both links like pin $15b$). If, furthermore, pins $15a1$ and $15b1$ in Figure 10 are assumed to be the equivalents of pins $15a$ and $15b$, respectively, of Figure 12, and if links $15c1$ and $15d1$ of Figure 10 are considered the equivalents of the respective links $15c$ and $15d$ of Figure 12, the view of Figure 12 may be taken to essentially represent the force spring assembly of Figure 10 as viewed in the direction of arrow $ar10$ of Figure 10. If lever $b15$ with pin $15b1$ in Figure 10 is held in its established zero position in which pins $15a1$ and $15b1$ rest in the same plane (which happens to be vertical in Figure 10 and which is equivalent to a plane containing axis $15x$ of Figure 12), pins $15a1$ and $15b1$ act to carry or "block" equal and oppositely directed spring torsion loads that operate against the arms of links $15c1$ and $15d1$ and tend to cause these arms to cross past each other. This is more readily seen in Figure 12 where forces acting in the direction of arrows $Ar15$ so as to further separate levers $15c$ and $15d$ are counteracted by the spring forces which tend to uncoil spring $15s$. No spring torque about the axis of shaft $sh13$ can act on lever $b15$ in this zero position due to the sole presence of fixed pin $15a1$. Due to this inflexible position of pin $15a1$ and by virtue of the fact that the inner and outer end portions of the spring spiral $s15$ are attached to the arms of links $15c1$ and $15d1$, respectively, in the manner shown in Figure 12 any lateral displacement of pin $15b1$ (i. e., rotational displacement of lever $b15$ in either direction) acts to add to the amount of neutral preload torque of one or the other lever arm, this torque load increase growing with the amount of lever displacement. If pin $15b$ in the analogous arrangement of Figure 12 is, for example, displaced to the right, the resulting counter-clockwise rotation of link $15d$ acts to tighten spring $15s$ via its outer end, thereby adding to the expansion torque of the spring and thus increasing the spring load that acts against the displacement of pin $15b$ from neutral. (The spring-contracting torque operates against an inflexible support since the inner end of spring $15s$ and lever $15c$ to which this inner end is attached are prevented by fixed pin $15a$ from moving counter-clockwise.)

The overall linkage shown in Figures 9 or 10 is so adjusted that lever $b15$ is held in its above cited zero position when control stick 22 rests in its zero lateral position and when, at the same time, output shaft 37 of servo actuator 33 is resting in neutral. The preload torque of spring $s15$ helps to develop a counter-torque against small stick displacements from neutral which is sufficient to return the stick to neutral after its release. It also provides the pilot with a distinct force "feel" for small stick deflections from zero and accentuates the "stick in neutral" feel when the stick is returned to zero from either direction. For increasing stick deflections, the load or force "feel" at the stick increases proportionately.

A review of Figure 1 indicates that aileron trim is applied by electrical means via the same servo actuator 33 which is illustrated in Figure 9. It has also been stated with reference to Figure 1 that under a cruising mode of control (auto-manual switch of Figure 17 set to "auto"), a rigid anchorage is provided for servo actuator 33 as long as control stick 22 rests in a neutral lateral position, i. e., as long as no lateral force is applied unto the stick grip. Since the clutch-mechanism of Figure 10 remains actuated via line $sfs$ as long as this condition of flight prevails, such rigid anchorage is actually provided by the inflexible junction between the housing of servo 33 and lever $b15$. Figure 9 (where broken-off cable connections 36 and 55 lead to the respective ailerons) shows clearly that due to this inflexible anchorage, and with control stick 22 and ailerons originally in neutral, a trim signal via servo actuator 33 will automatically deflect the stick and the ailerons to their corresponding trimmed positions, the overall neutral length of the linkage member constituted by actuator 33 having been increased or decreased by the steady state trim voltage. Lever $b15$ remains in its zero position when this electric aileron trim is applied. Thus, the "stick in neutral feel" is automatically transferred to the trimmed stick position, and this neutral feel will remain displaced from the true zero stick position as long as the trim signal prevails, even if the control stick is repeatedly actuated by the pilot. (The latter is due to the fact that lateral control stick deflections do not remove the trim voltage from actuator 33. Consult Figures 19 and 21 for clarification.) After control stick release, spring $s15$ acts to return lever $b15$ to zero before clutch action sets in.

As also previously stated with reference to Figure 1, a time relay is provided which controls the time of re-engagement of clutch $cp15$ of Figure 10 during change-over from manual to automatic aileron control. This relay is of the quick-disengage-slow-engage type and is listed as relay $Kd$ in Figure 16. For smooth operation of this integrated aileron control system, all related factors such as the sensitivity of pickup elements, the time element in the buildup and decay of signal voltages, the response characteristics of mechanical system elements, backlash, etc., have been carefully scrutinized and elements so apportioned as to achieve a satisfactory integrated overall effect. If, for instance, the control stick is laterally deflected by a large heading error signal in the aileron channel, and if the pilot decides manually to increase the prevailing aileron deflection, the signal collapse from heading synchronizer 25 of Figure 1 and the disengaging of the clutch of Figure 10 (consult Figures 18 and 20 for circuit details involving stick force switch and relays, etc.) are rapid enough to return servo actuator 33 to zero or to its trimmed position and thereby to place sufficient torque load from spring $s15$ onto the control stick so as to prevent inadvertent over-deflection of the ailerons. (Slow reaction of these system elements would leave the stick initially either "frozen" or without counter-torque.) If, at the other hand, the stick is released when in a deflected position and while a large heading error is still present, the automatic control signal acts rapidly enough to re-deflect the stick before the ailerons respond to the change-over, notwithstanding the brief delay introduced by the slow engage action of the above-mentioned relay. Manual change-over from left to right aileron deflection, or vice versa, is in turn so rapid, that this same relay prevents intermittent clutch engagement and automatic control action from servo 33.

*Stick force switch.*—A preferred form of mechanical execution of the stick force switch whose functions have been explained in preceding portions of this specification will now be described with reference to Figures 14 and 15.

Figure 14 is a simplified schematic lateral sectional view of control stick 22 of Figure 1 taken in a vertical plane oriented parallel to the longitudinal axis of an imaginary aircraft on which this control stick is mounted, this plane containing the curved axis $lsc$ of stick column $sc22$. Numeral $22gr$ identifies the stick-grip whose center of pressure for fore-aft stick deflections (i. e., for stick deflections to the left and right within the plane of the drawing) as well as for lateral or left-right stick deflections (i. e., for deflections within a plane effectively normal to the plane of the drawing) is located at $CP17$. Point $x1$ at the bottom of the drawing is representative of the pivotal axis for fore-aft stick deflections (i. e., of axis $x1$ of Figure 1 viewed on edge). (In order to present details of the drawing on a larger scale without moving axis $x1$ beyond the drawing limits, it has been necessary to break away the lower portion of column $sc22$.) The pivotal axis for left-right stick deflections is traced at 54 which is the same numeral given to this axis in Figure 1. Handgrip $22gr$ is hinged on pin $P17$ as shown, this pin or shaft being firmly held in the aft portion of a fitting $pF17$ that is solidly mounted on top of the free end of stick column $sc22$. The axis of pin P17 rests in a vertical position when the control stick rests in neutral (longitudinally as well as laterally) and when the aircraft is in level flight. In this neutral position, the pin axis roughly coincides with an imaginary axis $17x$ that passes through axis $x1$ at the junction of column $sc22$ and push rod 35 (Figure 1). A fixture F17 is shouldered around the base of handgrip $22gr$. Part of this fixture comprises hinges $hi17$ around pin P17, and another part of this fixture forms a U-shaped flanking portion comprising levers $ua$ and $ub$. This U-shaped portion has been omitted from the drawing of Figure 14 but is clearly shown in the sectional view of Figure 15 which is taken in the direction of arrows $ar17$ of Figure 14 against a plane Y—Y oriented perpendicular to the plane of the latter drawing. The U-shaped collar portion of fixture F17 is firmly clamped onto the base of grip $22gr$ by a vice-like device $clF$ (Figure 15). Since the center of pressure CP17 in the handgrip is located to the rear of axis $17x$ (which is shown in Figure 15 as a plane $17xp$ that contains axis $17x$ and is oriented normal to the plane of the drawing) or to the rear of the axis of pin P17, any lateral pressure applied against the stick-grip in the direction of arrows P$la$ results in a torque about this pin axis. Due to the quasi-rigid attachment of fixture F17 onto column $sc22$, this torque is for the most part translated into a lateral force acting on column $sc22$. However, it is seen in Figure 15 that the transverse space between the two parallel levers or flanks $ua$ and $ub$ of fixture F17 (these flanks having vertical dimensions of approximately ⅔ of the length of pin P17) is slightly larger than the transverse diameter of the hollowed fitting $pF17$ which is interposed therebetween, the differences in these diameters appearing as two equally dimensioned clearances between each flank $ua$ and $ub$ and the adjoining face of fitting $pF17$. A preloaded centering spring $sp17$ is supported in the hollow end of fitting $pF17$ between two steel balls $st17$, each of these steel balls being seated against a bore hole in the wall of fitting $pF17$. Spring $sp17$ is so oriented that the preload forces which hold the steel balls against the bore holes are directed perpendicular to the planes of orientation of flanks $ua$ and $ub$. The bore holes pass through the outer surface of the walls of fitting $pF17$, and sets crews $se17a$ and $se17b$ which are mounted in the respective flanks $ua$ and $ub$ opposite each bore hole are adjusted to bear against the respective steel balls such that the transverse clearances above referred-to are of equal diameter on each side of fitting $pF17$ when no torque moment is present about pin P17, i. e., when no lateral pressure is applied against grip $22gr$. Two miniature switches $sw17a$ and $sw17b$ are mounted on the external forward surface of fitting $pF17$ and covered by a protective shield $sh17$, each switch being suitably located opposite the free end of one of the flanks $ua$ and $ub$. Contact members $pla$ and $plb$, which are adjustably held in flanks $ua$ and $ub$ adjacent to the respective switches $sw17a$ and $sw17b$, are operatively set into contact with these switches in a manner so that the switches remain open when no torque moment acts about pin P17. The preload of centering spring $sp17$ is so apportioned that a prespecified amount of torque about pin P17, i. e., a certain minimum lateral pressure from either direction against handgrip $22gr$, is required to cause one of the set screws $se17$ to compress the spring via the adjoining steel ball $st17$ sufficiently to allow the respective flank $ua$ or $ub$ to move into contact with fitting $pF17$ and thereby, in turn, to allow the contact member $pla$ or $plb$ of that same flank to advance sufficiently towards the associated miniature switch $sw17$ so as to close the latter. Conversely, the compression load on spring $sp17$ will act to return handgrip $22gr$ to its centered or neutral position and thereby to open the switch $sw17$ as soon as the lateral pressure is removed from handgrip $22gr$. The lateral pressure required to actuate switch $sw17a$ or $sw17b$ is preferably adjusted to amount to approximately 1 lb.

The simplified wiring diagram sketched in Figure 16 shows a preferred method of connecting the stick force switch of Figures 14 and 15 and its earlier mentioned time delay relay with pertinent circuit elements of the present flight control system. A more complete presentation of the entire associated circuitry is contained in Figures 18 to 21 wherein the respective components are designated with the same numerals as in Figure 16. The flight selector switch of Figure 17 and the stick force switch of Figures 14 and 15 are here identified with letters FSL and STF, respectively. Portions of switch FSL are shown in Figure 16 in a position which establishes what has already been referred to as the normal automatic "cruising mode" of the system. Under this mode of control, solenoid $em15$ remains energized as long as microswitches $sw17a$ and $sw17b$ of stick force switch STF are open. (Solenoid $em15$ represents electromagnet $em15$ of Figure 10 which energizes the clutch of the aileron servo anchorage mechanism illustrated in that same figure. Various other elements which are also controlled by the stick force switch have been omitted from Figure 16 since it is the main purpose of this drawing to illustrate the time delay action of relay K$d$.) Relay K$d$ is of the quick-disengage-slow-engage type which acts to release clutch plate $cp15$ of Figure 10 without delay by opening switch or contact K7 whenever one of the switches $sw17a$ or $sw17b$, is closed, i. e. whenever the control stick 22 of Figure 14 is deflected to the right or left. (Right deflection moves flank $ua$ of Figure 15 in the direction of arrow R19 of Figure 16 and closes switch $sw17a$; left deflection moves flank $ub$ of Figure 15 in the direction of arrow L19 of Figure 16 and closes switch $sw17b$.) Whenever the control stick is released, the respective stick force switch reopens, but discharge of capacitor C19 through the relay coil causes a delay in the closing of switch K7 and therefore also delays the re-engagement of the anchorage clutch.

*Rudder control mechanization*

In turning now to a more detailed description of mechanization features of the present flight control system which are specifically related to the linkage of manual and automatic rudder control modes, attention is first directed to the preferred form of integrated rudder control mechanization illustrated in the schematic diagram of Figure 11 which is an enlarged replica of the bracketed portions P$d$ (underneath the cockpit) and R (in tail end of fuselage) of the orientation drawing of Figure 2 as identified by the respective brackets in Figure 11. In this latter figure, component portions such as cables 72, quadrant 71 and rudder servo actuator 69 with output shaft 70 correspond to parts bearing the same numerals which have already been shown in the signal flow diagram of Figure 1, and the components of the fully powered hydraulic control surface actuating system designated with numerals 75$a$, 75$b$, 76$a$, 76$b$, 77$a$, 77$b$, and 80$a$ and 80$b$ correspond to the parts bearing the respective numerals 75, 76, 77, and 80 in Figure 1 which have already been briefly described with reference to that figure, the affixes $a$ and $b$ of these numerals in Figure 11 serving to indicate that, in accordance with prior usage, two identical sets of these components of the fully powered control surface actuating system are employed "in tandem" in the actual control system. It is seen that piston rods 80$a$ and 80$b$ of the hydraulic power cylinders are rotatably anchored against shaft $sh15$ (attachment of piston rod 80$b$ masked by quadrant 71) which is firmly supported in aircraft fixtures not shown. This shaft $sh15$ and other linkage members anchored thereto have been symbolically represented in Figure 1 by parts 79 and 74, respectively. For illustrative purposes only, quadrant 71 has been shown in Figure 1 in an isolated position and rotatable about a horizontal axis, whereas in actuality, and in accordance with Figure 11, it is also rotatably mounted on shaft *sh*15. The general principles of operation of the rudder linkage system outlined with reference to Figure 1 will be shown to apply also to the rudder linkage system of Figure 11. The control surface actuating system sketched in the right portion of Figure 11, and well known in the art, will not be further described. It may however be useful to state briefly that in the system here illustrated, and in analogy with the basic mechanism shown in Figure 1, the extended portions *e*77*a* and *e*77*b* of power cylinder housings 77*a* and 77*b*, respectively, which are linked with the rudder torque tube *rt*14 via the corresponding horns *h*14*a* and *h*14*b*, constitute each an integral part of its associated cylinder housing. Any translational displacement of piston rods 80*a* and 80*b* relative to their respective cylinder housings 77*a* and 77*b* causes rotation of the rudder (not shown) about axis 81 (rudder attached to torque tube *rt*11) since the piston rods, which are simultaneously actuated when a rudder command is received, operate against the common inflexible support of shaft *sh*15 and therefore remain stationary, thus actually causing the housings to be displaced when rudder commands are received and thereby to apply torque onto part *rt*14 via the lever arms constituted by horns *h*14*a* and *h*14*b*. (Displacement of the housings also provides mechanical feedback to the hydraulic valves 76*a* and 76*b* as earlier stated.)

The forward portion of the overall linkage system of Figure 14 comprises conventional rubber pedals *pe*14 which are used to drive a single closed cable system through non-coplanar linkage *lk*14 and forward quadrant 71*f*. Cables 72 (partly broken off in the drawing) connect forward quadrant 71*f* via idlers *i*71*a*, *i*71*b* and *i*71*c* with aft quadrant 71 which in turn drives the surface actuator servo valves 76*a* and 76*b* via a system of links associated with rudder servo actuator 69, the latter functioning essentially as an extensible series link in the cable drive system as pointed out with reference to Figure 1. The manner in which servo actuator 69 operates in conjunction with the particular linkage system of Figure 11, i. e., the manner in which the manual and automatic control modes in this rudder control subsystem are mechanically integrated, can best be described by taking principal reference to the simplified schematic of Figure 13 which represents an enlargement of the essential components of the linkage system of Figure 11 in a partly sectional plan view taken in the general direction of arrow *ar*14 of Figure 11, these linkage components bearing the same numerals in both illustrations (minor differences in their mechanical construction having no effect on their functional properties).

Arm 16*ar* and bellcrank 16*bk* in Figure 13 are seen to be mounted on shaft *sh*15 concentrically with "aft" quadrant 71. The "free" ends of bellcrank 16*bk* are linked with output shaft 70 of rubber servo actuator 69 and with valve control rod 75*a* (via link 74*a*), respectively, arm or link 16*bka* of this bellcrank being rigidly attached to the main bellcrank body which is rotatably hinged on shaft *sh*15. In Figure 11, it can be clearly seen that a vertical pin *sh*16 extends downward from bellcrank 16*bk* through a slot in quadrant 71, a second link 16*bkb* being attached to the lower end of this pin in identical manner as link 16*bka* is attached to its upper end, this second link 16*bkb* being connected via link 74*b* to valve control rod 75*b*. (Parts 16*bk*, *sh*16, 16*bka* and 16*bkb* thus form a single, rigid unit.) Arm 16*ar* in Figure 13 is solidly attached to quadrant 71, the free end of this arm being linked to shaft 69*ex* which separately extends from actuator housing 69 in the same direction as output shaft 70 and which forms an integral portion of that housing. The opposite end of actuator housing 69 (to the right in Figure 13) is rotatably linked to idler arm *i*16*a*, which in turn is rotatably anchored against fixture 16*fx*. Piston rod 80*a* of hydraulic power cylinder 77*a* (and its counterpart, piston rod 80*b* of the second power cylinder 77*b*, located below the components 80*a* and 77*a* and therefore not shown in Figure 13) is anchored against shaft *sh*15, the housing extension(s) *e*77*a* (and *e*77*b*) to rudder torque rod *rt*14 of Figure 11 being broken off in Figure 13. Cables 72 which lead to forward quadrant 71*f* of Figure 11, are likewise broken off in Figure 13. In this latter figure, a link *l*82, solidly held on output shaft 70, is also identified, the free end of this link being rigidly connected to potentiometer arm 82. (See equivalent counterparts *l*122 and 122, respectively, of the potentiometer assembly shown in the bottom portion of Figure 4.) Figure 13 further presents a simplified sectional view of portions of output shaft 70 which are contained in actuator housing 69, this output shaft being the equivalent of piston rod *oS* shown in the bottom portion of Figure 4, the counterpart of piston P*n* and cylinder 119 in this latter figure being designated with numerals 16*pn* and 119*a*, respectively, in Figure 13. As shown in Figure 13 (and omitted from Figure 4), shaft 70 extends into a chamber 16*ch* beyond cylinder 119*a* which houses a piston centering assembly, part *sp*16 representing a preloaded centering spring which acts on shaft 70 so as to return piston 16*pn* from either direction to its central or neutral position in cylinder 119*a* if the hydraulic pressure is removed from this cylinder. (Relevant parts here shown merely serve to illustrate operational principles, their actual form and relative proportions differing from those shown in the drawing.)

Assuming now that rudder pedals *pe*14 of Figure 11 are actuated so as to rotate aft quadrant 71 of Figure 13 in a clockwise direction (arrow *ar*16*a*) and that servo actuator 69 remains inoperative with piston 16*pn* held firmly in its central or neutral position in cylinder 119*a* by equal hydraulic pressures on each side of the piston. Under these operating conditions, valve control rod 75*a* will be displaced in the direction of arrow *ar*16*f* in proportion to the amount of rudder pedal displacement, i. e., in proportion to the amount of angular rotation of "aft" quadrant 71 that results from such rudder displacement. (Described in detail, this motion is produced in the following manner: arm 16*ar* rotates with the quadrant and pulls the entire servo actuator assembly in the direction of arrow *ar*16*b*, the junction between idler arm *i*16*a* and the right end portion of the actuator housing following this motion through an arc traced by arrow *ar*16*c*. Hydraulic pressure in cylinder 119*a* holds shaft 70 in a stationary position relative to the housing of actuator 69. Therefore, the junction between shaft 70 and bellcrank 16*bk* remains also stationary relative to the junction between shaft extension 69*ex* and arm 16*ar*, i. e., bellcrank 16*bk* is forced to rotate through the same angle about shaft *sh*15 as arm 16*ar*, both these linkages being displaced as if they were rigidly joined together by a "series" member such as a pin. The entire servo actuator assembly thus acts in this case merely as an inert "series" member of the overall linkage. Pin *sh*16 of bellcrank 16*bk* is rotated in the direction of arrow *ar*16*d*, causing the outer ends of bellcrank-links 16*bka* and 16*bkb* to push the respective connecting links 74*a* and 74*b* in the direction of arrow *ar*16*e*, thus acting simultaneously to displace valve control rods 75*a* and 75*b* in the general sense of arrow *ar*16*f* which results in a corresponding rudder displacement in the manner already previously described.)

In case of hydraulic power failure, the same rudder pedal displacement results in compression of the preloaded centering spring *sp*16 which provides the necessary torque to rotate bellcrank 16*bk* in essentially the same manner as above explained.

If servo actuator 69 responds to an automatic control signal at the same time in which the above described "manual" rudder displacement is executed, the linkage portion of the servo actuator assembly which joins idler arm *i*16*a* with bellcrank 16*bk* increases or decreases in overall length in accordance with the amount and sense of displacement of shaft 70 relative to actuator housing 69, whereas the portion of the servo actuator assembly which links idler arm *i*16*a* with arm 16*ar* (i. e., the rigid unit composed of housing 69 and shaft 69*ex*) retains its fixed length. This causes bellcrank 16*bk* to be rotated through an additional angle which is either added to, or subtracted from, the amount of bellcrank rotation that results from the rudder pedal displacement alone.

If the rudder pedals are left in neutral while the servo actuator shaft 70 is being displaced by an automatic control signal, rotation of bellcrank 16*bk* and the ensuing displacement of valve control rods 75*a* and 75*b* become merely functions of the displacement of shaft 70 relative to housing 69 since arm 16*ar* is retained in its neutral position by the preload of spring 15*s* of the bidirectional force spring assembly FS shown in Figures 11 and 12 (to be referred to presently), this preload being greater than the load presented by the valve control rods as has already been stated with reference to Figure 1. An electrical trim signal via servo actuator 69 will cause a steady state displacement of valve control rods 75*a* and 75*b* but will leave the neutral rudder pedal position unaffected, thus preserving also the "rudder-in-neutral-feel" for trimmed rudder positions in a similar manner in which the previously explained "stick-in-neutral-feel" is preserved in the aileron control channel. This will become evident if after a review of the earlier reference to Figure 12 (made on connection with the aileron control linkage of Figures 9 and 10), attention is directed towards the functions of pins 15*a* and 15*b* which are shown in Figure 11 as well as in Figure 12.

The force spring assembly FS is rotatably mounted on shaft *sh*15 below aft quadrant 71 as illustrated in Figure 11. Pin 15*b* is rigidly held in a support which forms an integral part of quadrant 71, this pin pointing downward in a direction parallel to shaft *sh*15, and the force spring assembly FS being so adjusted that the pin passes between the one set of extended portions of arms 15*c* and 15*d* as clearly shown in Figure 12. (This latter figure represents the same force spring assembly as if viewed from the top of Figure 11 in a direction downward along the axis of shaft *sh*15, quadrant 71 and associated linkages having been removed.) Pin 15*a* is rigidly held in the aircraft fixture and assembly FS mounted so that the pin passes between the second set of extensions of arms 15*c* and 15*d* as illustrated in Figure 12. This latter pin 15*a* prevents the mounted force spring assembly from being rotated about shaft *sh*15 when the rudder pedals are actuated and contributes to the buildup of a bidirectional spring load which is proportional to the amount of rudder deflection from neutral, the function of this pin being identical with that of pin 15*al* of Figure 10 except that in the present application, the pin is differently located relative to pin 15*b*, arms 15*c* and 15*d* of the force spring assembly of Figures 11 and 12 being correspondingly modified in shape so as to accommodate the pin between two similar extensions as those designed to be acted upon by displacements of pin 15*b* from neutral. The linkage system of Figure 11 shows that deflections of rudder pedals *pe*14 from neutral will act to displace pin 15*b* in the directions of arrows *ar*15*a* or *ar*15*b* of Figure 12, the pin here being seen in its neutral position (centered upon the null axis 15*x*) which it occupies when the rudder pedals are in neutral, and in which pin 15*a* is contacted by both arms 15*c* and 15*d*. Operational details of this preloaded force feel producer have already been outlined in connection with Figures 9 and 10 and are applicable also to the present rudder control system.

As a result of the earlier described triple surface actuation control means (i. e., pilot's "manual" inputs via rudder pedals; pilot's electrical trim inputs via potentiometer 65 of Figure 1 that control servo actuator 69; and sensor inputs from lateral accelerometer 59, roll rate gyro 28 and/or aileron potentiometer 63 of Figure 1 that also control servo actuator 69), a single rather than a dual cable system has been employed, and quadrant 71 with the linkage assembly of Figure 11 has been moved to the rear of the fuselage of the craft as illustrated in Figure 2. The intermediate pulleys can be seen to have low cable wrap angles and are reduced to a minimum number (see units *i*71 in Figure 2), so that the total friction is kept at a low value, permitting an increase in rigging loads. This in turn eliminates the need for cable tension regulators and slack compensators, thus greatly simplifying the cable system. The loads transmitted through the cable system are largely those produced by the force "feel" spring mechanisms of assembly FS of Figure 11. The authority of the servo actuator is limited to one-third of the rudder surface displacement (either by mechanical or by electronic limiting means not shown). All attach joints are preloaded (no details shown in Figure 11) to remove backlash and thus to insure a tight loop response to the system.

The preceding detailed description of mechanization features of the rudder control subsystem completes the discussion of all the individual component elements of the present flight control system which in some measure contribute to the novel overall aspects of this system. It remains now to illustrate how these individual elements are tied together and organized into an integrated electrical system that can be efficiently controlled by the pilot through a few simple switching operations. Figure 17 represents a sketch of the front panel of the flight selector switch FSL which has been previously also referred to as the system selector switch. This switch represents the master controller of the system and is identical in outward appearance to the flight plan selector switch of the (A2-Sperry) zero reader referred to in the introduction to this specification except for the addition of a third knob 17*b* (Man-Auto-knob). The switching functions of this third knob as well as those of knobs 17*a* and 17*c* of Figure 17 will become apparent if the simplified wiring diagram of all the related switching and relay circuitry which is given in Figure 18 is studied in conjunction with the wiring diagrams of Figures 19, 20, and 21. These latter three figures, together with Figure 18, represent a preferred form of overall circuitry, of the present system, broken up into four convenient sections. Figure 18 exclusively illustrates the switching and relay control of the system selector switch of Figure 17 as well as of associated power switches, fire control switches, etc. The various relays are identified with numerals K1, K2, K3, etc. These same designations are also used in Figures 19, 20, and 21 for identification of the various automatic control switches or contacts which are regulated by the respective relays of Figure 18 that bear the same numerals. The location and operational status of these control switches in the circuitry of Figures 19, 20 and 21 illuminate in a more or less self-explanatory manner the nature of control functions performed by the corresponding relays. Each relay, as well as most of the significant circuitry components of Figures 18, 19, 20 and 21, are provided with identifying titles so as to facilitate on-the-spot interpretation of the diagrams. A relay-controlled switch or contact is shown in the form of two short parallel lines inserted "in series" in the respective signal flow lines. This two-dash symbol at the same time represents a normally open switch (i. e., open when the associated relay is not energized), whereas the same two parallel dashes crossed by a diagonal dash represent a normally closed switch (=closed when the pertinent relay is not energized). Capacitors are distinguishable from these contact switches in that they are designated with a dash and an adjacent short curved line. Electrical connections which pass from Figures 19 and 20 to Figure 21 are marked in each of the respective drawings by capital letters of the Roman alphabet, and the nature of a signal generated in a sensor or carried by a given conductor in these figures is, for the most part, pointed out by a Greek letter typifying a designation of common usage. A list of all relevant definitions that appear in Figures 19–21 is given below for convenience:

$\delta_E$=elevator deflection
$\delta_A$=aileron deflection
$\delta_R$=rudder deflection
$u_o$=steady state forward velocity
$u$=perturbed forward velocity
$a_z$=vertical acceleration
$a_y$=side acceleration
$g$=acceleration of gravity
$h$=altitude (static pressure)
$Q_c$=pressure differential from Pitot-static lines
$\phi$=roll angle
$\dot{\phi}$=roll rate
$\psi$=yaw angle or heading
$\dot{\psi}$=yaw rate
$\theta$=pitch angle
$\epsilon_L$=localizer error ($\dot{\epsilon}_L$=error rate)
$\epsilon_{GL}$=glideslope error
$\epsilon_h$=altitude error
$\epsilon_{FC}$=fire control error Figures 19, 20, and 21 can be seen to represent three separate sections, respectively, of a composite diagram in which the flow lines entering Figure 21 from the left constitute continuations of the broken-off flow lines on the output sides or right sides of Figures 19 and 20, respectively, lines A, B, C, and D of Figure 21 emanating from the corresponding output lines of Figure 19 which bear the same letters, and lines F, G, and I of Figure 21 similarly emanating from the respective output lines of Figure 20. (Line E at the top of Figure 20 enters Figure 19 at the bottom.) For the purpose of illustrating the ramifications of electrical control, these drawings are largely self-explanatory when studied in conjunction with Figure 18. Additional circuit details shown in Figures 19, 20, and 21 which warrant further explanation in the light of the more specific aspects of the present invention will be summarily outlined under a separate heading at the end of this specification. (The various sections of function selector switch 17a in Figures 19 and 20 are shown in "neutral" positions throughout. The same abbreviated designations A, R, N, and L are used as in Figure 18, representing "Appro," "Right," "Normal," and "Left," respectively. All sections of this switch are "ganged" together as shown in Figure 18.)

Knob 17b in Figure 17 is a two position switch (Man= manual; Auto=automatic) which when set to "Auto" closes all the necessary aileron and elevator circuits for automatic control of the flight path. This switch is shown in two sections a17b and b17b in Figure 18, both sections being simultaneously operated by one and the same knob 17b of Figure 17.

Knob 17a in Figure 17 represents what will here be designated as the function selector switch proper. This switch 17a can be set to four different positions and is shown in three sections a17a, b17a, and c17a in Figure 18, which are also simultaneously operated by one and the same knob 17a of Figure 17. The four positions of switch 17a are: (1) Norm=normal for automatic cruising when the Auto-Man switch is on "Auto"; (2) Vor-Loc, Right for flying under control from the Vor (Visual omnirange) or Loc (Localizer) receiver, this being one and the same airborne unit tuned to the respective Vor or Loc transmitter frequencies and marked merely as "Localizer Receiver" 45a in Figure 20; (3) Vor-Loc, Left for the same type of control as under (2), above, the choice of the "Right" or "Left" switch position depending on whether an approach to the Localizer or Omnirange beam is made in an "outbound" or "inbound" direction relative to the respective transmitter; the only functional difference in the two switch positions arises here in the output of localizer receiver 45a of Figure 20 where the signal phase in line aL is reversed relative to that in line aR; and (4) Appro=for approach or instrument landing control from glideslope or glidepath receiver 46 (Figure 19) and from localizer receiver 45a via radio rate unit RR20 of zero reader 4 (Figure 20).

Knob 17c represents an altitude (ALT) control switch through which the altitude control unit 3 (Sperry type A–12) of Figure 19 may be switched "on" or "off." (Figures 17 and 18.)

(NOTE.—The various navigational control units above referred to, such as units 4, RR20, 45a, 46, and 3, as well as details of the particular switching modes related thereto and herein recommended will not be further described as this subject matter lies beyond the scope of the present specification and is well known in the art.)

The three knobs 17a, 17b, and 17c are spring-loaded to their "normal," "manual," and "altitude off" positions, respectively. This is done by detents (not shown) which are actuated from the respective holding coils S1, S3, and S2 of Figure 18 in such a manner that the knobs are held in their spring-loaded positions when the corresponding relays are de-energized. The solenoid actuated detents are employed to automatically prevent non-permissible switching combinations by returning the respective knob(s) to a safe position. In the following are listed all switching combinations and relay actions of interest, including also their effect on the circuitry of Figures 19, 20, and 21: (The philosophy of these operations has already been explained as far as it involves the specific aspects of the present inventions. All matter not intimately related thereto will be omitted from this list.)

(a) Switching between "Auto" and "Man" returns the Function Selector switch (also called Vor-Loc switch, the Vor-Loc Right and Vor-Loc Left positions being merely marked with "Left" and "Right" in Figure 18) to Norm and the ALT switch to Off if these latter two switches are originally in other positions. (If switch 17b is on Man as shown in Figure 18, holding coil S1 is energized so that switch 17a can be set to any of its four positions. During the time interval, however, in which the 17b switch contact slides from Man to Auto while being switched to its Auto position, or during switching from Auto to Man, the holding coil S1 becomes temporarily de-energized, causing knob 17a to return to its spring-loaded neutral position, if it happens to be set to any other position.)

(b) Auto-Man switch cannot be placed in Auto position until the system power switch SP18 and take-off switch T18 of Figure 18 are turned on, i. e., contact KT in series with coil S3 remains open, and switch 17b therefore stays spring-loaded to Man until both switches, SP18 and T18, are closed.

(c) Switching knob 17a to Appro returns ALT switch 17c to Off position if originally left on On position (irrespective of whether switch 17b is in Man or Auto).

(d) Auto release switch Re18 of Figure 18, which is normally closed as shown, represents an emergency disconnect release button provided on the control stick grip 22gr of Figure 14 (not shown in the latter figure). When this button is pressed down (=switch opened), all pertinent switches are returned to their spring-loaded positions.

(e) Besides the independent switches SP18 and T18 cited under (b), above, there are also installed on off-on fire control switch FC18 and a fire control interlock IF18, both of which are likewise independent from the system selector switch FSL as shown in Figure 18. If switches FC18 and IF18 are turned "on," and if a fire control signal from coupler 7 (Figure 19) is present (contact cF18 in Figure 18 near switch IF18 being held open in the absence of a fire control signal and closed when such a signal is received), relay K6 will be energized only if switch 17b is on Auto, i. e., if relay K5 is energized. Thereupon, relay K6 remains energized even if switch FC18 is turned off, but switches 17a and 17c, upon energization of K6, are returned to their respective "neutral" and "off" positions (since switch a17b, held in its Auto position, is now without power) so as to prevent any interference of automatic target tracking actions through the automatic control of function selector switch 17a.

(f) The heading selector button HS18 of Figure 18 is spring-loaded to its open position shown in the drawing.

(g) Relays K1, K3, K7, and K4 are inoperative (due to the open switch contact K5 in the common ground lead of these relays) unless switch 17b is placed in its Auto position. The following breakdown shows how each of these relays, in its non-energized state, affects the associated control circuitry and how it safeguards manual control facilities by rendering automatic control impossible.

(1) *Altitude control.*—Relay K1 controls clutch $clu19$ and the power to the "E-pickoff" E19, both of altitude control unit 3 of Figure 19. As long as K1 remains de-energized, the automatic altitude control is inert, not only because pickoff E19 has no power, but also because the inactive clutch $clu19$ leaves bellows $Be19$ disengaged from armature $Ar19$ so that the latter remains stationary relative to E19 in spite of changing altitudes, the output from unit 3 into line $d13$ which leads to elevator servo 10 of Figure 21 therefore remaining zero.

(2) *Heading synchronizer control.*—Relay K3 controls the power to the control field of motor $Mo20$ and to brake $Br20$ of heading synchronizer 25 of Figure 20. Motor $Mo20$ is a heading follower or tracker motor which receives an error signal from rotor $Ro20$ via power amplifier $Am20$ if the position of rotor $Ro20$ does not correspond to the position of (the equivalent of) a transmitter rotor in the gyrosyn compass unit 26 (the latter rotor position being representative of the orientation of the earth magnetic field relative to the craft's longitudinal axis and therefore of the magnetic heading of the craft). Since the fixed field of motor $Mo20$ is normally energized and motor brake $Br20$ released, as indicated by the de-energized status of switches K3, the output from heading synchronizer 25 remains zero as long as relay K3 remains de-energized (motor $Mo20$ acting to hold rotor $Ro20$ in its zero position of correspondence with the compass heading of unit 26, thus reducing the error signal in line 25a to aileron servo 33 of Figure 21 to zero).

(3) *Aileron control.*—With relay K7 in Figure 18 de-energized due to open contact K5, stick force switch $Stf$ in On position has no effect on this same relay. Likewise, anchorage mechanism 40 for aileron servo actuator 33 in Figure 21 remains de-energized due to open contact K5. The following step-by-step investigation of pertinent parts in Figure 21 (in conjunction with Figure 18) will bear this out and will at the same time serve to clarify all related details given in this drawing. Anchorage mechanism 40 is shown in Figure 21 as a combination of clutch $cp15a$ and energizing coil $em15$ intended to represent the equivalent of the mechanism 40 of Figure 10. The clutch is interposed between servo actuator 33 and a mechanical linkage box $d20A$, spring $sp21$ suggesting that the clutch plates are spring-loaded in a manner so that the clutch disengages when electromagnet $em15$ is de-energized. If for descriptive purposes it is assumed that the output from servo 33 is a rotary displacement of shaft 37 from neutral which is imparted onto input shaft $37d$ of box $d20A$ when the clutch is engaged, spring $sp21$ further serves to illustrate that shaft $37d$ does not remain in its position of angular displacement from neutral when the clutch plates are separated, but that it is torqued back by the spring into the neutral or trimmed position to which output shaft 37 of servo 33 returns each time the clutch is disengaged. (This return to neutral or trimmed position of shaft 37 has been previously discussed and, as will be stated further below, is also confirmed in Figure 21 by the presence of contact K5 in the supply line to aileron servo power amplifier 32P ahead of the supply line 47 from the aileron trim setting facilities 27 of Figure 19, this contact being open when switch 17b of Figure 18 is in Man position, and all aileron signals, except the steady state trim signal, being therefore removed from servo 33.) It will also be recalled that the clutch $cp15$ ($cp15a$) of Figures 10 and 21 is always disengaged when control stick 22 is laterally engaged (a fact to be confirmed presently for the case in which switch 17b of Figure 18 is in Auto position). Thus, in Figure 21, where control stick deflections are shown in the form of a second input shaft $22d$ to box $d20A$, it is seen that this linkage box, and with it surface actuator 41—42, cannot simultaneously receive displacement signals from both input sources (disregarding aileron trim) and that the box here symbolizes therefore a form of parallel linkage that functions not unlike a differential gear in which one of the two input gears happens to be unloaded when the other is loaded, and vice versa, so that the output shaft transfers only one input displacement at a time. (The actual execution of a preferred form of anchorage mechanism and its modes of operation have already been described.)

(4) *Heading selector control.*—Relay K4 of Figure 18 controls the signals to pre-amplifier 32a of Figure 20 (i. e., the signals in line 25a from heading synchronizer 25, and the signals in line 57b of zero reader 4 from heading selector 5 or radio rate unit RR20). While this relay K4 is inoperative (due to open contact K5 in Figure 18 with Auto-Man switch 17b in Man position), line 25a remains connected to the aileron amplifier circuits leading to aileron servo actuator 33 of Figure 21, whereas line 57b remains disconnected therefrom. Actuation of heading selector button HS18 of Figure 18 has no effect on these circuits while switch 17b is in Man position.

(h) In addition to the safeguards for manual operation discussed under paragraph (g), above, no automatic aileron control signal from any source can reach aileron servo actuator 33 with switch 17b in Man position due to the open contact K5 in the input to aileron power amplifier 32P (Figure 21). A further contact K5 in the fire control switching circuits of Figure 18 maintains relay K6 de-energized, whereby all signals in the output of fire control coupler 7 of Figure 19 are disconnected (through open contacts K6) from line 56 to the aileron power amplifier 32P of Figure 21 and from line 14c to elevator power amplifier 9P of Figure 21. At the other hand, in the elevator and rudder control signal channels leading to power amplifiers 9P and 67P of Figure 21, respectively, series contacts KT permit automatic control signals from the respective stability augmenting systems to become effective while switch 17b is in Man position, provided that takeoff switch T18 of Figure 18 has been closed. Glideslope error signals from receiver 46 of Figure 19, however, are cut off by open contact K5 in the supply line to unit 46a when switch 17b is in Man and switch 17a on Appro. (See brief description of ability augmenting system components in the concluding remarks at the end of this specification.)

(i) With Auto-Man switch 17b in Auto position and function selector switch 17a in "neutral" position, the following changes are established in the control functions:

(1) Altitude switch 17c can now be turned "on" or "off." (Contact K5 and hold-coil S2 energized.) When in "on" position, switch 17c energizes relay K1, thereby locking armature $Ar19$ of the altitude control 3 (Figure 19) via clutch $clu19$ and admitting power to the E-pickoff E19. Since armature $Ar19$ is locked to a link from static air pressure bellows $Be19$ at the altitude that prevails when switch 17c is turned "on," and since that same armature, at the moment of locking, rests in a zero position relative to E-pickoff E19, any subsequent deviation of the craft from this "locked" altitude will result in a correction signal in output line $d13$ which will act to deflect the elevators in a sense so as to return the craft to the locked altitude.

(2) Relay K3 of Figure 18 is energized which acts to cut off the power from motor Mo20 in heading synchronizer 25 (Figure 20) and to lock this motor via brakes Br20 so as to hold rotor Ro20 in a fixed position relative to the associated stator St20, this fixed rotor position representing the magnetic heading sensed by gyrosyn compass 26 at the moment of switchover of switch 17b to Auto. Any subsequent deviation of the craft from this "locked" heading generates an error signal in line 25a which acts to deviate the ailerons so as to return the craft to this heading, contact K3 in the input to power amplifier 32P now being closed.

(3) Deviations from level flight deliver roll error signals from directional gyro 6 of Figure 19 via line 6b, as well as roll rate signals from roll rate gyro 28 via line 28b of Figure 20, to power amplifier 32P of Figure 21 through the same now closed contact K5 mentioned in the preceding paragraph, contact K7 to magnetic amplifier Ma30a of aileron synchronizer 30a and contact K7 to motor Mo30a of this same aileron synchronizer unit being open. (When these contacts K7 are open, motor Mo30a holds feedback-potentiometer Po30a normally in a neutral or zero position, thus holding the feedback signal in line fb21 to input of amplifier 32b at zero, and therefore allowing the roll error and roll rate signals— as well as the heading error signal, if present—to pass unopposed.)

(j) With Auto-Man switch on Auto and Function Selector switch in "neutral," operation of heading selector button HS18 and/or of stickforce switch STF of Figure 18 results in the following relay and switching actions:

(1) *Heading selector button.*—This spring-loaded button acts like a switch inasmuch as when pressed down temporarily, it energized relay K4 which in turn closes switch K4 across the gap between the selector button contacts, thereby shorting out the selector button and maintaining relay K4 energized via the same N-contact of section b17a of the function selector switch 17a. This switching cannot be reversed, i. e., if it is desired to turn "off" the heading selector controls, pressing button HS18 down again, has no effect on the circuitry, but disconnecting function selector switch 17a temporarily from its "neutral" contact points acts to de-energize relay K4 and to open switch K4, whereafter button HS18 has to be pressed down again to re-initiate heading selector control. When relay K4 is energized, the control signals from heading synchronizer 25 in line 25a of Figure 20 are cut off from amplifier 32a and signals from line 57b delivered thereto instead, line 57b being connected to rotor Ro5 of the heading selector selsyn in zero reader 4 via the N-contact of function selector switch 17a. Rotor Ro5 is manually set to the desired compass heading (through setting of control knob 5) prior to pressing down button HS18. If there is any difference between this selected heading and the heading sensed by gyrosyn compass 26 (the stator windings of the selsyn transmitter contained in unit 26, which are not shown in the drawing, being linked via amplifier BA20 to the stator windings St5 of the selsyn receiver in zero reader 4), an error signal appears in line 57b whose function is the same as that of the formerly described signal in line 25a.

(2) *Stick force switch.*—If stick force switch STF makes contact (i. e., is turned "on" upon applying lateral pressure against the control stick grip), relay K7 becomes energized whereby the contacts K7 in series with relays K3 and K4 of Figure 18 are opened. Irrespective of whether the heading selector has been operative or not, the system is returned to the manual operational status in which feedline 25a is connected to amplifier 32a of Figure 20 whereas feedline 57b stays open. The signal in feedline 25a is reduced to zero since motor Mo20 now causes rotor Ro20 to "track" the heading sensed by gyrosyn compass 26. Contact K7 in feedline SA30 to amplifier Ma30a of aileron synchronizer 30a in Figure 21, as well as contact K7 to motor Mo30a of this same unit 30a are now closed so that the roll error and roll rate signals cited in paragraph (i) (3), above, which enter through D. C. amplifier 32b in Figure 21 cause motor Mo30a to displace potentiometer point Po30a in one or the other direction from neutral, producing a feedback in line fb21 of proper sign and magnitude to henceforth reduce the roll signals to zero. Since the position in which contact Po30a comes to rest is representative of the static roll error or of the aileron deflection or bank angle which happens to be manually established through the pilot's control stick deflection that has caused energization of relay K7, it can be said that aileron synchronizer 30a has tracked and will continue to track the bank angle as long as stick force switch STF of Figure 18 is making contact. Hence, the control signals representative of heading error, roll error and roll rate are all reduced to zero, and furthermore, the input to power amplifier 32P of Figure 21 is cut "off," contact K7 in the power amplifier supply line being now open. The closed stick force switch also opens contact K7 in series with the clutch of anchorage mechanism 40 of aileron servo 33 (Figure 21), thereby providing the earlier explained elastic support for servo 33. If, during a sustained manual turn, the yaw rate of the craft reaches a value larger than $.4 \pm .15$ deg./sec., switch *syr* in yaw rate gyro 58 of Figure 20 (bottom of drawing) closes, thereby energizing relay $K_{RG}$ (contact K3, shown in series with relay $K_{RG}$, being closed due to the now de-energized relay K3). According to Figure 18, contact $K_{RG}$ in series with relay K3 will be open when relay $K_{RG}$ is energized but will have no effect on relay K3 since contact K7 is already open. The only change, so far, in the status quo of operation of the system is the opening of switch contact $K_{RG}$ in the power supply to the erection system ER6 of vertical gyro 6 of Figure 19. (Since the slow-acting erection system operates against drift of the gyro spin axis from vertical under normal level flight conditions and tends to deflect the spin axis from the vertical when the craft is in a sustained turn, and since the roll error signal in line 6b of Figure 19 is a correct measure of the roll angle only as long as the gyro spin axis remains vertical, it is necessary at this opportune moment to render the erection system inoperative so as to leave the normally vertical orientation of the spin axis undisturbed.) It occurs, however, in a sustained turn that the bank angle which the pilot has manually introduced, is just of the correct magnitude for the desired rate of turn. In this condition of coordinated manual turn, the control stick is in its neutral lateral position, and the pilot relaxes his hold on the stick grip, thereby automatically and unconsciously opening stick force switch STF. At such instants of unwanted return of the system to automatic operation (which would cause the craft to level off at the then prevailing heading), the closing of switch contact K7 in series with relay K3 in Figure 18 has no effect on relay K3 due to the presence of the open switch contact $K_{RG}$. Heading synchronizer 25 of Figure 20, in consequence, continues to track the gyrosyn compass heading, holding the signal in line 25a to zero. Heading selector relay K4 in Figure 18 remains de-energized in spite of the closed contact K7 in series with this relay since button HS18 is open and switch 17a in "neutral." Contacts K7 in the respective supply lines to amplifier Ma30a and motor Mo30a of aileron synchronizer 30a of Figure 21 return to their normally open positions with the result that follow-up potentiometer Po30 remains now locked (via motor Mo30a, now held stationary; braking system similar to that of unit 25 of Figure 20 not shown) in a deflected position representative of the then prevailing bank angle, the feedback signal in line fb21 therefore continuing to reduce the roll error signal from the directional gyro to zero as long as the bank angle remains unchanged. Contact K7 in the supply line to power amplifier 32P is now closed, but no automatic control signal is present in this supply line unless the bank angle of the craft changes, in which case an error signal is generated in the input to amplifier 32b due to a resultant difference between the new roll signal and the fixed feedback signal from line fb21. This error signal acts to restore the bank angle of the craft which prevailed at the moment of opening of stick force switch STF, the clutch of anchorage mechanism 40 in Figure 21 now being energized due to closed contacts K7 and K5 in its supply line. It is seen, therefore, that the system now operates to automatically maintain a banked turn which the pilot can stop at the desired moment by appropriate control stick actuation. When he levels the craft to its new heading, he also acts to return potentiometer Po30a of aileron synchronizer 30a to its neutral point (since reduction of the bank angle to zero acts via amplifier Ma30a to return motor Mo30a to its zero position as long as control stick 22 remains engaged, the renewed opening of yaw rate switch syr having no effect on this latter action) so that thereafter, i. e., under renewed automatic control during level flight, the correct roll error, roll rate and heading error signals are again available to drive servo 33.

If the yaw rate switch syr of Figure 20 closes due to any non-pilot-commanded yaw motion of the craft, relay $K_{RG}$ will remain de-energized due to open series contact K3 as long as switch 17b is on Auto. Therefore, the heading synchronizer as well as the aileron synchronizer will continue in their "locked" status. Since any outside disturbance responsible for the closing of switch syr is in the nature of a transient, continued operation of the erection system ER6 of vertical gyro 6 (Figure 19) will not have any significant deflection effect on the gyro's spin axis orientation. If, at the other hand, the yaw rate switch syr closes due to a sustained yaw rate during a large turn commanded via the heading selector of zero reader 4, contact switch K3 in series with relay $K_{RG}$ (Figure 20) is closed due to the de-energized status of relay K3 in Figure 18 (contact K4 open). With relay $K_{RG}$ now energized, the erection system of the vertical gyro becomes inoperative, aileron synchronizer 30a (Figure 21) continuing in its locked status. (If switch syr closes while switch 17b is in Man, relay $K_{RG}$ becomes energized, again deactivating the vertical gyro erection system but having no further effect on the system due to open contacts K5.)

(k) With function selector switch 17a of Figure 18 in (Vor-Loc) Right or Left position (and switch 17b in Auto), altitude switch 17c can still be turned "on," permitting automatic constant altitude flights on the Omnidirectional or Localizer beam during the early stages of the craft's approach to a landing field. Furthermore, heading selector control becomes operative without the necessity of pushing down button HS18 (see line RL18 in Figure 18) whereas the heading synchronizer as well as the stick force switch are rendered inoperative. With the stick force switch out of operation, the pilot can operate the control stick for manual heading corrections whenever he chooses to do so, without affecting the operation of the system (i. e., without changing the prevailing relay-action).

(l) With function selector switch 17a of Figure 18 in Appro position, altitude switch 17c is automatically held in its spring-loaded "off" position since hold coil S2 becomes de-energized. Heading selector control continues to operate, and stick force switch STF continues to remain inoperative.

*Concluding remarks referring to Figures 19 to 21*

In addition to the above-discussed preferred layout of relays and switches that is employed in the present flight control system and illustrated in the four sectional drawings of Figures 18, 19, 20, and 21, there remain several system components and circuit details represented in the overall circuitry of Figures 19, 20, and 21 which have not so far been pointed out and which merit a few concluding remarks. (Attention is again directed to applicants' various earlier cited patent specifications where pertinent features of the stability augmenting systems herein represented, as well as the associated equalizing and amplifying circuitry and other items of interest, are discussed in greater detail.)

*Figure 19.*—Mach sensor 1 and vertical accelerometer 2 constitute portions of the control signal sensing elements of the longitudinal stability augmenting system. The former sensor is here simply represented by a box containing two parallel potentiometers p19 and p19a, both of which are simultaneously controlled by an output shaft 19M of the Machmeter proper (not shown). For a simplified explanation, let it be assumed that with increasing Mach number, the pot-arms move upward in the drawing, and that at a Mach number of approximately .75, the arm of pot p19a reaches the top end of the associated resistor, so that above this Mach number, the pick-off contact of pot p19a draws a fixed voltage independent of speed variations, whereas the voltage from pot p19 continues to increase in proportion to forward velocity. The latter voltage which passes into line b13 and through rate circuit 8b, represents the rate-of-change-of-airspeed-feedback signal to the elevators which is used for phugoid damping. The signal from pot p19a in line a13 represents the airspeed feedback which at the higher Mach numbers serves to correct the so-called "tuck-under" tendencies of the craft. This latter signal is added to the composite elevator control signal which feeds into power amplifier 9P. (See text below, referring to Figure 21.) Normal accelerometer 2 is here represented as a box containing an elastically supported armature Ae2 to which is joined a mass m2 that is suspended in a vertical position. Displacements of this mass due to the craft's normal accelerations are symbolically illustrated by an $a_z$ input shaft va19, and the ensuing displacements of armature Ae2 with respect to the fixed U-pickoffs Pf2 generate corresponding unbalance voltages in the pickoff coils (not shown) which are wound in the form of a bridge, these unbalance voltages eventually appearing as unbalance signals in the output line c13 from resistance bridge Br2 (the latter connected across the bridge constituted by the pickoff-coils). The normal acceleration signal passes successively through pre-amplifier c9a, through demodulator Dc9 and through a gain control as well as through equalizing circuits, the latter two circuit elements being collectively designated with numeral V8c. Thereafter, the signal passes through line 14 (jointly with the various other signals represented in this figure) into summing amplifier 9b of Figure 21.

Box 3 represents the altitude control unit (Sperry) which has already been described in connection with relay K1. The altitude error signals $e_h$ in line d13 pass into line 14 via units d9a, Dd9 and V8d which correspond to the above mentioned units c9a, Dc9 and V8c, respectively.

Box G46 preceding glideslope receiver 46 is here merely symbolizing certain configurations of motion and position representative of the functions of the previously mentioned glideslope receiver 46. These configurations lead to a comparison between the glideslope transmitter signal and a reference signal which in turn yields the error signal $E_{GL}$ in the receiver output (line e13) that passes through a section of function selector switch 17a, through approach coupler 46A and through equalizing circuits 8e into line 14. (Unit 46A may here be simply classified as an additional equalization element.) Vertical gyro 6 is schematically represented as a box yielding two control signals which are derived from two potentiometer pickoffs rp19 and rp19a. The position of both of these potentiometer pickoffs is simultaneously controlled from the roll angle pickoff of the vertical gyro proper, this latter pickoff here being simply shown as an input shaft R19 linked to the respective potentiometer arms. The pickoff signal from pot rp19a in line 6b is directly proportional to the roll angle of the craft whereas the pickoff signal in line 6a from pot rp19 represents a function of this roll angle which is derived through the circuitry rpφ associated with the latter pot and delivered as a bias voltage to supply line 14 of the elevator control channel. Since normal accelerometer 2 which also feeds into line 14 is balanced to deliver no output signal during level flight for 1g-flights (in order to secure signals due to deviations from 1g-flight), it is necessary during a turn to cancel the amount of deviation from 1g flight which is solely due to the turn, so as to preserve the response of the longitudinal stability augmenting system to phugoid and short period longitudinal oscillatory modes in the vertical plane. Due to the known relationship between bank angle and deviation from 1g-flight due to that bank angle, it is possible to derive a roll angle bias voltage based on this relationship and to combine this bias voltage with the output voltage from the normal accelerometer so as to eliminate the undesirable deviation components whenever the craft is guided into a turn. The normally open parallel switching contacts K6 and K4 in series with line 6a do not permit this normal acceleration bias voltage to become operative when flying with switch 17b of Figure 18 on Auto unless a turn is made either under control of the heading selector system (relay K4 of Figure 18 energized) or under tracking control of the fire control system (relay K6 of Figure 18 energized). Elements 8f and 29a in line 6a and 6b, respectively, again represent equalizing circuits. As previously stated, components associated with the fire control system will not be further discussed in the present specification.

Potentiometer 27 represents an electrical aileron trim control, where the manual trim input via knob 27 of Figure 1 is shown as a control shaft T27 which regulates the pickoff voltage of the pot arm which is delivered to line 47. (See also Figure 21.)

*Figure 20.*—Zero reader 4 (Sperry), localizer receiver 45a, gyrosyn compass 26 and heading synchronizer 25 have already been sufficiently described in connection with the relay and switching system of Figure 18. Unit G45 marked "localizer geometry" symbolically represents the set-up for comparison of localizer transmitter signals with a reference signal upon which the operation of localizer receiver 45a is based, and pre-amplifier 32a, demodulator D32 as well as equalizing elements 29c are equivalent to the corresponding elements in the output from normal accelerometer 2 and altitude control unit 3 which have already been mentioned in connection with Figure 19, above. (Unit 29b in line 57a from zero reader representing an equalizing element for the localizer signal.) Unit BA20 is a (Bendix) amplifier adapted to deliver an amplified gyrosyn compass signal both to the heading selector elements in zero reader 4 and to heading synchronizer 25.

Roll rate gyro 28 is here schematically represented as a box containing potentiometer pr28, the potentiometer pickoff voltage in line 28b being determined by the roll rate measuring device of the gyro proper which controls the position of the pot arm via link R20r. The roll rate signal passes through equalizing elements 29d into supply line 30 of the aileron deflection control units which are shown in Figure 21 and branches also via line 62 and equalizing elements 64b into the portions of the sideslip stability augmenting system (rudder deflection control) shown in Figure 21. The lateral accelerometer of the sideslip stability augmenting system is schematically represented in Figure 20 as a bubble accelerometer 59 wherein the position of bubble bu59 relative to electrodes ela, elb and elc determines the magnitude and phase of the lateral acceleration signal in line 60, input shaft R20 symbolizing the lateral acceleration forces on the craft which act to deflect bubble bu59 from its neutral position. The lateral acceleration signal passes through pre-amplifier 67a, demodulator D67, a gain control and an equalizing circuit (the latter two collectively designated with numeral 64c) into the control elements for rudder deflection shown in Figure 21. Besides the electrical rudder trim 65 (here represented in the same manner as the electrical aileron trim 27 of Figure 19, i. e. by a potentiometer pickoff that is controlled via link T65, the latter symbolizing an input shaft actuated by the manual setting of knob 65 of Figure 1), the present drawing also shows a form of automatic rudder trim control constituted by box A20c which contains a step voltage generator 20st and an integrating amplifier i20. This automatic trim control proves to be of value in all cases where an out-of-trim condition may develop which remains unnoticed by the pilot and in which a steady state side-slip signal if delivered through equalizing circuits 64c that is at times of insufficient magnitude to produce the necessary amount of rudder deflection to eliminate the steady state sideslip. (This is, for instance, due to the effects of frequency variations in the accelerometer signal on the magnitude of the signal passed by the equalizing elements.) Automatic trim voltages are provided (in addition to the essentially transient voltages emanating from equalizer 64c) by deriving a step voltage (unit 20st) from the output of demodulator D67 which is proportional to the D. C. component of the accelerometer signal, and by feeding this step voltage through an integrating operational amplifier (unit i20) whose output voltage increases linearly with time. The latter voltage is added to the output signal from equalizer 64c. Yaw rate gyro 58 is represented as a box containing a potentiometer py58 whose pickoff arm is positioned under control of the gyro's yaw rate sensing elements, the latter here symbolized as a driving element y20 linked to the potentiometer arm. No yaw rate control signal is derived in the present system, but the arm of potentiometer py58 is mechanically linked to the previously discussed switch syr, causing the latter to close when the yaw rate of the craft reaches a value above .4±.15 deg./sec.

*Figure 21.*—Most of the essential units shown in this drawing have already been discussed. It is seen that the signals from feedlines 14, 30 of Figure 19 and from feedlines 62 and 64a of Figure 20 pass through their respective summing amplifiers 9b, 32b and 67b (feedlines 62 and 64a converging on the latter amplifier), these amplifiers being schematically represented as D. C. operational amplifiers. Elements As21a, As21b, and As21c in the output lines from the respective summing amplifiers represent airspeed compensators consisting essentially of differential pressure operated potentiometers or automatic gain controls p21a, p21b, and p21c, respectively, whose attenuation is made inversely proportional to the differential pressure obtained from the airspeed indicator's Pitot line and static line, the latter parts being illustratively represented as input shafts DP1, DP2, and DP3 linked to the respective potentiometer arms whose position they control.

The signal in line a13 from Mach sensor 1 of Figure 19 passes through adjusting and equalizing elements 8a21 and is added to the airspeed compensated output signal from summing amplifier 9b. (Adding this signal component after the airspeed compensator is made necessary since, for the speed ranges above .75 Mach number where the so-called "tuck-under" tendencies exist, a signal of preadjusted essentially unchanging magnitude is required to provide the needed amount of added up-elevator deflection.)

The feedback supply to power amplifiers 9P, 32P and 67P of the associated servo actuators 10, 33 and 69 is identified with numerals 16 (potentiometer control shaft 24), 39 (control shaft 38), and 73 (control shaft 82), respectively, these numerals corresponding to the ones used in Figure 1 for the same parts.

Boxes d20E and d20R in the elevator and rudder control subsystems, respectively, represent symbolically the method of mechanical linkage between automatic and manual control outputs employed in these control channels, this form of presentation having already been mentioned in connecting with box $d20A$ of the aileron control subsystem. In contrast to the parallel aileron linkage system, boxes $d20E$ and $d20R$ illustratively represent the series linkage systems employed in the elevator and rudder control channels since in both these latter applications, the input shafts to the respective boxes (input shafts 23 and $d22$ of box $d20E$ and input shafts 70 and $72d$ of box $d20R$) may be simultaneously actuated, thus producing a resultant displacement of the respective output shafts which constitutes the algebraic sum of manual and automatic control inputs. Components $Efb$ in the feedback line $fb21$ from aileron synchronizer $30a$ represent equalizing elements, and line $63a$ from aileron potentiometer 63 carries the aileron cross-feed signal of the sideslip stability augmenting system which is added to the lateral acceleration and roll rate signal components of this latter system. The dotted control link $63p$ from stick 22 to the pickoff arm of potentiometer 63 serves to demonstrate that the signal in channel $63a$ is made to correspond to magnitude and sense of lateral control stick (i. e., of aileron) deflection.

The aileron and rudder trim signals from lines 47 and 66, respectively, of Figure 20 are seen to bypass relay operated switches K5, K7 and KT so that the necessary trim deflections can be maintained irrespectively of whether the system is under Auto or Man control. (Provisions for elevator trim are not shown in the present drawing. Consult Figures 5 and 6.)

What is claimed is:

1. In an aircraft having ailerons and a pilot's control stick for manual operation of said ailerons, and equipped with autopilot flight control means for automatic aileron operation when said craft is subjected to automatic flight control: the combination of manual and automatic control of said ailerons wherein said autopilot aileron control means become ineffective under automatic flight control operation of said craft whenever said control stick is engaged for manual aileron control and wherein said autopilot aileron control means resume their automatic function whenever said control stick is released, comprising power means for actuating said ailerons; a manual aileron actuating system linking said control stick with said power means wherein manual deflections of said control stick from neutral in a lateral or left-right direction with respect to said craft's longitudinal axis act to control said power means so as to cause corresponding aileron deflections; an aileron servo actuator built in the form of a variable length mechanical link and composed of a servo housing and a servo output shaft, the latter extending from said housing, and the free end of said output shaft being operatively attached to an intermediate link of said manual aileron actuating system; rigid anchorage means linked to the free end of said servo housing for rigidly supporting the latter against said craft's structure; elastic anchorage means linked to the free end of said servo housing for elastically supporting the latter against said craft's structure; on-off switching means for said craft's automatic flight control; driving means contained in said servo housing for reversibly displacing said servo output shaft from a reference or neutral position relative to said housing so as to vary the overall neutral length of said mechanical servo link between the free end of said servo output shaft and the free end of said servo housing, said driving means being acted upon by said autopilot flight control means when said craft is under said automatic flight control, and said servo output shaft being retained by centering means in said neutral position when said driving means are inactive; means responsive to a controlling medium for disconnecting said autopilot flight control means from said driving means of said servo output shaft when said controlling medium is operative and for reconnecting said autopilot flight control means when said controlling medium is inoperative; means responsive to said same controlling medium for rendering said rigid anchorage means ineffective and for simultaneously rendering said elastic anchorage means effective while said controlling medium is operative, said same responsive means rendering said rigid anchorage means effective and said elastic anchorage means ineffective when said controlling medium is inoperative; pressure responsive means associated with said control stick so as to render said controlling medium operative whenever said control stick is laterally engaged for manual aileron deflection, and for rendering said controlling medium inoperative whenever said control stick is laterally released, such that said control stick and said aileron servo actuator are operatively in parallel, any displacement from neutral of said servo output shaft acting to produce a corresponding displacement from neutral of said ailerons when said rigid anchorage means are effective, and any left-right displacement of said control stick from neutral acting to produce a coresponding aileron deflection when said elastic anchorage means are effective.

2. Apparatus as set forth in claim 1, wherein said elastic anchorage means for said aileron servo actuator furthermore tend to center said control stick in its zero left-right deflection position when said rigid anchorage means are rendered ineffective and said servo output shaft rests in neutral; and wherein said same elastic anchorage means act to apply a lateral deflection load or deflection-opposing stick force onto said control stick that increases with the amount of manual lateral control stick deflection in either direction from zero, said elastic anchorage means comprising: a bidirectionally elastic element mounted in parallel with said rigid anchorage means between said craft's structure and the free end of said servo housing, said elastic element being adjusted to retain a neutral or inactive preload of equal and opposite elastic forces when said rigid anchorage means are effective, such that upon inactivation of said rigid anchorage means and upon the coincidental return of said aileron servo link to its neutral length, said opposite preload forces are transmitted onto said control stick via said aileron servo actuator link and via said intermediate linkage member of said manual aileron actuating system, thus tending to retain said control stick as well as said ailerons in their respective zero positions; and said elastic element further engendering a deflection-resisting force at said control stick which is proportional to manual control stick deflection in either lateral direction from zero.

3. Apparatus as set forth in claim 2, wherein in addition to said autopilot flight control means a manually adjustable aileron trim voltage is fed through said aileron servo actuator and adapted to remain connected thereto when, under a manual mode of flight operation, said rigid anchorage means of said aileron servo as well as said autopilot flight control means are rendered ineffective, said equal and opposite preload forces of said elastic element and the trimmed overall length of said aileron servo link acting to shift said control stick into a trimmed neutral position, thereby automatically providing a "stick-in-neutral feel" in the trimmed stick position.

4. Apparatus as set forth in claim 1 wherein said pressure responsive means include a delaying element adapted to retard the controlling functions, that are initiated when lateral pressure is applied onto said control stick, by a sufficient amount of time so as to allow for changeovers from left control stick deflections to right control stick deflections and vice versa without causing said automatic aileron control functions to be intermittently resumed.

5. Apparatus as set forth in claim 4 wherein said pressure responsive means inclusive of said delaying element, said means for disconnecting and reconnecting said autopilot flight control means from and to said driving means of said servo actuator output shaft, said means for rendering said rigid anchorage means ineffective and effective, and said controlling medium, comprise in combination: a power source with a switch and a relay connected in series, said relay, upon closing of said switch, acting to connect said autopilot flight control means to said aileron servo actuator and to render said rigid anchorage means effective; a connection in parallel with said switch and said relay, leading from said power source through a quick-disengage and slow-engage relay and through two stick force switches to ground, the latter switches connected in parallel with each other but in series with said last mentioned relay and so located at the base of the handgrip of said control stick that upon applying a lateral force onto said control stick grip in one direction, one of said two stick force switches makes contact, and upon applying a lateral force in the opposite direction, the other of said two stick force switches makes contact, and so that upon removing said lateral force from either direction, both said stick force switches remain open; said second mentioned relay acting to rapidly disengage or open said first mentioned switch when one or the other of said stick force switches make contact, thereby disconnecting said autopilot flight control means and rendering said rigid anchorage means ineffective, and acting to close said first mentioned switch after a delay when both said stick force switches are open, thereby re-energizing said first mentioned relay.

6. In an aircraft equipped with a conventional control stick for manual actuation of said craft's elevators and ailerons where elevator displacements result from fore-aft deflections, and aileron displacements from left-right deflections of said control stick from neutral: a switching mechanism associated with said control stick operative in response to a nominal lateral pressure from the left or right against the handgrip of said control stick but insensitive to fore-aft pressures against said same handgrip, comprising a shaft anchored in the aft portion of the free end of the control stick column and so oriented in a vertical plane that the extension of the longitudinal axis of said shaft towards the base of said control stick column passes through the latter's pivot for fore-aft stick deflections; a U-shaped fixture collared around the base of said handgrip and rigidly clamped to said base; attachments forming part of said U-shaped fixture for pivotally holding said handgrip on said shaft, and two parallel and essentially straight side portions or flanks of said U-shaped fixture extending forward from said handgrip base in a direction parallel to said craft's longitudinal axis when said handgrip is mounted on said shaft such that the free end of said control stick column enters between said two flanks, the diameter of the transverse space between said two parallel flanks being slightly larger than the transverse diameter of said interposed control stick column, the latter being hollow at its free end, and the center of pressure for left-right and fore-aft deflections of said control stick being located essentially in the center of said handgrip and to the rear of said vertical axis extension through said shaft so that lateral pressure against said handgrip provides a torque about said shaft axis; a preloaded centering spring supported in the hollow end of said control stick column between two steel balls, each of said balls being seated against a bore hole in the wall of said control stick column and so oriented that the preload forces of said spring that hold said steel balls against said bore holes are directed perpendicular to the planes of orientation of said two flanks of said U-shaped fixture, said bore holes passing through the outer surface of said column walls; a set screw mounted in each of said two flanks opposite each of said bore holes and adjusted to bear against said steel balls so that the transverse clearance between one of said flanks and the adjacent outer surface of said column is equal to the corresponding clearance at the opposite side of said column when no torque prevails about said shaft axis, i. e., when no lateral pressure is applied against said control stick grip; two miniature switches mounted forward on said free column end, each switch located opposite the free end of one of said flanks of said U-shaped fixture; an adjustable contact member mounted in the free end of each of said flanks opposite one of said two miniature switches and adjusted to be operatively in contact with said switch such that said switch remains open when no torque is present about said pivotal axis of said handgrip, the preload of said centering spring being so apportioned that a prespecified torque about said shaft axis, or a prespecified minimum lateral pressure from either direction against said handgrip is required to permit a pivotal motion of said handgrip about said shaft in which the pressure of one of said set screws against one of said steel balls causes further compression of said spring, thus allowing one of said flanks to move into contact with said control stick column whereby said contact member associated with said latter flank advances sufficiently towards the corresponding miniature switch so as to close the latter, said spring preload further acting to return said handgrip to its centered position and thereby to open said corresponding switch when said lateral pressure is removed from said handgrip.

7. Apparatus as set forth in claim 1 in which said auto flight control means includes a directional gyro, a roll rate gyro, a yaw rate gyro, a gyrosyn compass system and a heading synchronizer and is further characterized by including, means operative during a sustained manual turn for counteracting any undesirable system changeover to said automatic mode of aileron control which is due to involuntary release of said control stick grip by the pilot when a condition of turn coordination has been attained in which said control stick is laterally returned to its neutral position, said counteracting means comprising control elements associated with said yaw rate gyro and adapted to become effective when the craft reaches and maintains a specified yaw rate during a manual turn, said control elements, when effective, causing said heading synchronizer to continue its tracking mode which it normally pursues when said control stick is manually deflected and in which it constantly reduced to zero the heading error signal derived from said gyrosyn compass and delivered to said aileron servo actuator; and aileron synchronizer similar in function to said heading synchronizer and adapted to track the bank angle or bank error signal from said directional gyro and the roll rate signal from said roll rate gyro as long as said control elements associated with said yaw rate gyro remain effective, thereby acting to reduce to zero said bank error signal and said roll rate signal to said aileron servo actuator, and the craft thus being allowed to continue automatically in its initiated banked turn as long as said specified yaw rate prevails or until the pilot manually straightens out the craft.

8. In an airplane having control surfaces including ailerons, an elevator and a rudder, the combination of a manual control for said control surfaces, an autopilot control for said control surfaces, separate respective linkages between said manual control and said ailerons, said elevator and said rudder, means for changing the overall length of said elevator linkage and said rudder linkage by a signal input from said autopilot control so as to effect automatic deflection of said elevator and said rudder in response to said autopilot signal input without disconnecting the manual deflection control of said same surfaces, an autopilot link member changeable in length by a signal input from said autopilot control disengageably connected into said aileron linkage so as to automatically deflect said ailerons in response to said autopilot signal input; and means for automatically disconnecting said autopilot link from said aileron linkage whenever the latter is operated through said manual control, and for automatically reconnecting said autopilot link when said latter manual control is inoperative.

9. Apparatus as set forth in claim 8, including trim control means for each of said control surfaces wherein the aileron and rudder trim control is connected to effect variations in the length of said autopilot link member and of said rudder linkage, respectively, in a manner analogous to those resulting from said autopilot control signal input, the trim signal input for said respective control surfaces being manually adjustable through means independent from said manual control for said same control surfaces, and means of preserving said aileron trim while said manual aileron control is operative.

10. In an airplane having control surfaces including ailerons, an elevator and a rudder: the combination of a manual control for said control surfaces; an autopilot control for said control surfaces; separate respective linkages between said manual control and said ailerons, said elevator and said rudder; means for changing the overall length of said elevator linkage and said rudder linkage by a signal input from said autopilot control so as to effect automatic deflection of said elevator and said rudder in response to said autopilot signal input without disconnecting the manual deflection control of said same surfaces; an autopilot link member changeable in length by a signal input from said autopilot control and connected into said aileron linkage to effect automatic deflection of said ailerons in response to said autopilot signal input; an anchorage assembly for holding said autopilot link member rigidly onto the structure of said airplane; a bidirectional force producer forming part of said anchorage assembly; means operative whenever said manual aileron control is inoperative for converting said autopilot link member and said anchorage assembly inclusive of said force producer effectively into one single rigid unit, the changes in length of said autopilot link member thereby being converted into deflections of said ailerons which correspond to said autopilot signal inputs, and means operative whenever said manual aileron control is operated by converting said autopilot link member into an inert transfer link which connects and reflects the load from said bidirectional force producer onto said manual aileron control.

11. In an airplane having control surfaces including ailerons, an elevator and a rudder: the combination of a manual control for said control surfaces; an autopilot control for said control surfaces; separate respective linkages between said manual control and said ailerons, said elevator and said rudder; means for changing the overall length of said elevator linkage and said rudder linkage by a signal input from said autopilot control so as to effect automatic deflection of said elevator and said rudder in response to said autopilot signal input without disconnecting the manual deflection control of said same surfaces; a force producing system operative on said elevator and said rudder linkages, respectively, connected to reflect force loads onto said manual elevator and rudder controls when said manual controls are actuated, and to provide backup forces for said automatic elevator and rudder deflections, respectively, which prevent said changes in the overall lengths of said elevator and rudder linkages from being reflected onto said respective manual controls, thereby securing automatic control surface deflections which correspond to the respective autopilot signal inputs which effect said changes in the length of said linkages; an autopilot link member changeable in length by a signal input from said autopilot control disengageably connected into said aileron linkage to automatically deflect said ailerons in response to said autopilot signal input; and means for automatically disconnecting said autopilot link from said aileron linkage whenever the latter is operated through said manual control, and for automatically reconnecting said autopilot link when said latter manual control is inoperative.

12. In an airplane having control surfaces including ailerons, an elevator and a rudder: the combination of a manual control for said control surfaces, an autopilot control for said control surfaces, automatic longitudinal and lateral stability augmenting control for said aircraft operative through said elevator and said rudder, respectively; separate respective linkages between said manual control and said ailerons, said elevator and said rudder; means for changing the overall length of said elevator linkage and said rudder linkage by a signal input from said autopilot control and from said longitudinal and lateral stability augmenting control, respectively, to effect automatic deflection of said elevator and said rudder in response to said autopilot and said stability augmenting control signal input without disconnecting said manual deflection control of said same surfaces; an autopilot link member changeable in length by a signal input from said autopilot control disengageably connected into said aileron linkage so as to automatically deflect said ailerons in response to said autopilot signal input; and means for automatically disconnecting said autopilot link from said aileron linkage whenever the latter is operated through said manual control, and for automatically reconnecting said autopilot link when said latter manual control is inoperative.

References Cited in the file of this patent

UNITED STATES PATENTS

| | | |
|---|---|---|
| 2,408,770 | Frische et al. | Oct. 8, 1946 |
| 2,464,629 | Young | Mar. 15, 1949 |
| 2,475,484 | De Nise | July 5, 1949 |
| 2,488,286 | Glenny | Nov. 15, 1949 |
| 2,633,315 | Rossire | Mar. 31, 1953 |
| 2,707,085 | Strother | Apr. 26, 1955 |